(12) United States Patent
Xia

(10) Patent No.: US 12,134,310 B2
(45) Date of Patent: Nov. 5, 2024

(54) HIGH-STRENGTH LIGHTWEIGHT AUTOMOBILE COMPARTMENT TONNEAU COVER

(71) Applicant: Foshan Baitai Auto Accessories Co., Ltd, Foshan (CN)

(72) Inventor: Yong Xia, Foshan (CN)

(73) Assignee: Foshan Baitai Auto Accessories Co., Ltd, Foshan (CN)

( * ) Notice: Subject to any disclaimer, the term of this patent is extended or adjusted under 35 U.S.C. 154(b) by 0 days.

(21) Appl. No.: 18/631,256

(22) Filed: Apr. 10, 2024

(65) Prior Publication Data

US 2024/0253433 A1 Aug. 1, 2024

(30) Foreign Application Priority Data

| Aug. 24, 2023 | (CN) | ............................ | 202322290371 |
| Aug. 24, 2023 | (CN) | ............................ | 202322290544 |
| Sep. 4, 2023 | (CN) | ............................ | 202322396229 |
| Sep. 4, 2023 | (CN) | ............................ | 202322396333 |
| Sep. 18, 2023 | (CN) | ............................ | 202311204132 |
| Sep. 18, 2023 | (CN) | ............................ | 202322535266 |
| Jan. 31, 2024 | (CN) | ............................ | 202420241550 |
| Feb. 4, 2024 | (CN) | ............................ | 202420276487 |

(51) Int. Cl.
*B60J 7/10* (2006.01)
*B60J 7/19* (2006.01)

(52) U.S. Cl.
CPC .............. *B60J 7/106* (2013.01); *B60J 7/198* (2013.01)

(58) Field of Classification Search
CPC ..... B60J 7/106; B60J 7/041; B60J 7/04; B60J 7/022; B60J 7/1607; B60J 7/198; B60J 7/08; B60P 7/02
USPC ............ 296/100.02, 100.09, 100.01, 100.17, 296/100.07, 100.12, 105
See application file for complete search history.

(56) References Cited

U.S. PATENT DOCUMENTS

| 4,607,876 | A | * | 8/1986 | Reed | ......................... | B60P 7/02 |
| | | | | | | 135/88.13 |
| 4,738,274 | A | * | 4/1988 | Heath | ....................... | B60P 7/02 |
| | | | | | | 296/156 |
| 6,428,079 | B1 | * | 8/2002 | Van Dyke | ................ | B60J 7/141 |
| | | | | | | 296/100.09 |

(Continued)

FOREIGN PATENT DOCUMENTS

WO WO-2024035349 A1 * 2/2024 ............. B60J 7/106

*Primary Examiner* — Joseph D. Pape
*Assistant Examiner* — Veronica M Shull
(74) *Attorney, Agent, or Firm* — Hemisphere Law, PLLC; Zhigang Ma

(57) ABSTRACT

The present disclosure discloses a high-strength lightweight automobile compartment tonneau cover, including a top cover, a front cover, a first side cover, a rear cover, and a second side cover; a top of the front cover, a top of the first side cover, a top of the rear cover, and a top of the second side cover are respectively connected to an edge of the top cover; the front panel frame body includes four front panel profiles, two front panel upper end sockets, and two front panel lower end sockets; the four front panel profiles are respectively arranged on four sides of the front panel, and the top cover can be adjusted according to a size of a compartment; and integrally molded profiles are used, which improves the structural stability.

20 Claims, 86 Drawing Sheets

(56) References Cited

U.S. PATENT DOCUMENTS

| | | | |
|---|---|---|---|
| 6,588,819 B1* | 7/2003 | Block | B60J 7/106 |
| | | | 296/10 |
| 6,705,666 B2* | 3/2004 | Lynch | B60J 7/106 |
| | | | 296/100.07 |
| 7,207,614 B2* | 4/2007 | Briggs | B60J 7/1614 |
| | | | 296/26.06 |
| 7,261,362 B1* | 8/2007 | Mendez | B60J 7/064 |
| | | | 296/100.09 |
| 7,988,218 B1* | 8/2011 | Devine | B62D 33/04 |
| | | | 296/100.01 |
| 11,376,932 B2* | 7/2022 | Barnwell | B60J 10/90 |
| 2008/0067830 A1* | 3/2008 | Frankham | B60J 7/106 |
| | | | 296/100.02 |
| 2009/0230718 A1 | 9/2009 | Getschel et al. | |
| 2009/0243321 A1 | 10/2009 | Fukushima et al. | |
| 2014/0367990 A1* | 12/2014 | Dost | B62D 33/044 |
| | | | 29/428 |
| 2017/0240033 A1* | 8/2017 | Dylewski, II | B60J 7/141 |

\* cited by examiner

HIGH-STRENGTH LIGHTWEIGHT AUTOMOBILE COMPARTMENT TONNEAU COVER

CROSS-REFERENCE TO RELATED APPLICATION

The present disclosure claims the priorities of China Patent Applications No. CN202311204132.1, No. CN202322535266.3, No. CN202322290371.5, No. CN202322290544.3, No. CN202322396229.9, No. CN202322396333.8, No. CN202420241550.1, and No. CN202420276487.5, all contents of which are incorporated in the present disclosure.

TECHNICAL FIELD

The present disclosure relates to the technical field of pickup truck trunk covers, and in particular, to a high-strength lightweight automobile compartment tonneau cover.

BACKGROUND

A roof or a tonneau cover is mounted on a compartment of a pickup truck, which can provide protection for cargoes inside the compartment. Especially when a tonneau cover structure is used, the entire tonneau cover structure is formed by enclosing a front cover, a side cover, a rear cover, and a top cover, and the tonneau cover structure is mounted on the pickup truck.

The front cover, the side cover, the rear cover, and the top cover used in the prior art are prepared by sheet metal welding or from front panel fiberglass materials. Once the structure is formed, the shape of the entire structure is fixed. However, there are many types of pickup trucks. The tonneau cover assembled and formed into a fixed structure needs to be subjected to sheet metal welding or direct molding again for different types of pickup trucks.

On the one hand, a product series size cannot be adjusted after the front cover, the side cover, the rear cover, and the top cover are fixed, and the use of a sheet metal bending and welding process can easily lead to a waterproof failure and deformation.

SUMMARY

The present disclosure aims to provide a high-strength lightweight automobile compartment tonneau cover to achieve that sizes of a front cover, a side cover, a rear cover, and a top cover can be adjusted according to a size of a compartment. Furthermore, integrally formed profiles are used, so that the structural stability is improved.

In order to achieve the above objective, the present disclosure provides the following technical solutions:

The present disclosure discloses a high-strength lightweight automobile compartment tonneau cover, including a top cover, a front cover, a first side cover, a rear cover, and a second side cover; a top of the front cover, a top of the first side cover, a top of the rear cover, and a top of the second side cover are respectively connected to four edges of the top cover; the front cover, the first side cover, the rear cover, and the second side cover are connected in sequence; the top cover, the front cover, the first side cover, the rear cover, and the second side cover are enclosed to form a cavity; the front cover includes a front panel and a front panel frame body surrounding the front panel; the front panel frame body includes four front panel profiles, two front panel upper end sockets, and two front panel lower end sockets; the four front panel profiles are respectively arranged on four sides of the front panel, and the two front panel upper end sockets and the two front panel lower end sockets are arranged at four corners of the front panel respectively; and the front panel profiles are hollow.

In the above technical solutions, the profiles are assembled with the end sockets. The profiles are of hollow double-layer structures with strength greater than that of a single-layer sheet metal, which improves the strength of the automobile compartment tonneau cover and reduces the weight of the automobile compartment tonneau cover. Further, there are no welded structures, so that the production efficiency can be improved. The waterproof structures adopt the embedded waterproof rubber strips, ensuring stable waterproof structures. The whole is conveniently and firmly assembled, and the profiles are light in weight. The automobile compartment tonneau cover has a light weight and a stable double-layer structure, and is hard to deform. The number of standard screws is small, so that the mounting efficiency is high. The working time of personnel is greatly shortened; the generality is high; lengths of the profiles are controlled to adapt to pickup trucks with different sizes; the waterproof structures are stable; and the frame structures are sturdy and load-bearing.

DETAILED DESCRIPTION OF THE EMBODIMENTS

The technical solutions in the embodiments of the present disclosure will be clearly and completely described below with reference to the drawings in the embodiments of the present disclosure, and it is obvious that the described embodiments are only a part of the embodiments of the present disclosure but not all of them.

Embodiment 1

Figure 1:
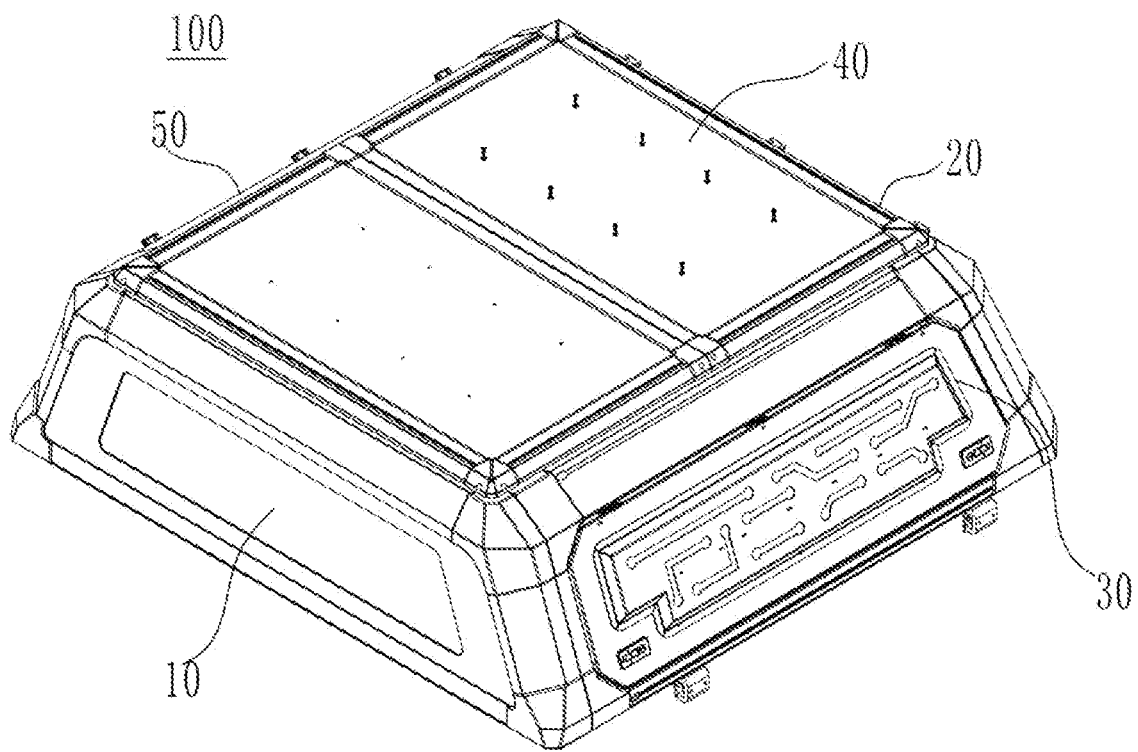
FIG. 1 is a first schematic structural diagram of a high-strength lightweight automobile compartment tonneau cover according to a first embodiment of the present disclosure.
Figure 2:
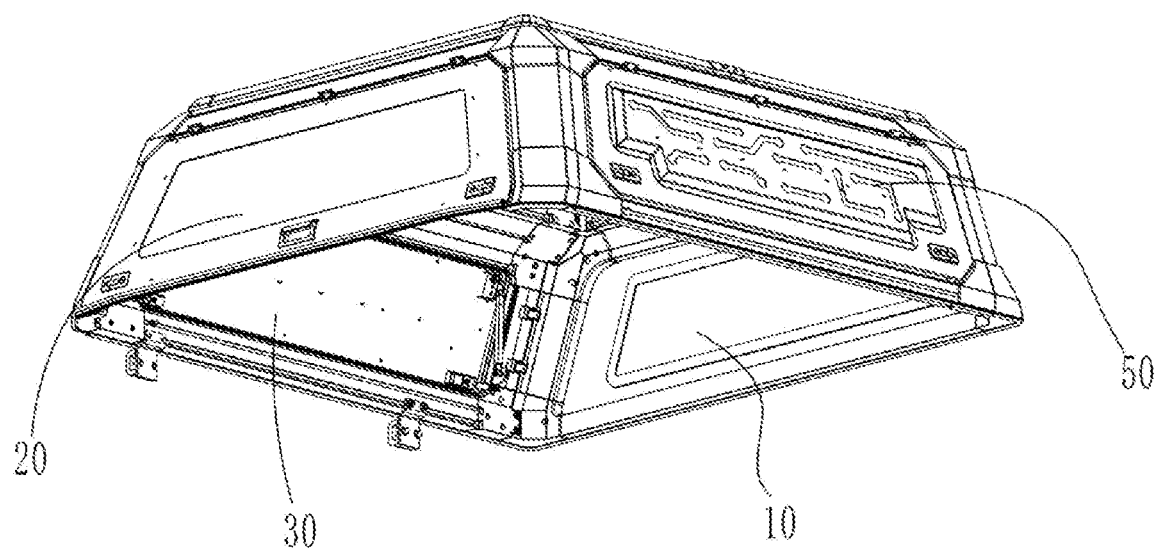
FIG. 2 is a second schematic structural diagram of a high-strength lightweight automobile compartment tonneau cover according to a first embodiment of the present disclosure.

Referring to FIG. 1 to FIG. 2, this embodiment provides a high-strength lightweight automobile compartment tonneau cover 100. The high-strength lightweight automobile compartment tonneau cover 100 includes a top cover 40, a front cover 10, a first side cover 30, a rear cover 20, and a second side cover 50.

A top of the front cover 10, a top of the first side cover 30, a top of the rear cover 20, and a top of the second side cover 50 are respectively connected to four edges of the top cover 40; the front cover 10, the first side cover 30, the rear cover 20, and the second side cover 50 are connected in sequence; the top cover 40, the front cover 10, the first side cover 30, the rear cover 20, and the second side cover 50 are enclosed to form a cavity.

Figure 3:
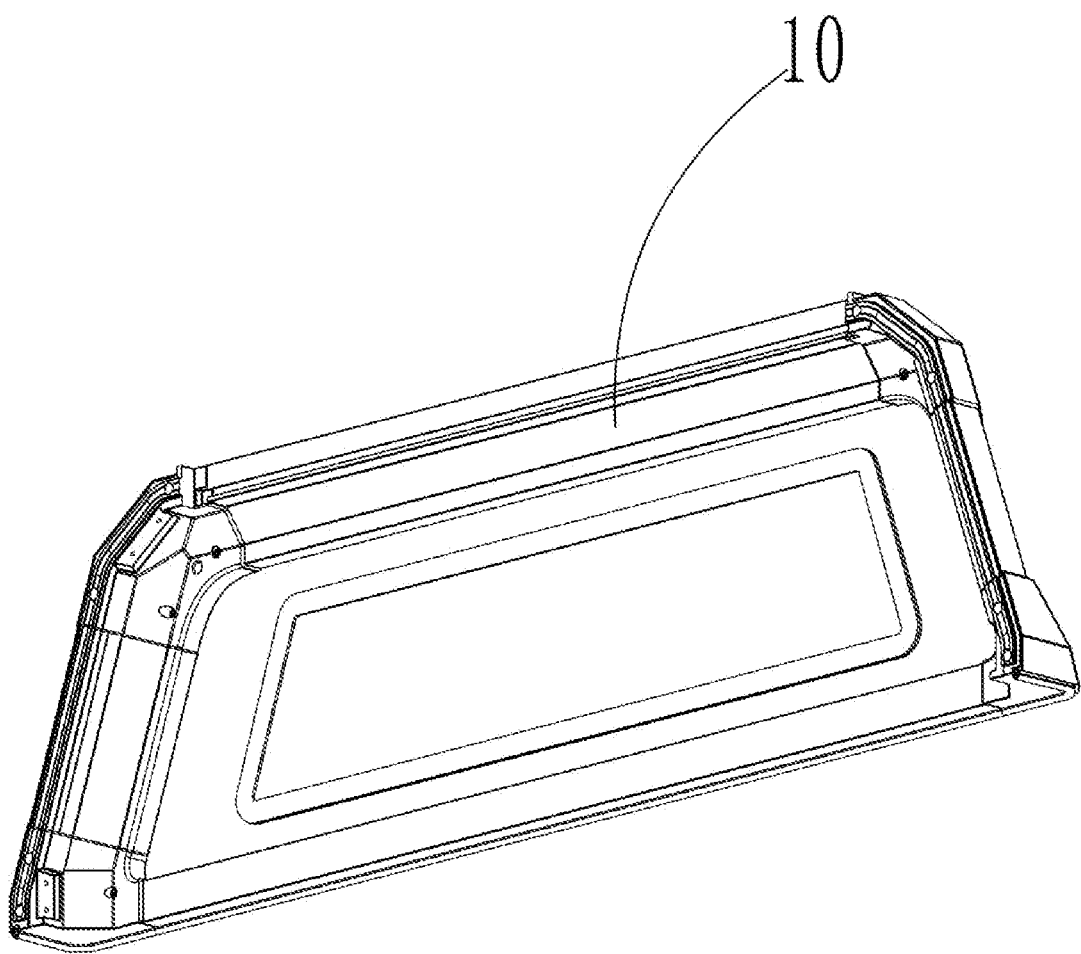
FIG. 3 is a schematic structural diagram of a front cover of a high-strength lightweight automobile compartment tonneau cover according to a first embodiment of the present disclosure.
Figure 4:
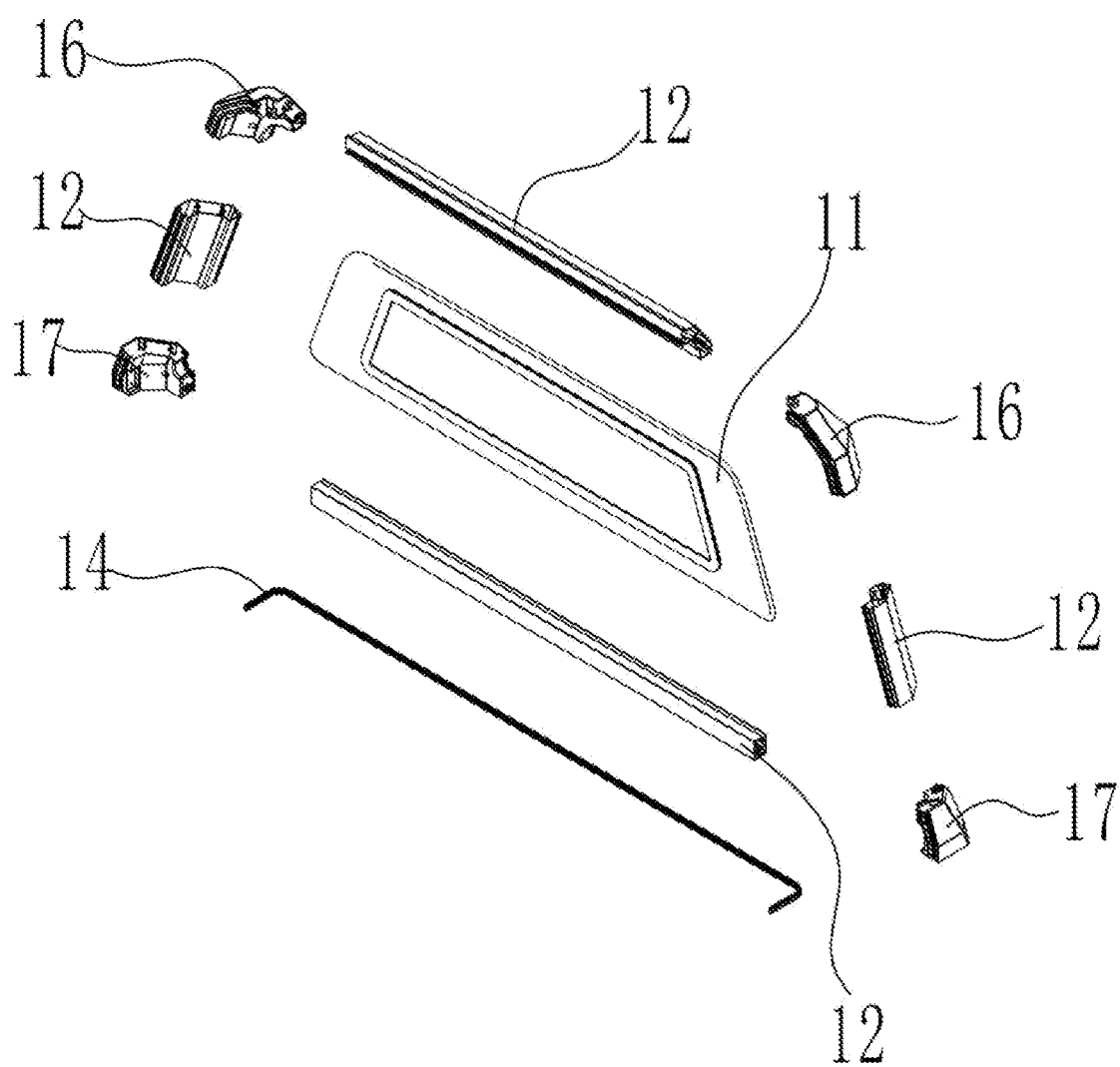
FIG. 4 is a schematic diagram of an exploded structure of a front cover of a high-strength lightweight automobile compartment tonneau cover according to a first embodiment of the present disclosure.

As shown in FIG. 3 to FIG. 4, the front cover 10 includes a front panel 11 and a front panel frame body surrounding the front panel 11; the front panel frame body includes four front panel profiles 12, two front panel upper end sockets 16, and two front panel lower end sockets 17; the four front panel profiles 12 are respectively arranged on four sides of the front panel 11, and the two front panel upper end sockets 16 and the two front panel lower end sockets 17 are arranged at four corners of the front panel 11 respectively; and the front panel profiles 12 are hollow. A bottom of the front cover 10 is provided with a front bottom waterproof rubber strip 14.

Figure 5:
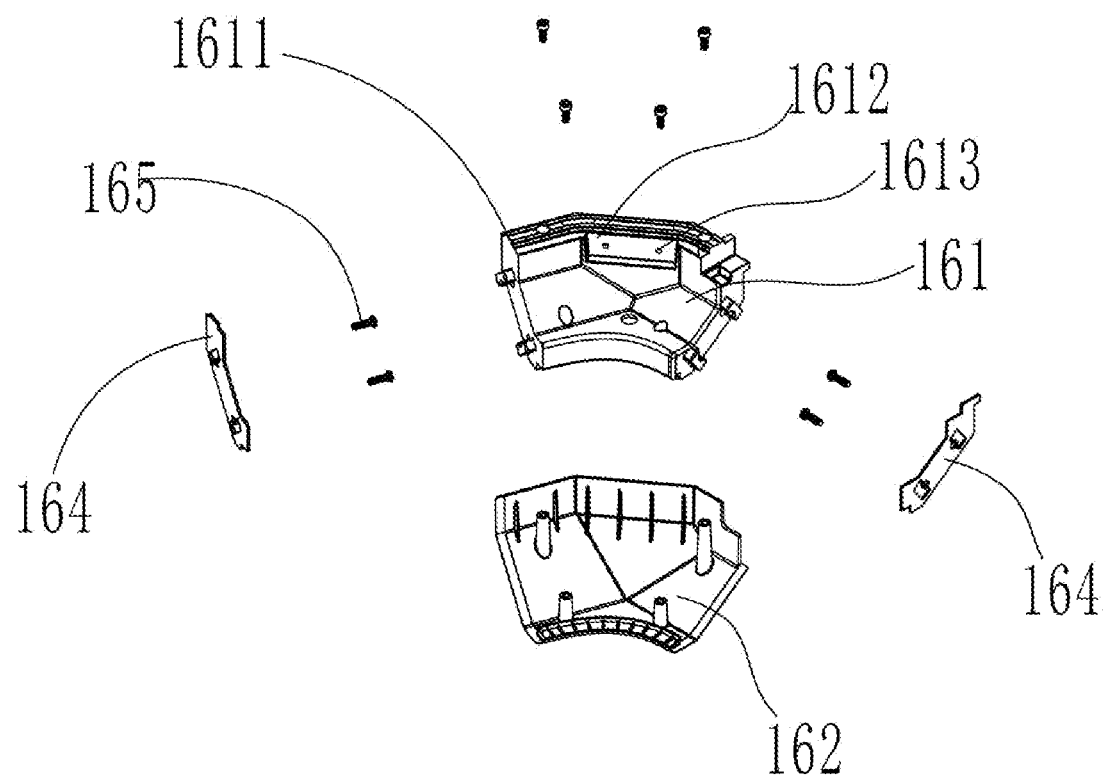
FIG. 5 is a schematic diagram of an exploded structure of a front panel upper end socket in a front cover of a high-strength lightweight automobile compartment tonneau cover according to a first embodiment of the present disclosure.

As shown in FIG. 5, in this embodiment of the present disclosure, each front panel upper end socket 16 includes a first body 161 and a first shell 162 connected to the first body; two ends of the first body 161 are respectively provided with first positioning bosses 1611; the first positioning bosses 1611 are used for positioning and fixing; the two ends of the first body 161 are provided with first rubber pads 164; the first body 161 is provided with a first positioning recess 1612; and a first threaded hole 1613 is formed in the first positioning recess 1612.

Figure 6:
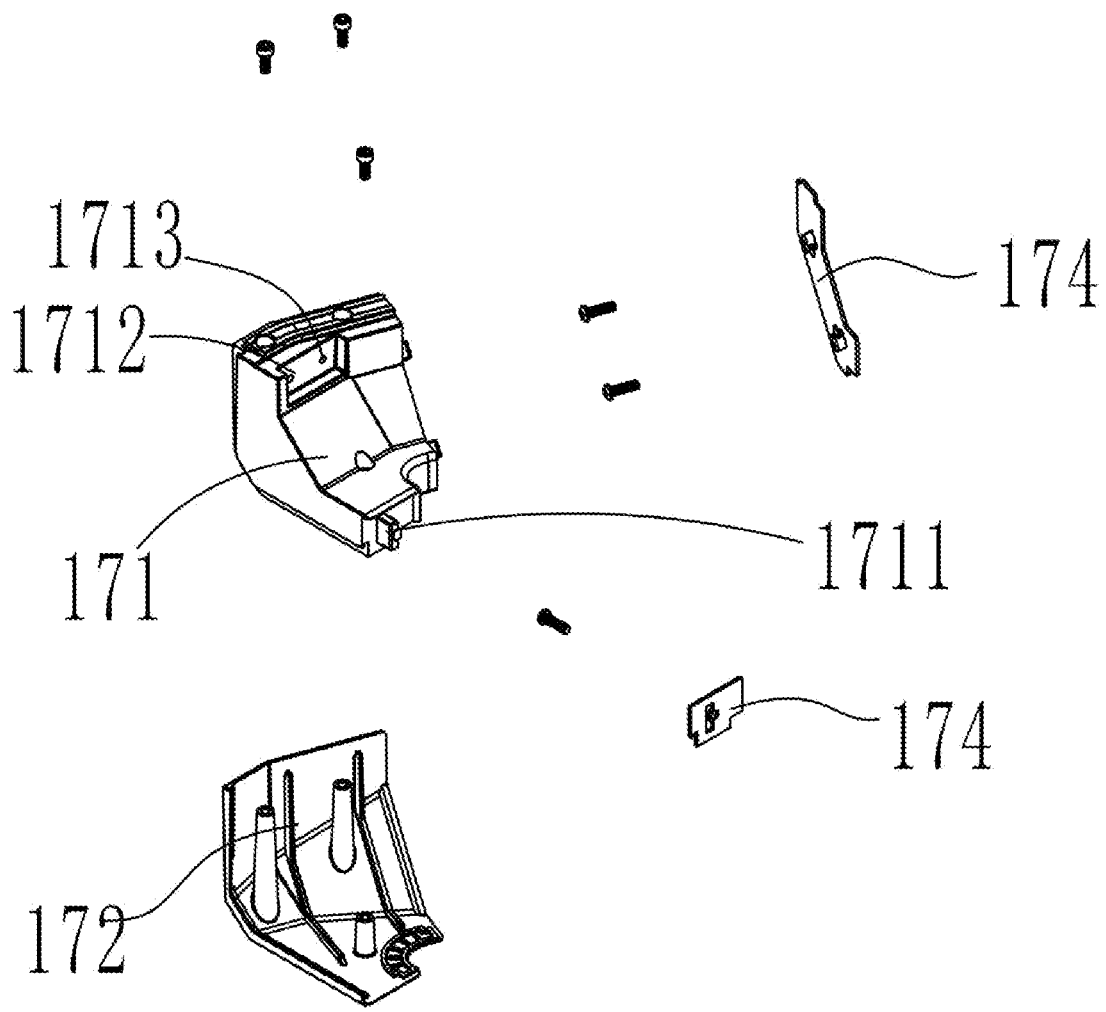
FIG. 6 is a schematic diagram of an exploded structure of a front panel lower end socket in a front cover of a high-strength lightweight automobile compartment tonneau cover according to a first embodiment of the present disclosure.

As shown in FIG. 6, in this embodiment of the present disclosure, each front panel lower end socket 17 includes a second body 171 and a second shell 172 connected to the second body; two ends of the second body 171 are respectively provided with second positioning bosses 1711; the second positioning bosses 1711 are used for positioning and fixing; the two ends of the second body 171 are provided with second rubber pads 174; the second body 171 is provided with a second positioning recess 1712; and a second threaded hole 1713 is formed in the second positioning recess 1712.

Figure 7:
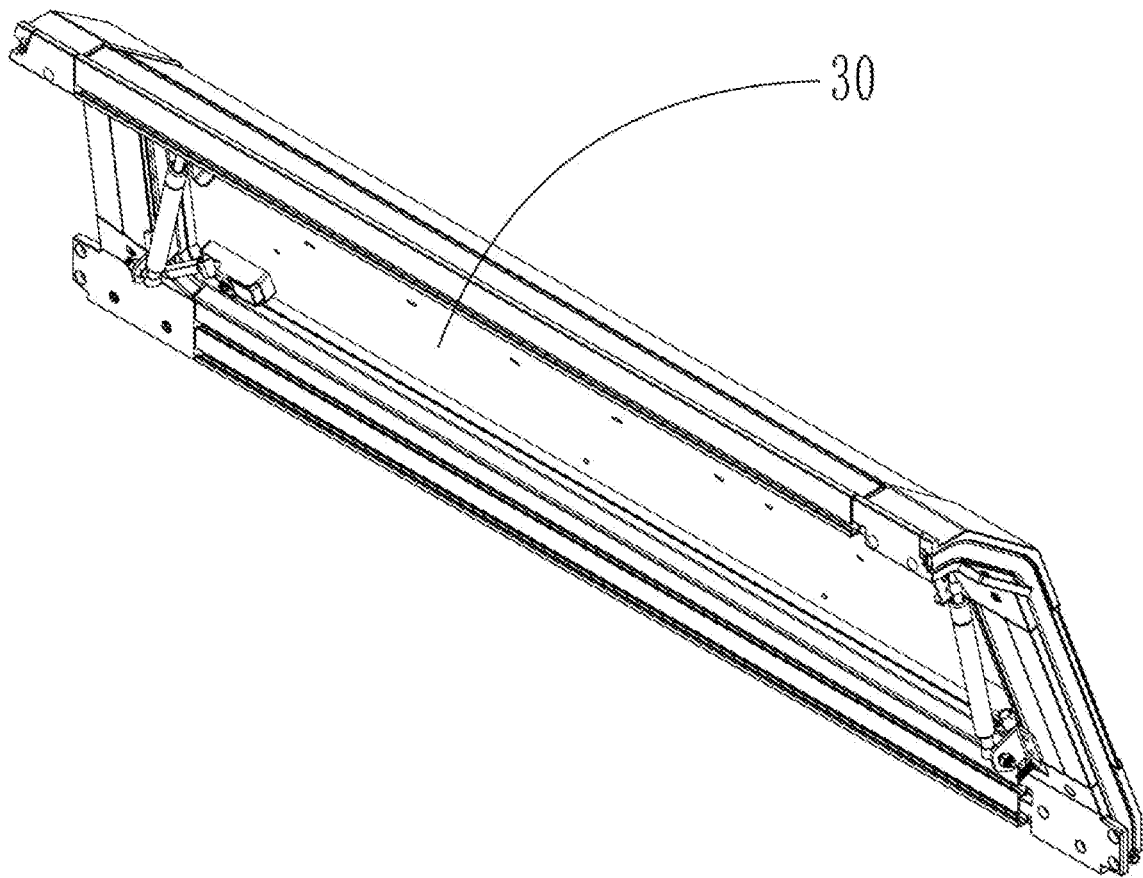
FIG. 7 is a first schematic structural diagram of a first side cover of a high-strength lightweight automobile compartment tonneau cover according to a first embodiment of the present disclosure.
Figure 8:
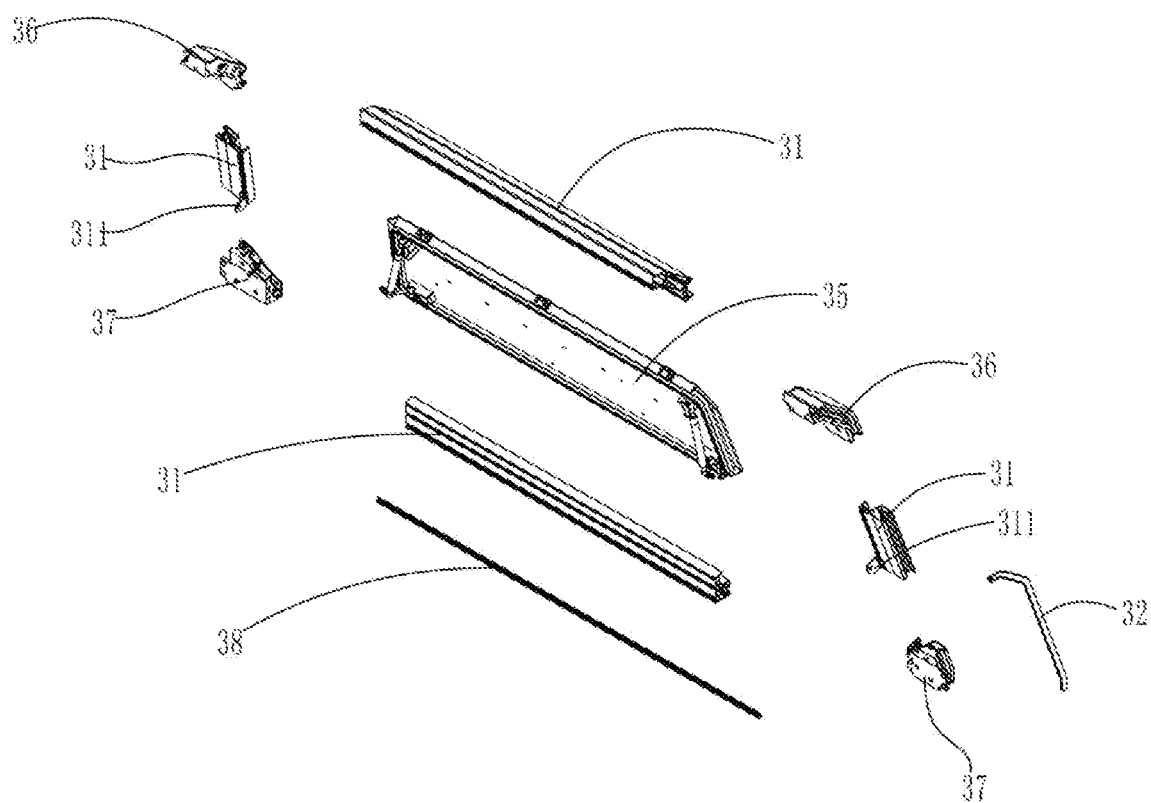
FIG. 8 is a schematic diagram of a first exploded structure of a first side cover of a high-strength lightweight automobile compartment tonneau cover according to a first embodiment of the present disclosure.
Figure 9:
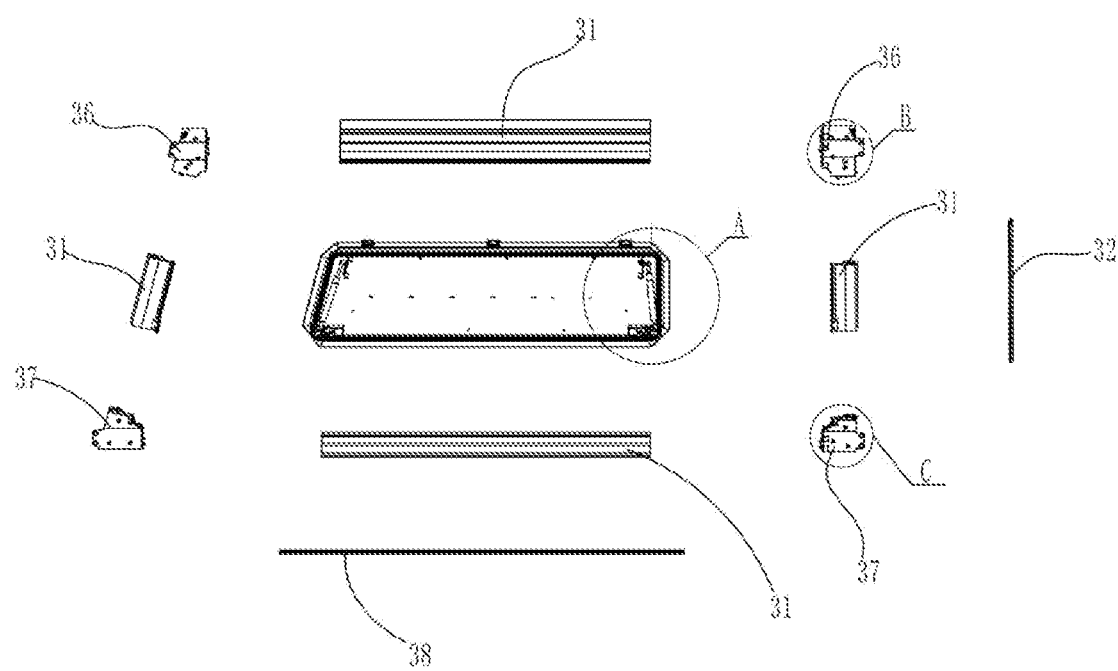
FIG. 9 is a schematic diagram of a second exploded structure of a first side cover of a high-strength lightweight automobile compartment tonneau cover according to a first embodiment of the present disclosure.

As shown in FIG. 7 to FIG. 9, in this embodiment of the present disclosure, the first side cover 30 includes a first panel 35 and a first frame body surrounding the first panel 35; the first frame body includes four first profiles 31, two first upper end sockets 36, and two first lower end sockets 37; the four first profiles 31 are respectively arranged on four sides of the first panel 35; the two first upper end sockets 36 and the two first lower end sockets 37 are respectively arranged at four corners of the first panel 35; the first profile 31 on a first side of the first side cover 30 collides with the front panel profile 12 on a first side of the front cover 10; a waterproof rubber strip 32 is arranged in a gap between the first profile 31 and the front panel profile 12 which collide with each other; and the first upper end socket 36 and the first lower end socket 37 on the first side of the first side cover 30 are respectively connected to the front panel upper end socket 16 and the front panel lower end socket 17 on the first side of the front cover 10. First spring fixing brackets 311 are arranged on the two first profiles 31 on the two sides of the first side cover 30. A bottom of the first side cover 30 is provided with a side bottom waterproof rubber strip 38.

Figure 10:
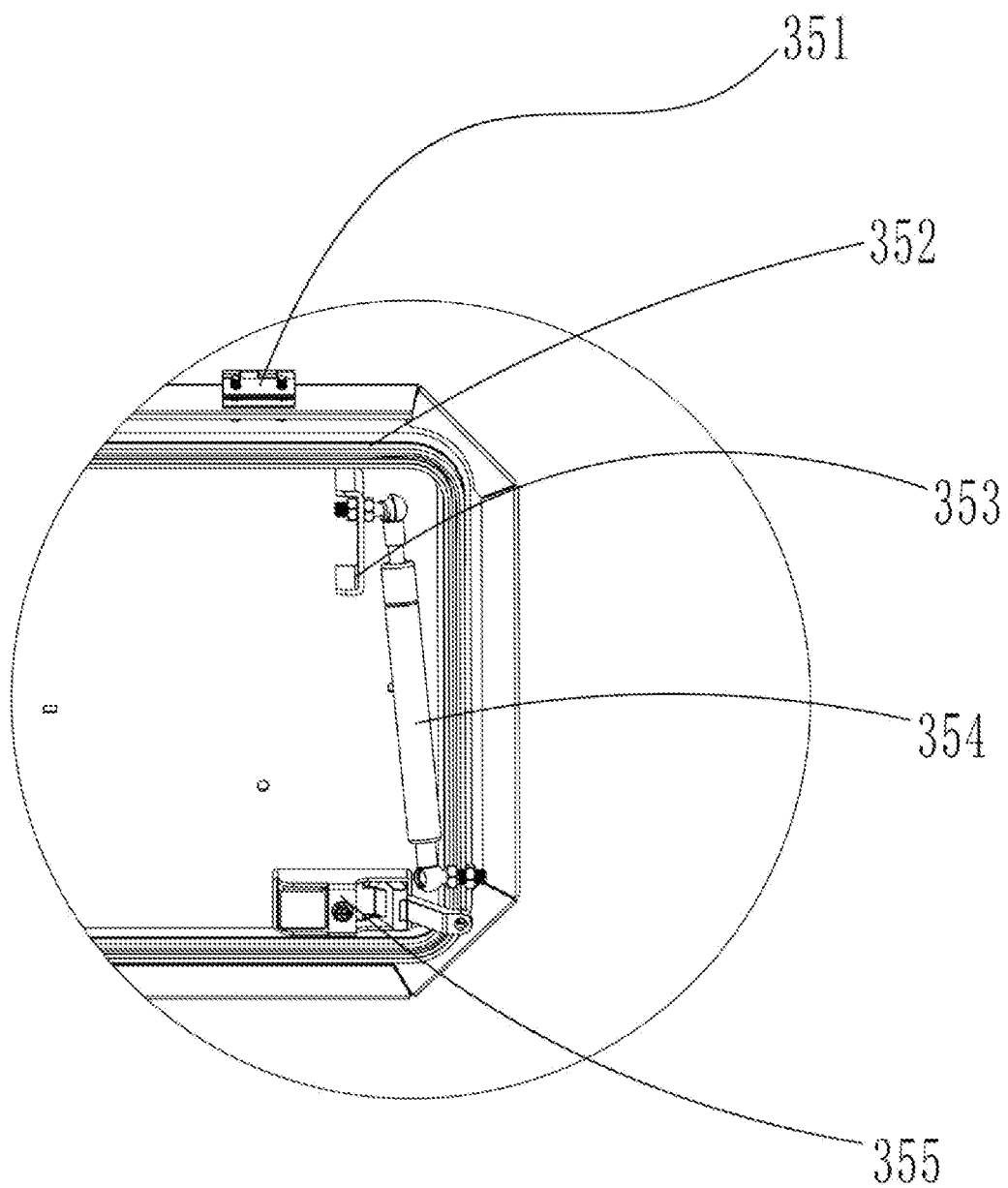
FIG. 10 is a schematic structural diagram of a region A in FIG. 9.

As shown in FIG. 10, the first panel 35 includes a side panel rotating hinge 351, a side panel waterproof rubber strip 352, a second spring fixing bracket 353, a side panel gas spring 354, and a side panel push lock 355.

Figure 11:
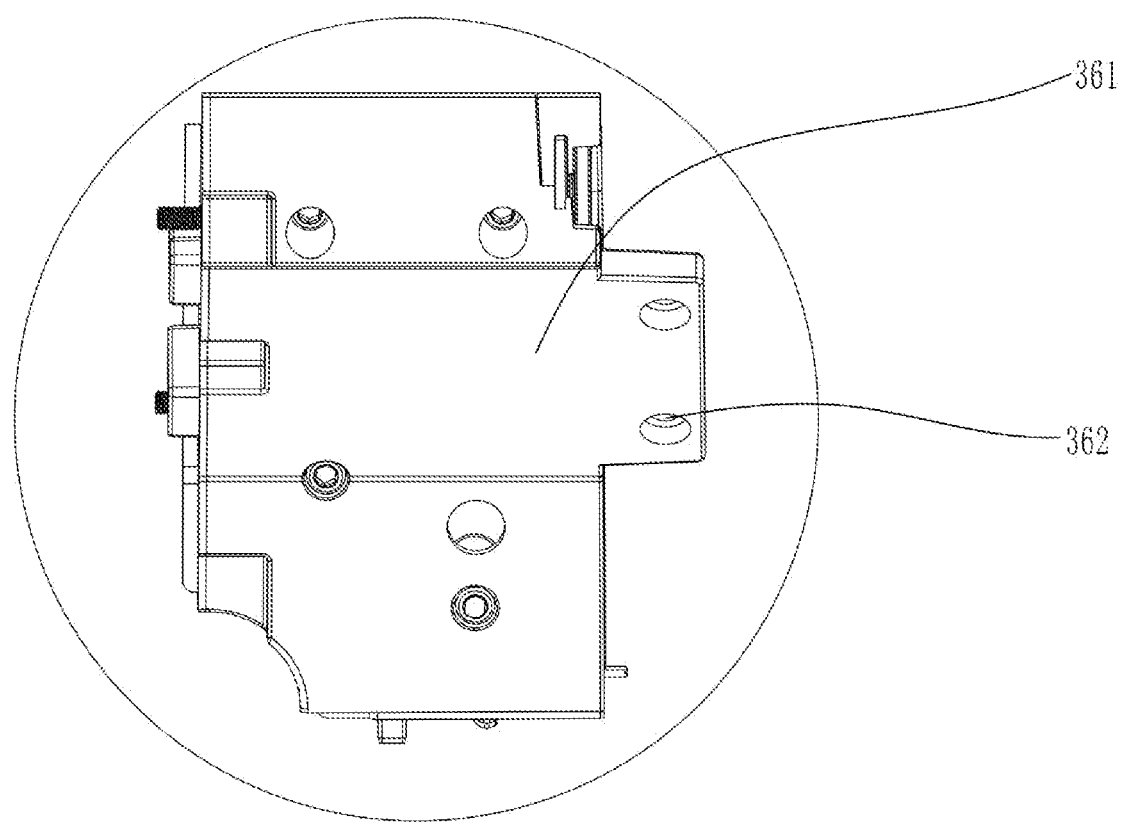
FIG. 11 is a schematic structural diagram of a region B in FIG. 9.

As shown in FIG. 11, the first upper end socket 36 includes a first extension boss 361 and a first connection threaded hole 362.

Figure 12:
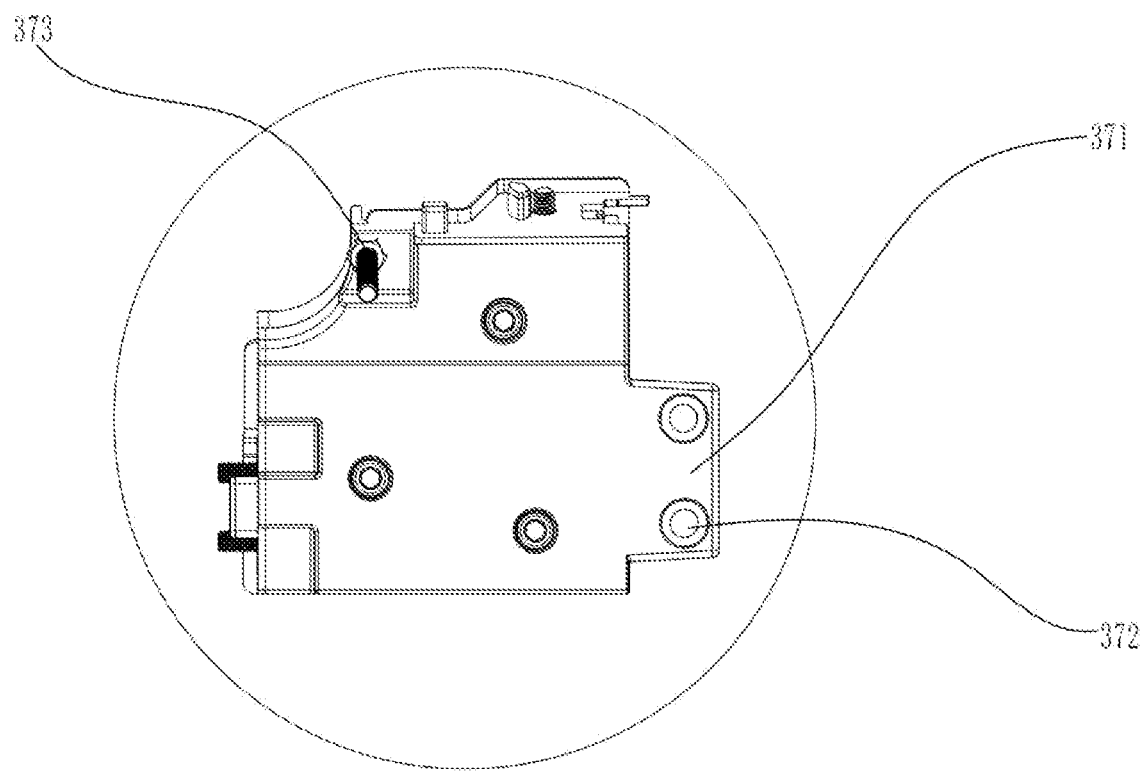
FIG. 12 is a schematic structural diagram of a region C in FIG. 9.

As shown in FIG. 12, the first lower end socket 37 includes a second extension boss 371, a second connection threaded hole 372, and a push lock fixing bolt 373.

Figure 13:
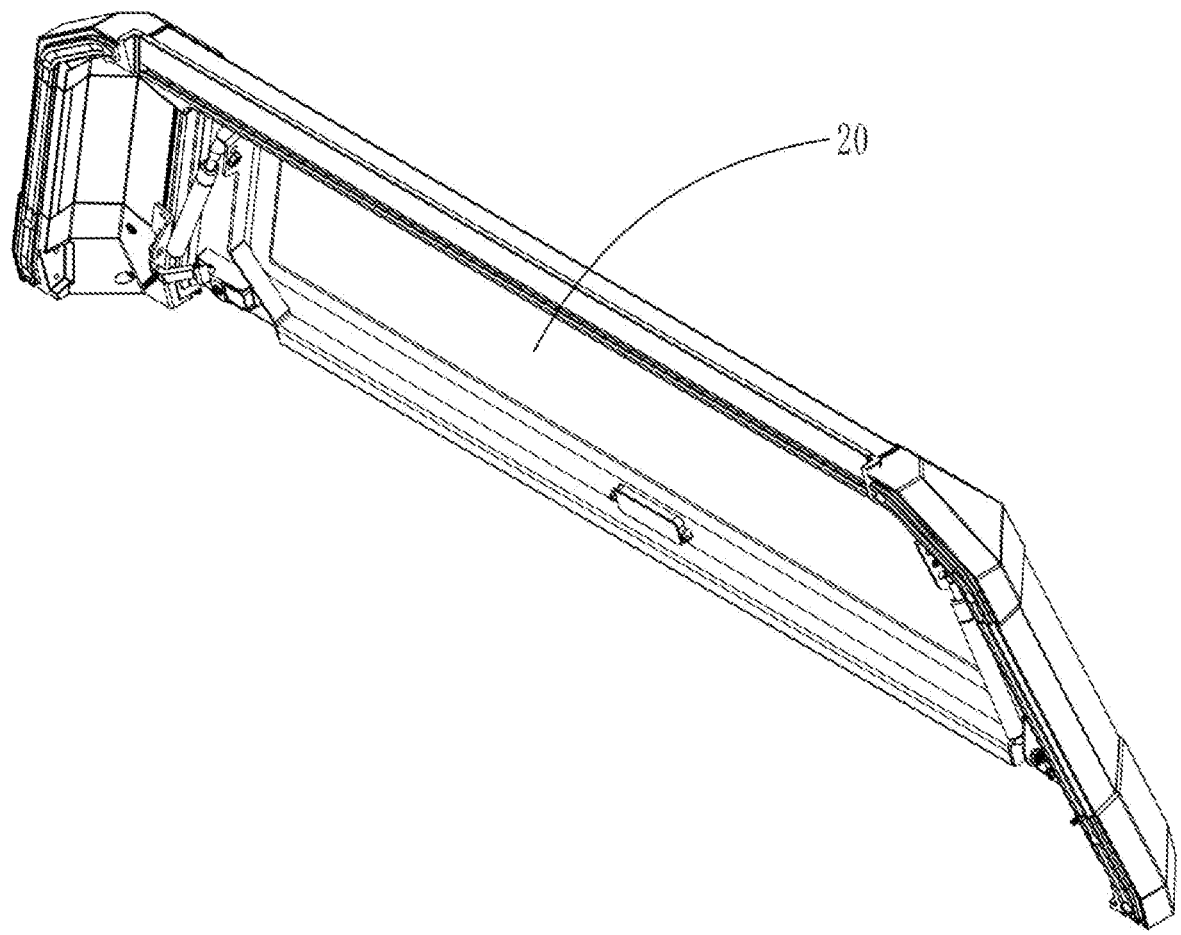
FIG. 13 is a schematic structural diagram of a rear cover of a high-strength lightweight automobile compartment tonneau cover according to a first embodiment of the present disclosure.
Figure 14:
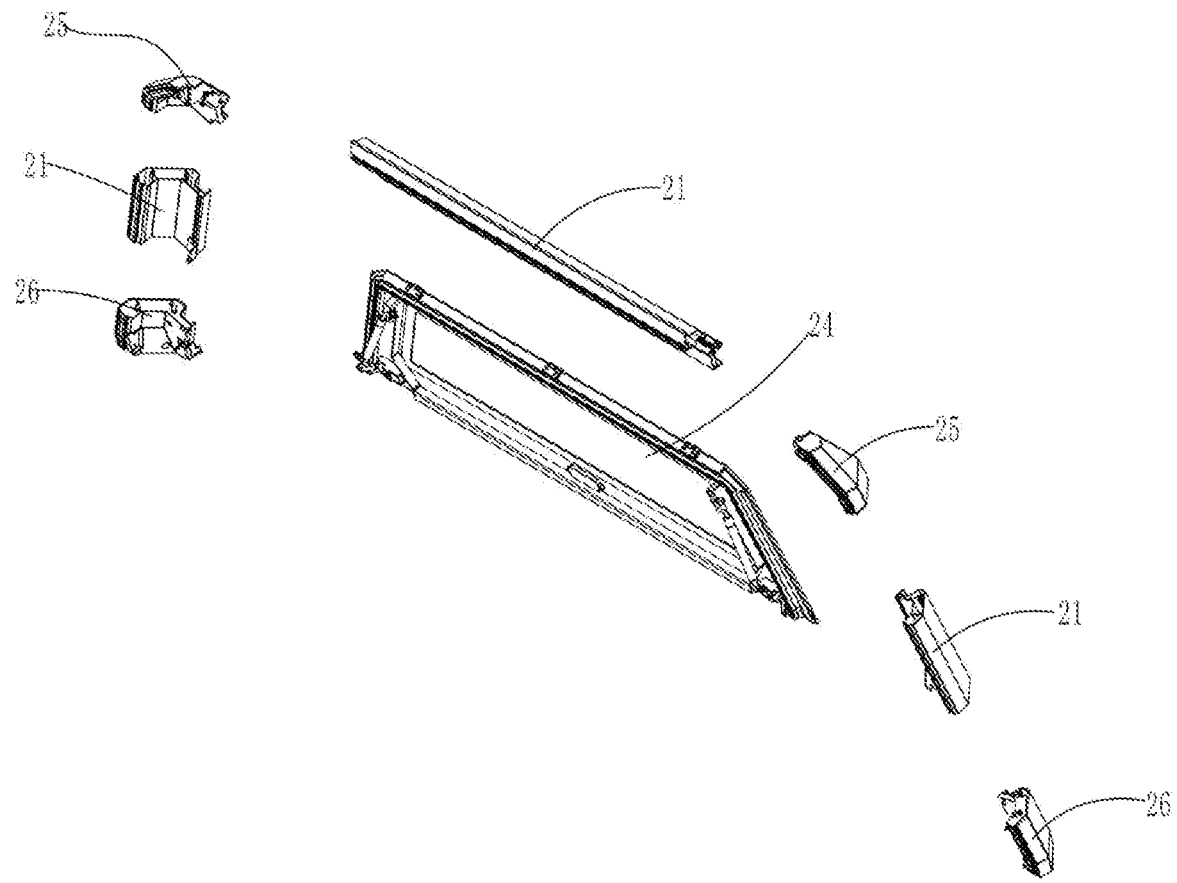
FIG. 14 is a schematic diagram of a first exploded structure of a rear cover of a high-strength lightweight automobile compartment tonneau cover according to a first embodiment of the present disclosure.
Figure 15:
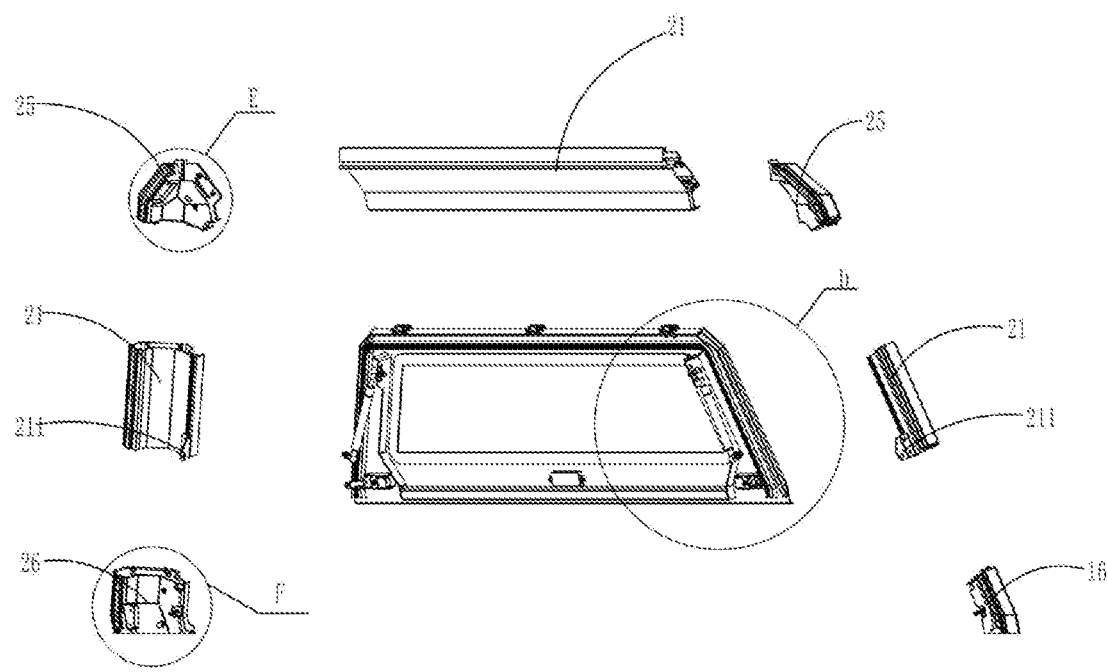
FIG. 15 is a schematic diagram of a second exploded structure of a rear cover of a high-strength lightweight automobile compartment tonneau cover according to a first embodiment of the present disclosure.

As shown in FIG. 13 to FIG. 15, in this embodiment of the present disclosure, the rear cover 20 includes a rear panel 24 and a rear panel frame body surrounding the rear panel 24; the rear panel frame body includes three rear panel profiles 21, two rear panel upper end sockets 25, and two rear panel lower end sockets 26; the three rear panel profiles 21 are respectively arranged at a top and two sides of the rear panel 24; the two rear panel upper end sockets 25 and the two rear panel lower end sockets 26 are respectively arranged at four corners of the rear panel 24; the first profile 31 on a second side of the first side cover 30 collides with the rear panel profile 21 on a first side of the rear cover 20; a waterproof rubber strip 32 is arranged in a gap between the rear panel profile 21 and the first profile 31 which collide with each other; the first upper end socket 36 and the first lower end socket 37 on the second side of the first side cover 30 are respectively connected to the rear panel upper end sockets 25 and the rear panel lower end sockets 26 on the first side of the rear cover 20; the rear panel 24 is rotatably connected to the rear panel profile 21 at the top of the rear cover 20; and a bottom of the rear panel 24 is detachably connected to a rear bottom waterproof rubber strip 291. The two rear panel profiles 21 on the two sides of the rear cover 20 are provided with third spring fixing brackets 211.

Figure 16:
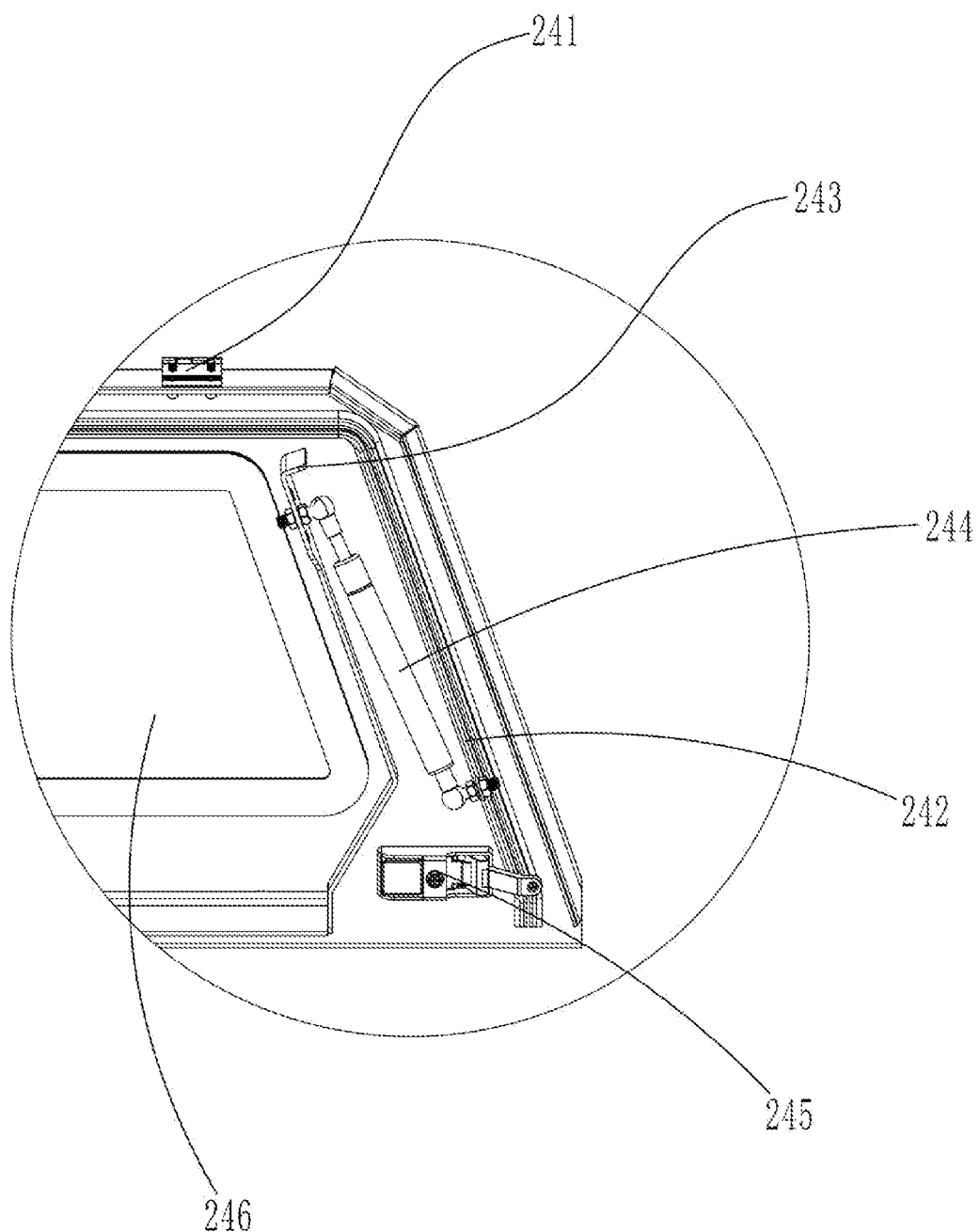
FIG. 16 is a schematic structural diagram of a region D in FIG. 15.

As shown in FIG. 16, in this embodiment of the present disclosure, the rear panel 24 is provided with a rear panel rotating hinge 241, a rear panel spring fixing bracket 243, a rear panel gas spring 244, a rear panel waterproof rubber strip 242, a rear panel push lock 245, and rear panel glass 246.

Figure 17:
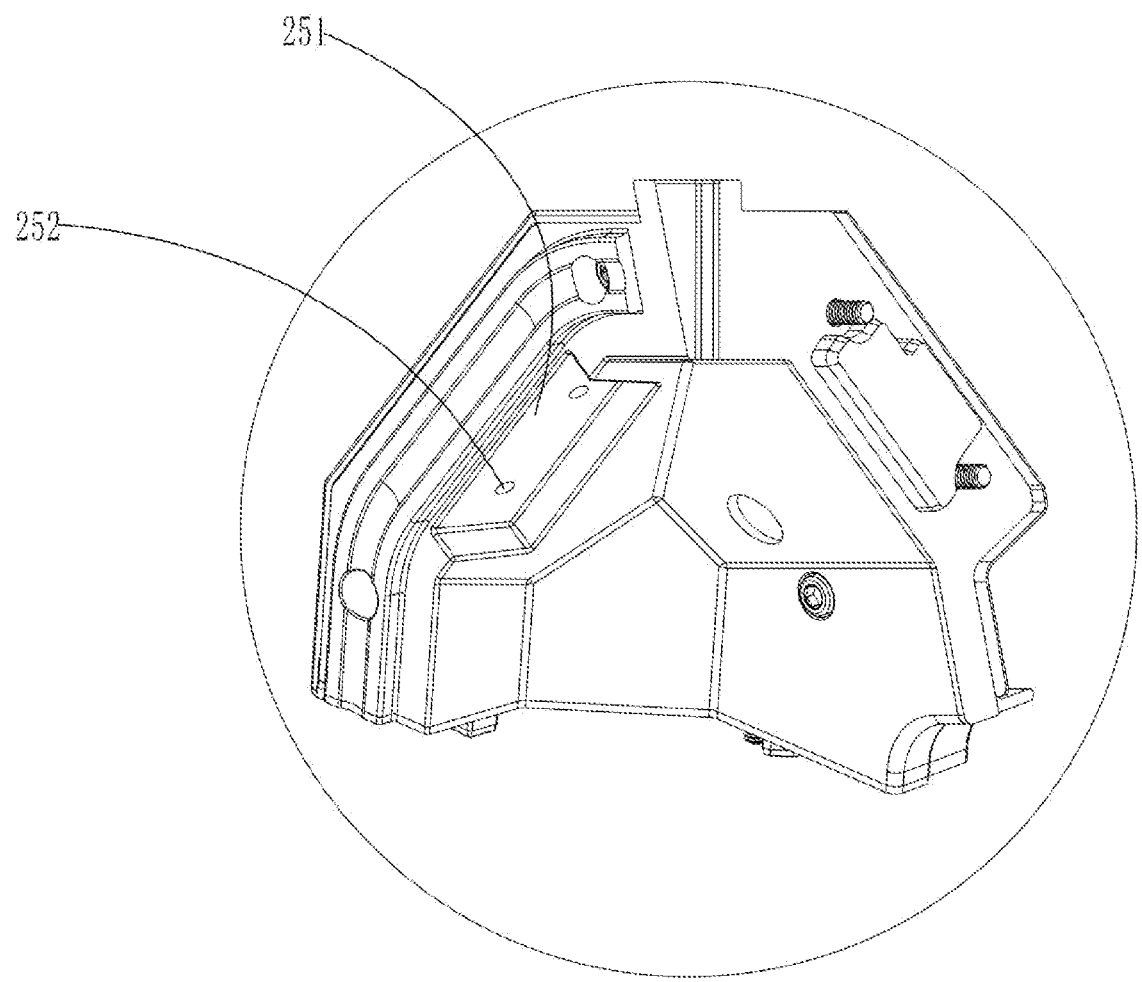
FIG. 17 is a schematic structural diagram of a region E in FIG. 15.

As shown in FIG. 17, in this embodiment of the present disclosure, the rear panel upper end socket 25 includes a first rear panel end socket recess 251 and a first rear panel fixing threaded hole 252.

Figure 18:
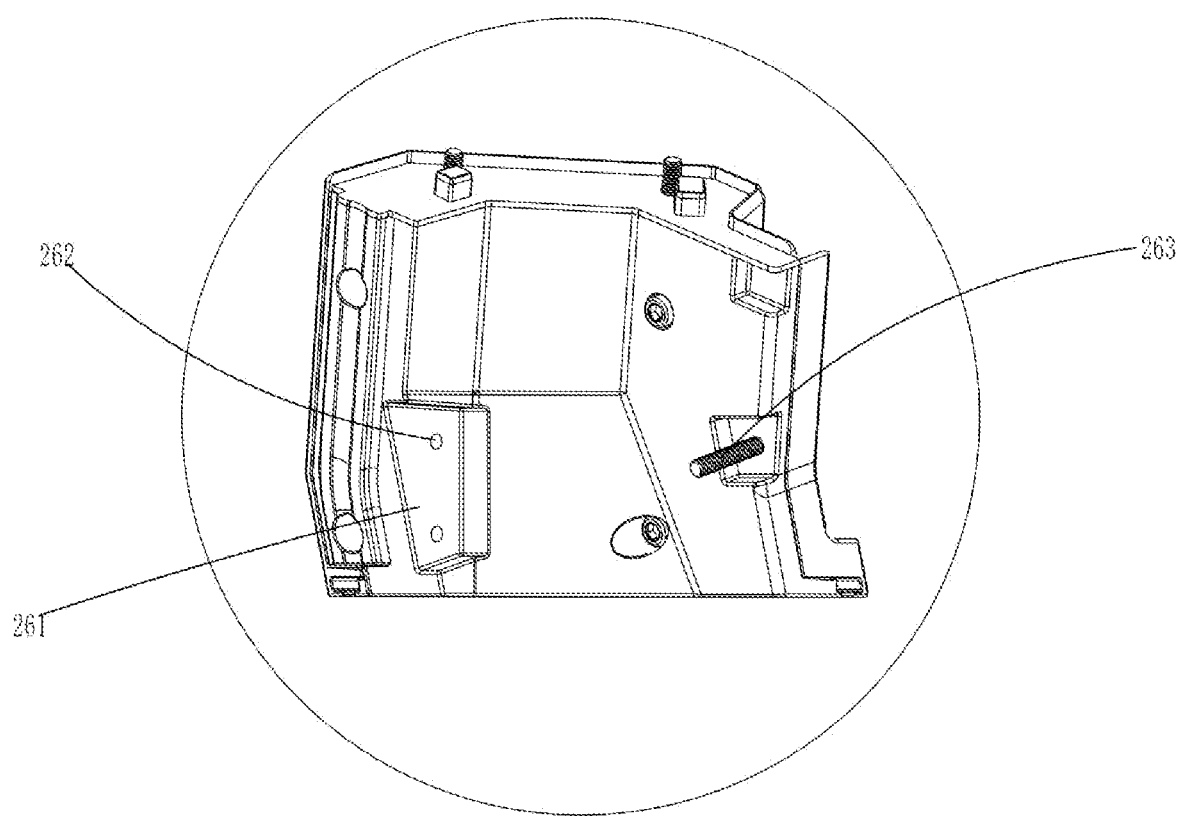
FIG. 18 is a schematic structural diagram of a region F in FIG. 15.
Figure 19:
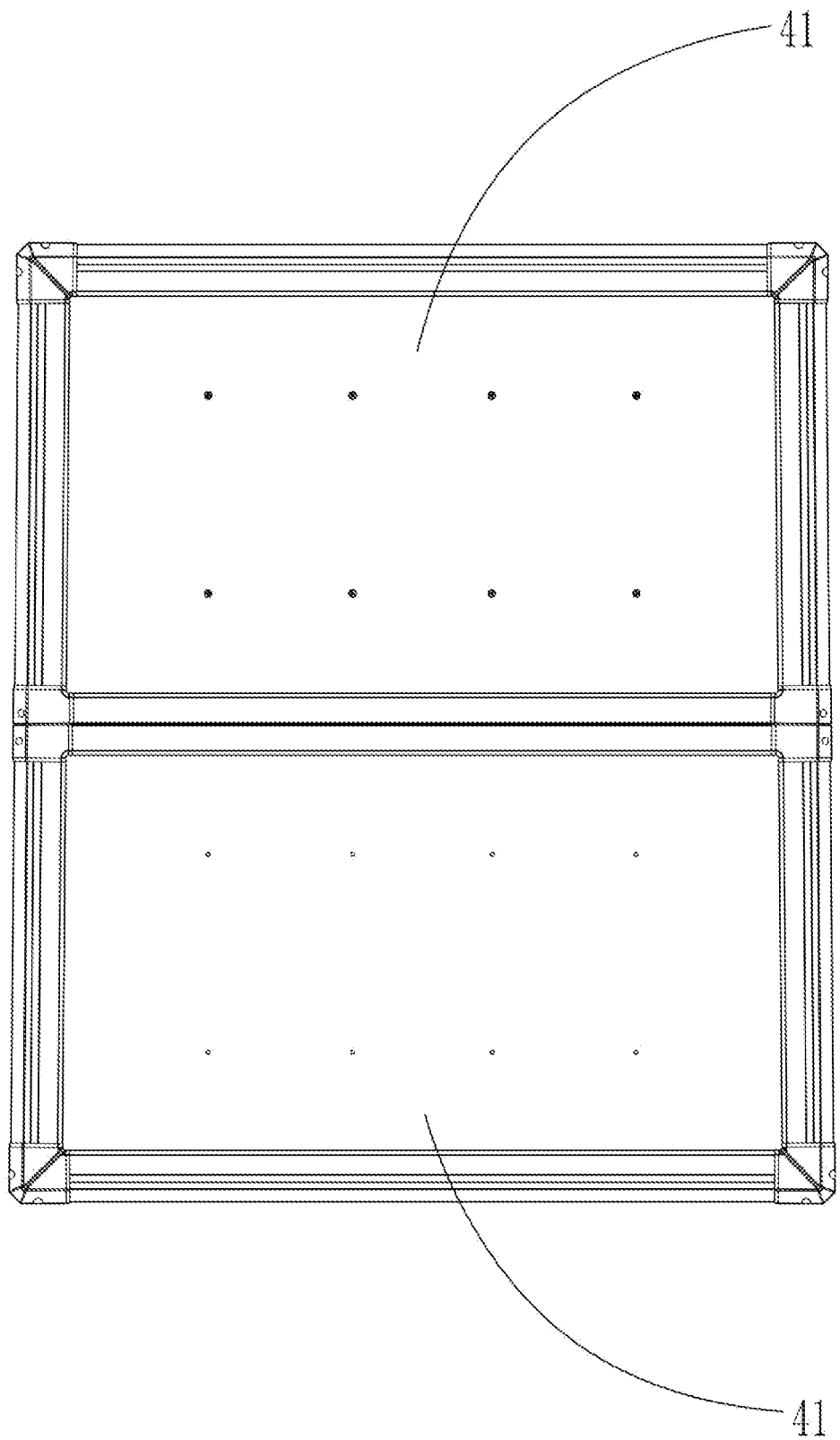
FIG. 19 is a schematic structural diagram of a top surface of a top cover of a high-strength lightweight automobile compartment tonneau cover according to a first embodiment of the present disclosure.
Figure 20:
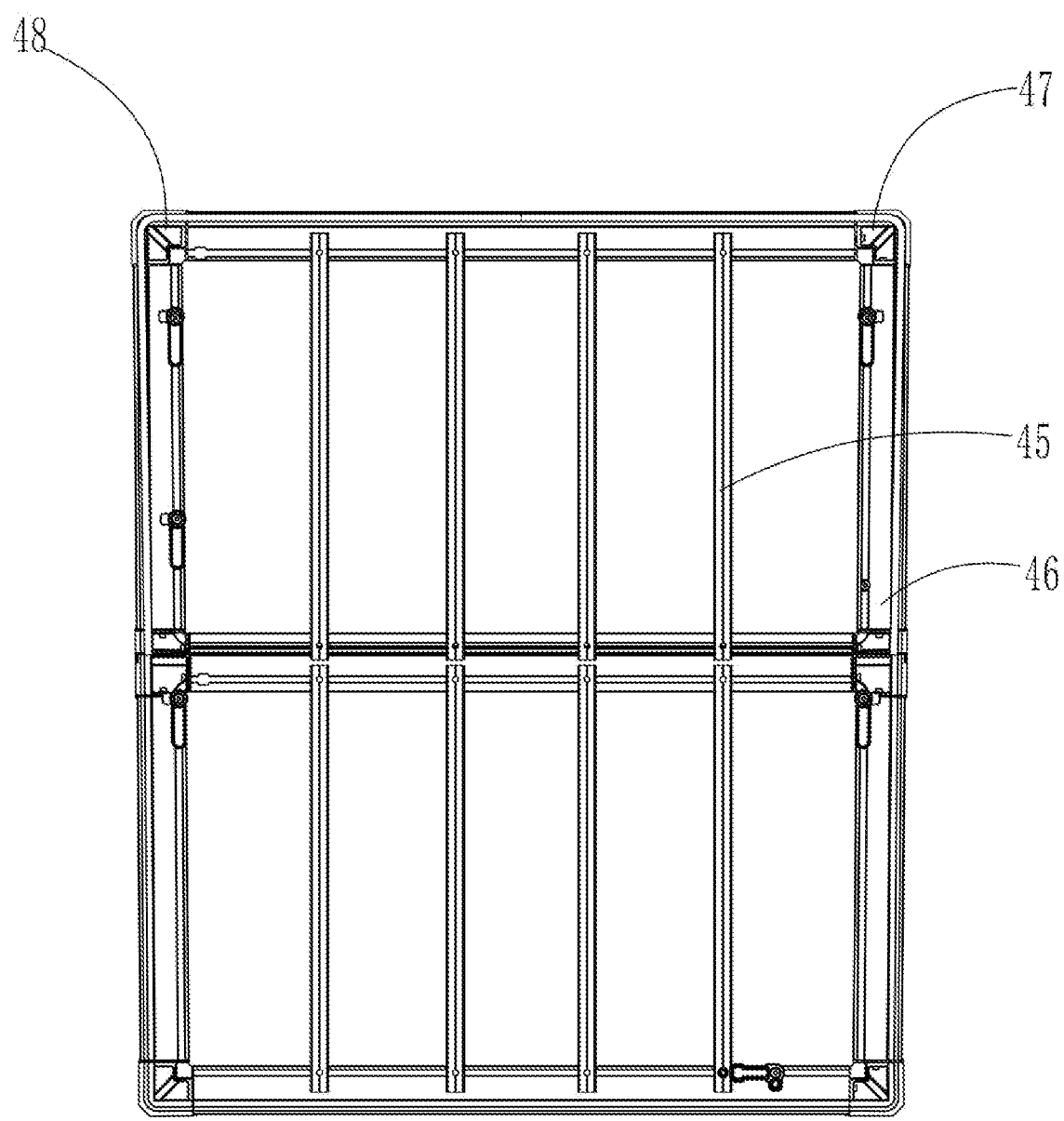
FIG. 20 is a schematic structural diagram of a first bottom surface of a top cover of a high-strength lightweight automobile compartment tonneau cover according to a first embodiment of the present disclosure.
Figure 21:
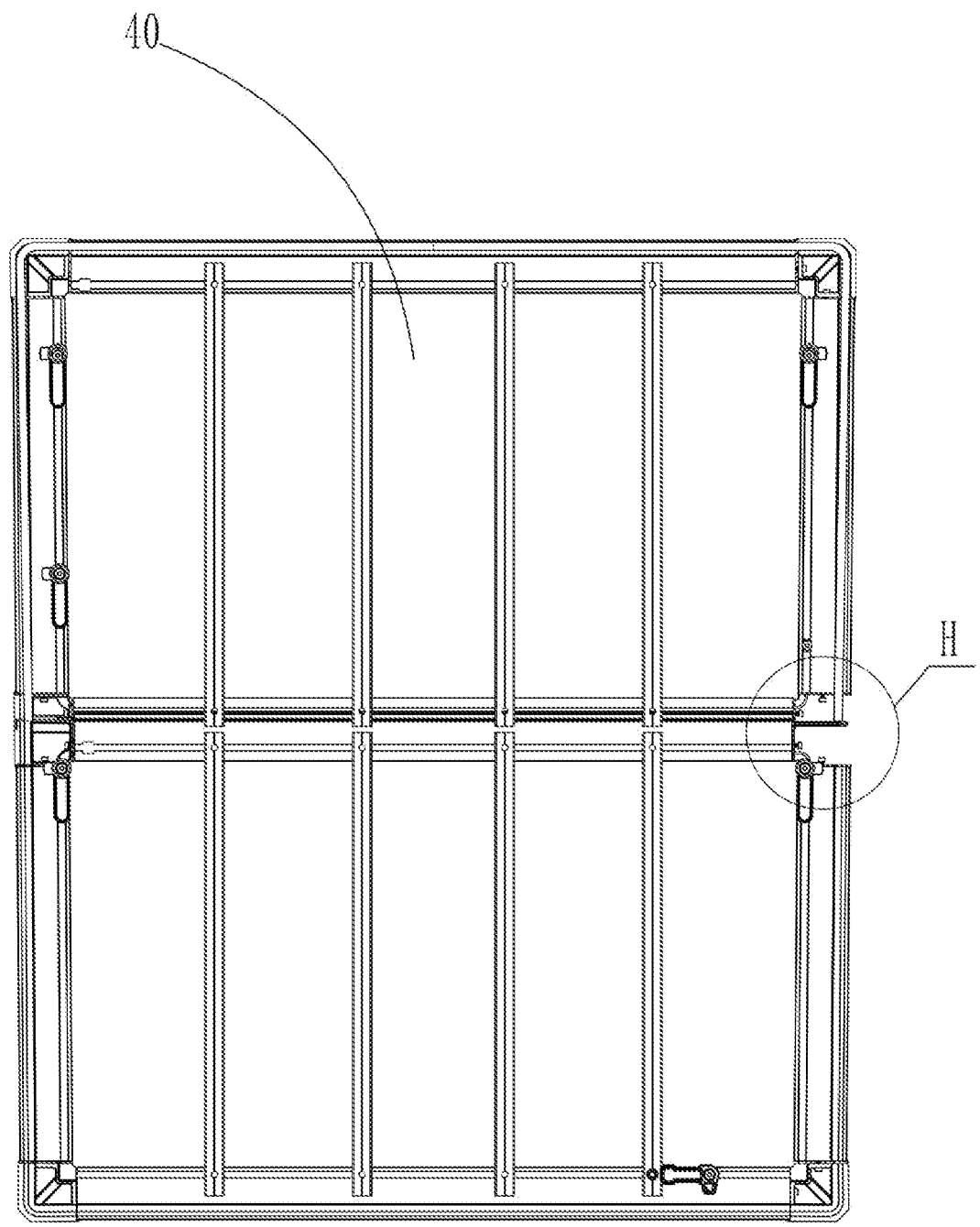
FIG. 21 is a schematic structural diagram of a second bottom surface of a top cover of a high-strength lightweight automobile compartment tonneau cover according to a first embodiment of the present disclosure.
Figure 22:
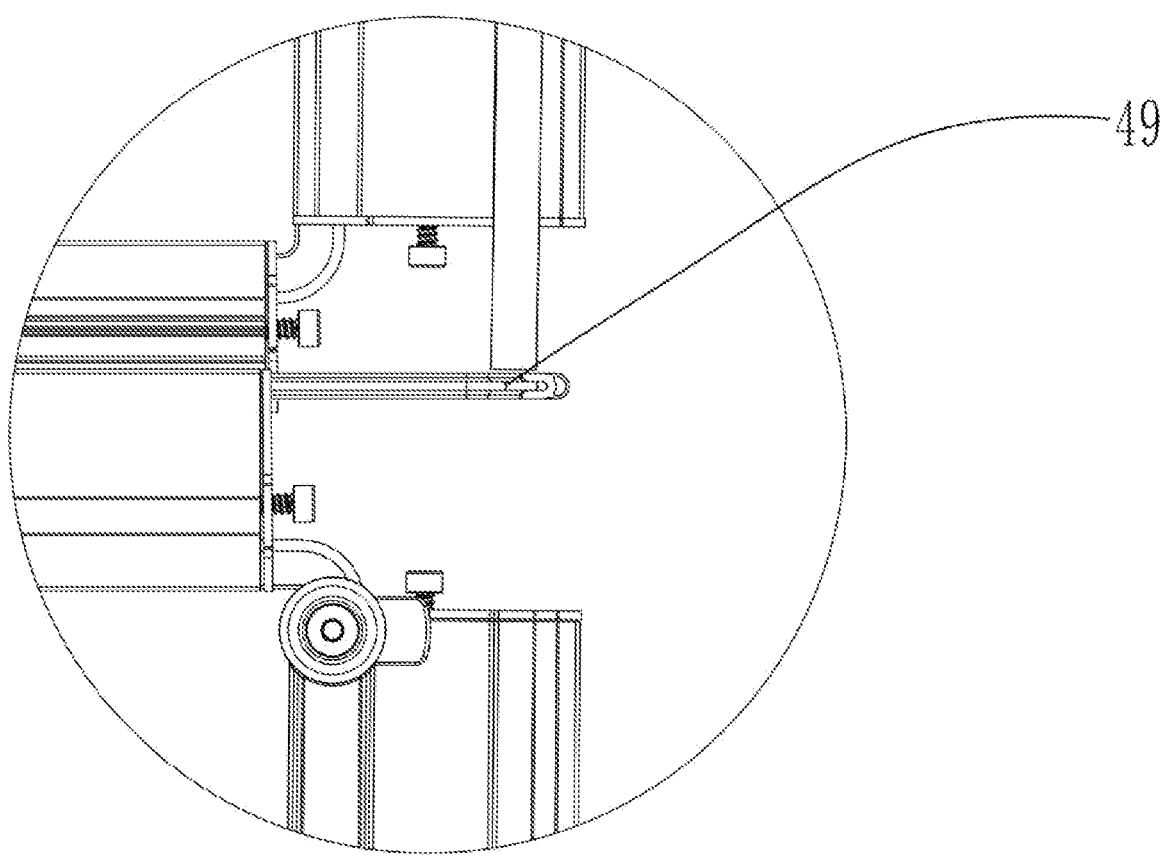
FIG. 22 is a schematic structural diagram of a region H in FIG. 21.
Figure 23:
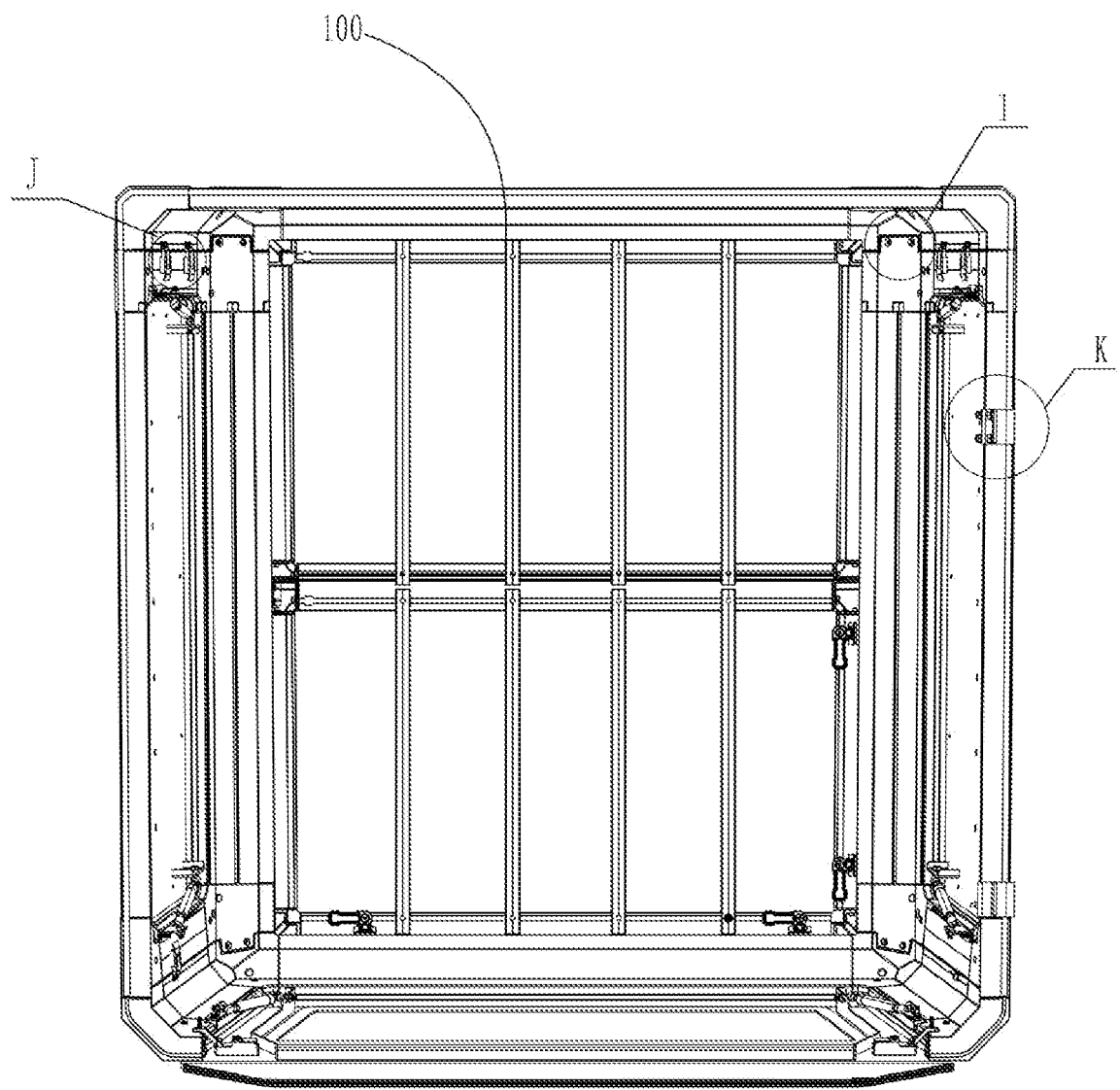
FIG. 23 is a schematic structural diagram of a bottom surface of a high-strength lightweight automobile compartment tonneau cover according to a first embodiment of the present disclosure.
Figure 24:
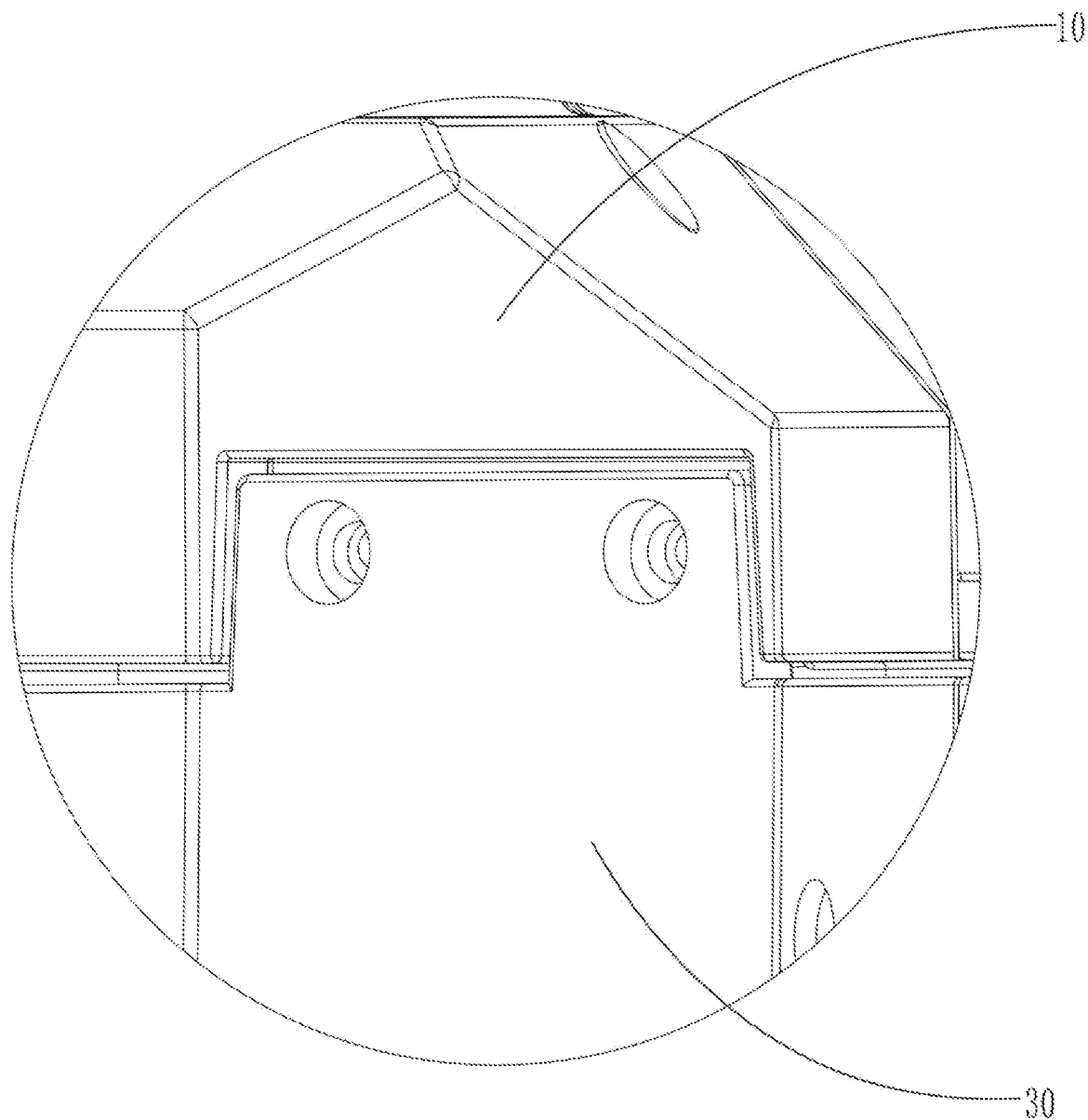
FIG. 24 is a schematic structural diagram of a region I in FIG. 21.

As shown in FIG. 18, in this embodiment of the present disclosure, the rear panel lower end socket 26 includes a second rear panel end socket recess 261, a second rear panel fixing threaded hole 262, and a rear panel push lock fixing bolt 263.

As shown in FIG. 19 to FIG. 24, in this embodiment of the present disclosure, the top cover 40 includes a plurality of crossbeams 45 and at least two sub covers 41; the at least two sub covers 41 are connected to the plurality of crossbeams; and a top internal rubber strip 49 is arranged between two adjacent sub covers 41. Each sub cover 41 includes a top panel frame body, and the top panel frame body includes a top panel profile 46 and a top panel end socket 47.

Figure 25:
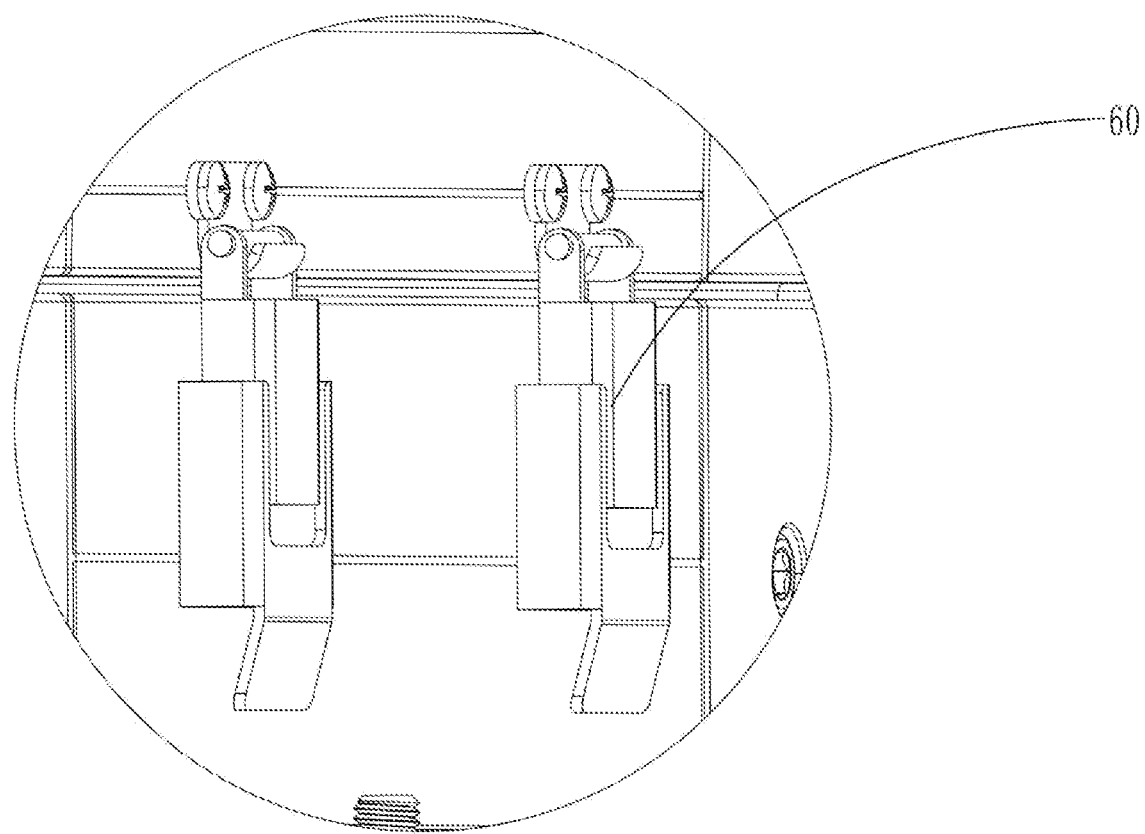
FIG. 25 is a schematic structural diagram of a region J in FIG. 21.

As shown in FIG. 25, in this embodiment of the present disclosure, the first profile 31 and the front panel profile 12 which collide with each other are connected by a buckle 60.

The top cover 40, the front cover 10, the first side cover 30, the rear cover 20, and the second side cover 50 are respectively fixed by preset buckles. After fastened, the top cover 40, the front cover 10, the first side cover 30, the rear cover 20, and the second side cover 50 are pre-tightened. The waterproof rubber strip 32 for gap is mounted on a side part and forms a closed state at a joint after being fastened, which plays a waterproof role. The tightening is achieved through eight screws. The front, rear, left, and right sides are fastened into a frame. The waterproof rubber strip 32 for gap is mounted in T-shaped sliding chutes at front and rear ends of the side profile and end sockets. Matching concave bosses are arranged at front and rear parts to tighten the front and rear sides through the buckles and the mounting screws.

Figure 26:
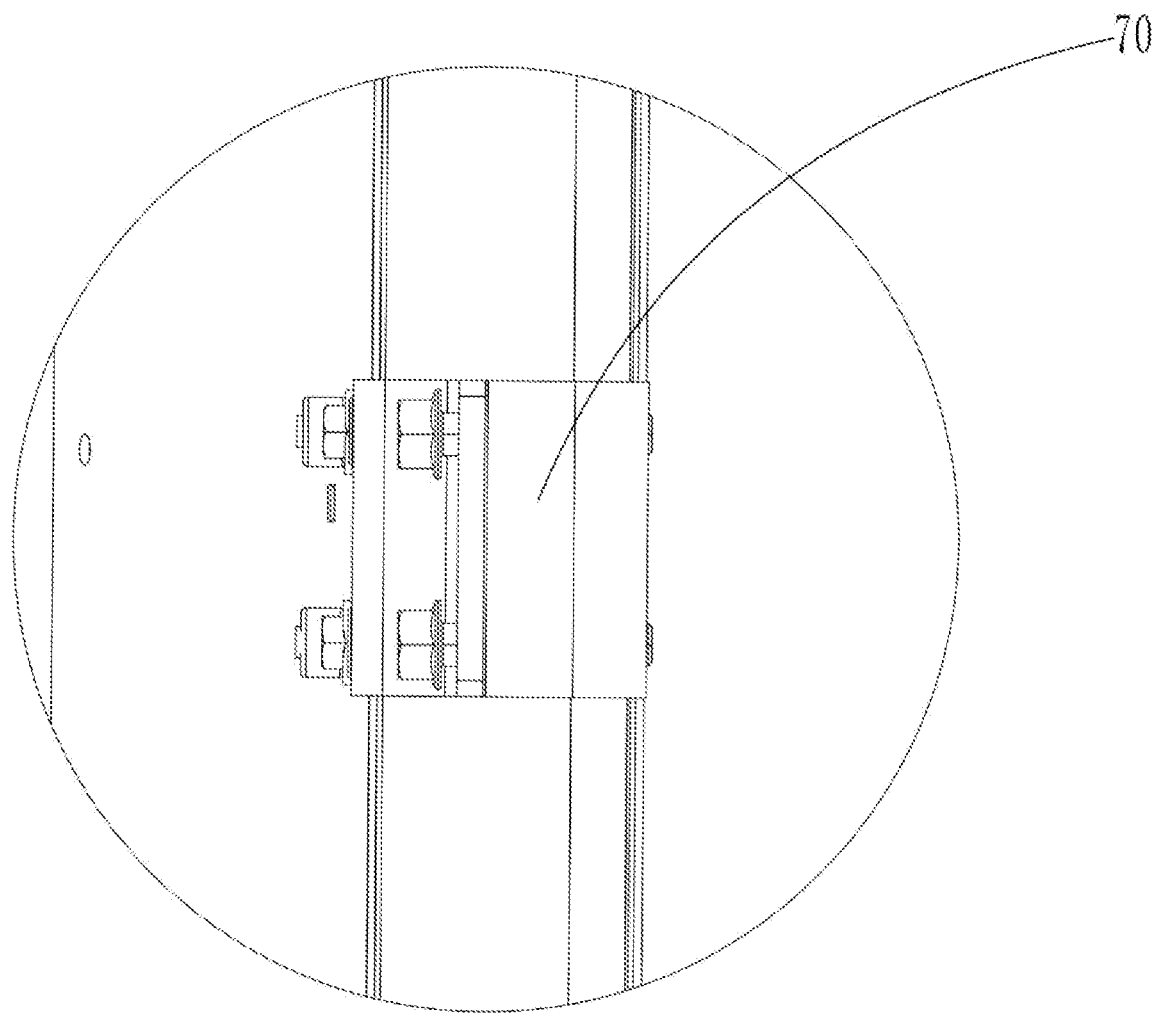
FIG. 26 is a schematic structural diagram of a region K in FIG. 21.

As shown in FIG. 26, in this embodiment of the present disclosure, mounting clips 70 are arranged at the bottom of the front cover 10, the bottom of the first side cover 30, the bottom of the rear cover 20, and the bottom of the second side cover 50; and the mounting clips 70 are used for connecting the front cover 10, the first side cover 30, the rear cover 20, and the second side cover 50 to an automobile body.

Figure 27:
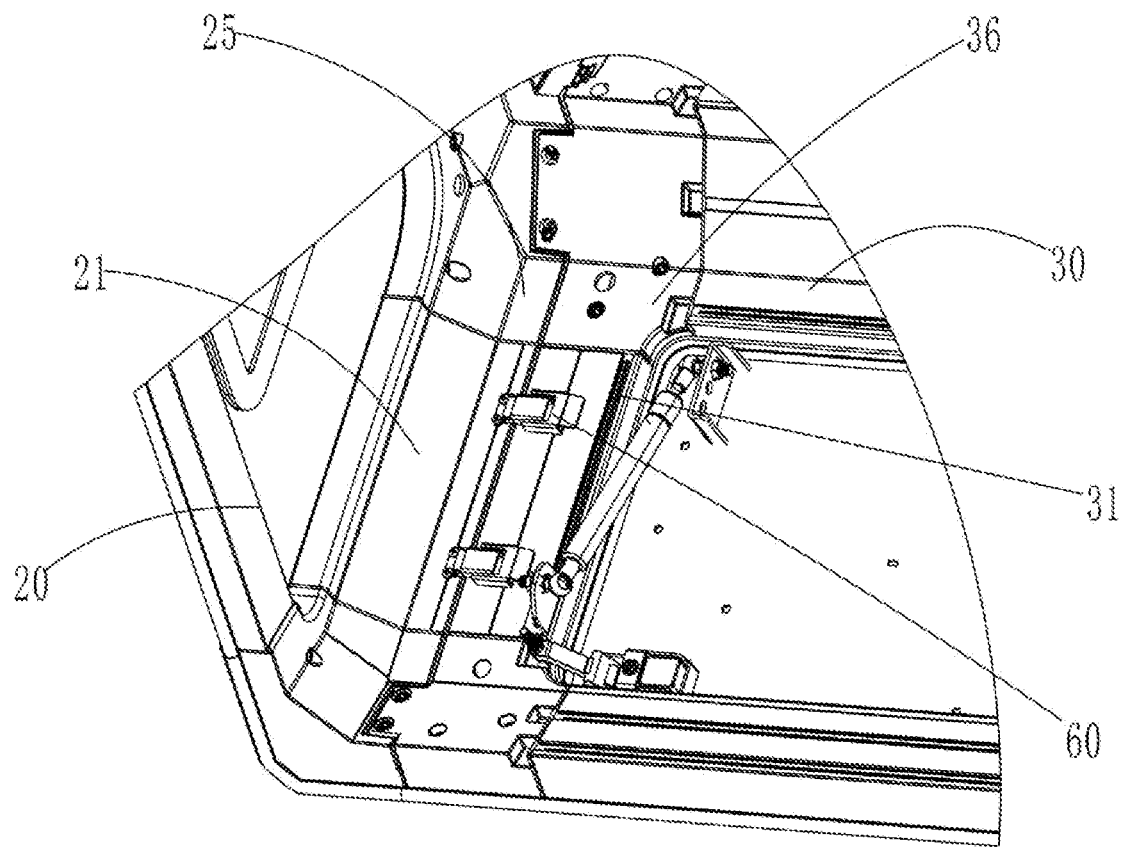
FIG. 27 is a first schematic structural diagram of an interior of a high-strength lightweight automobile compartment tonneau cover according to a first embodiment of the present disclosure.

As shown in FIG. 27, in this embodiment of the present disclosure, the first upper end socket 36 on the second side of the first side cover 30 is connected to the rear panel upper end socket 25 on the first side of the rear cover 20. The first profile 31 on the second side of the first side cover 30 collides with the rear panel profile 21 on the first side of the rear cover 20, and the waterproof rubber strip 32 is arranged in a gap between the rear panel profile 21 and the first profile 31 which collide with each other.

Figure 28:
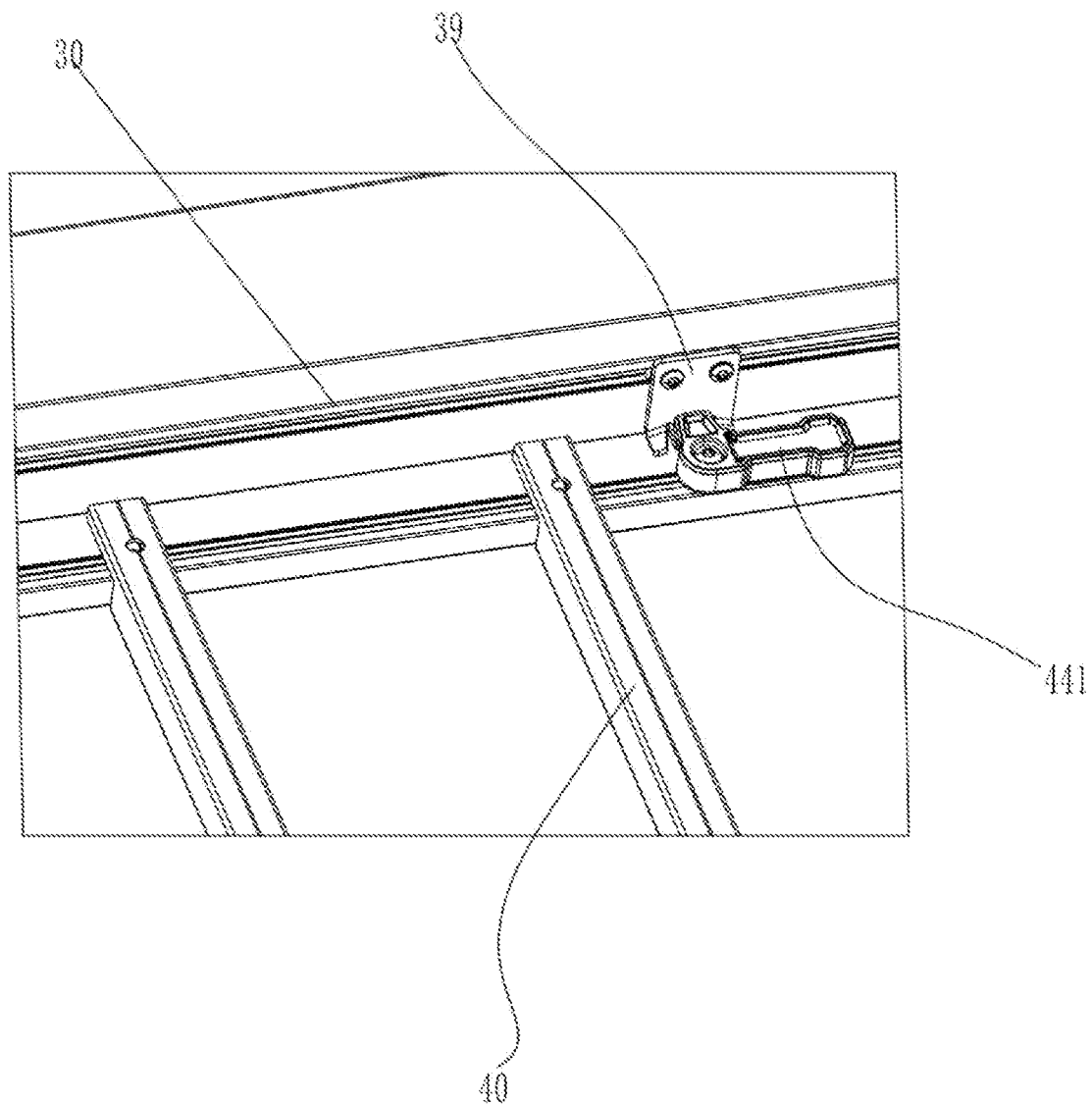
FIG. 28 is a second schematic structural diagram of an interior of a high-strength lightweight automobile compartment tonneau cover according to a first embodiment of the present disclosure.
Figure 29:
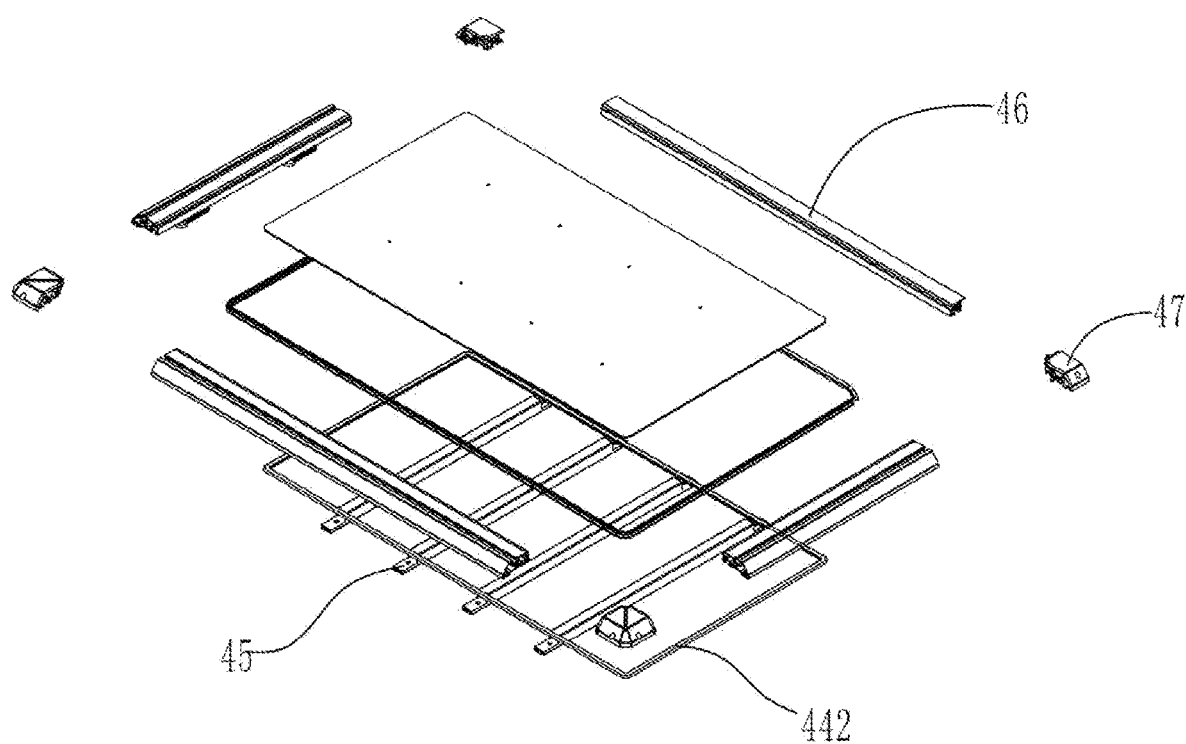
FIG. 29 is a schematic structural diagram of a sub cover of a high-strength lightweight automobile compartment tonneau cover according to a first embodiment of the present disclosure.

As shown in FIG. 28 and FIG. 29, the high-strength lightweight automobile compartment tonneau cover 100 includes a top annular rubber strip 442; one side of the top annular rubber strip 442 is in contact with the top of the front cover 10, the top of the first side cover 30, the top of the rear cover 20, and the top of the second side cover 50 respectively, and the other side of the top annular rubber strip 442 is in contact with the top cover 40; the top cover 40 is provided with a rotatable speed wrench 441; the first side cover 30 is provided with a bracket 39; and when the rotatable speed wrench is rotated to be in contact with the bracket 39, the bracket 39 is connected to the speed wrench, thereby connecting the top cover 40 with the first side cover 30 together.

Figure 30:
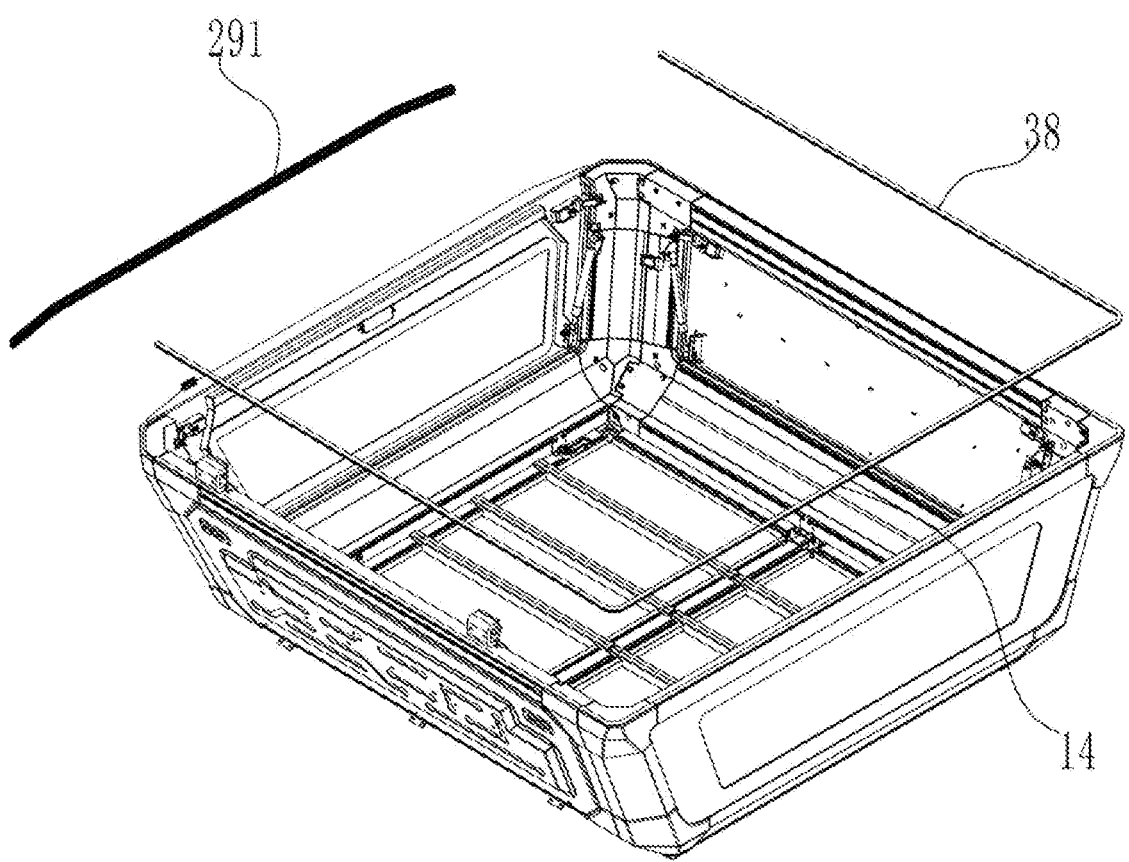
FIG. 30 is a schematic structural diagram when a high-strength lightweight automobile compartment tonneau cover is flipped according to a first embodiment of the present disclosure.
Figure 31:
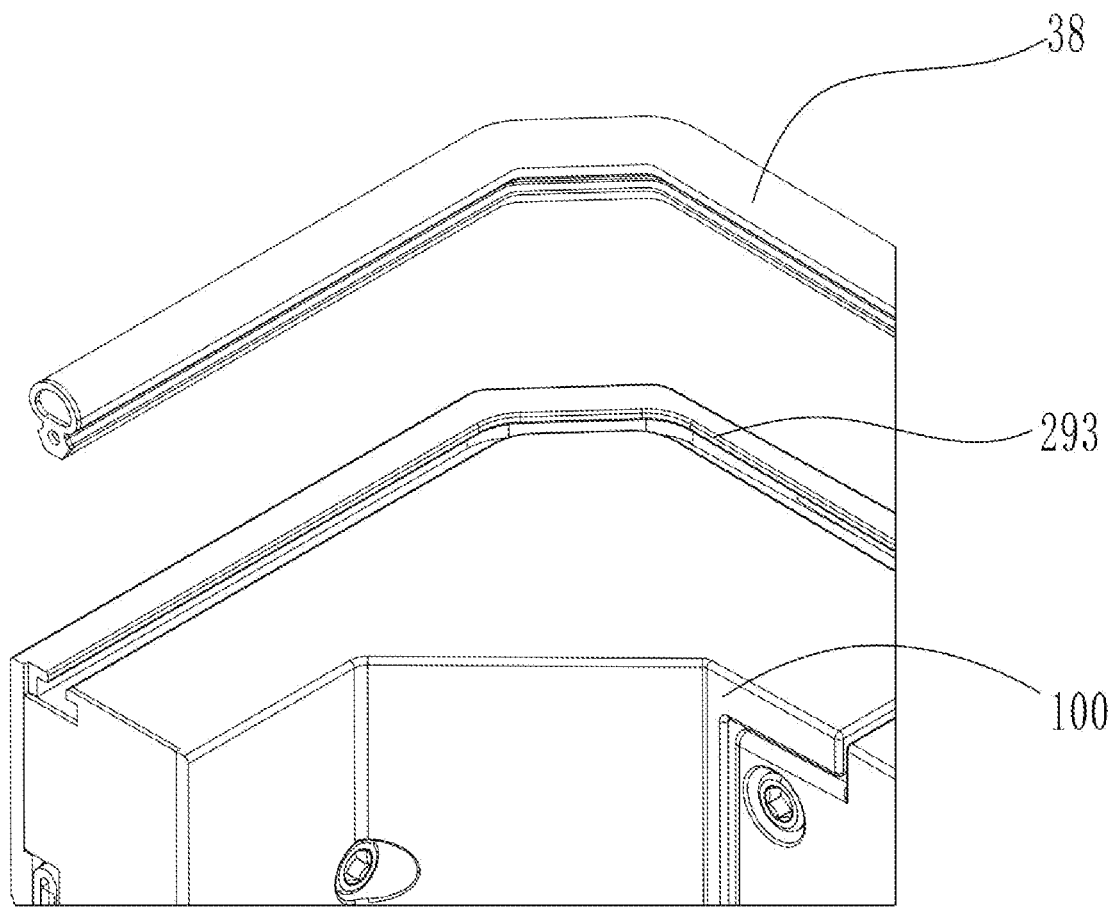
FIG. 31 is a schematic structural diagram of a groove and a bottom waterproof rubber strip in a high-strength lightweight automobile compartment tonneau cover according to a first embodiment of the present disclosure.

As shown in FIG. 30 and FIG. 31, bottoms of the front cover 10, the rear cover 20, the first side cover 30, and the second side cover 50 are provided with grooves 293; and the front bottom waterproof rubber strip 14, the rear bottom waterproof rubber strip 291, and the side bottom waterproof rubber strip 38 are clamped in the grooves 293.

The top annular rubber strip 442 plays a waterproof role through the gravity. At least two or more top annular rubber strips are abutted. The number of the top annular rubber strips changes according to different lengths. Grooves are arranged in the front and rear side profiles. An L-shaped bracket fixed by nuts can slide into the grooves, and the speed wrench is fixed to a sliding chute below the top through a screw. The speed wrench is in a loose state when locked and can rotate around the screw. When rotated to a bottom of the L-shaped bracket, the speed wrench is pressed to compress the top and the frame. A rubber strip embedding structure is arranged below the top. After the top is tightened with the frame, the waterproof rubber strip is pressed to play a waterproof and anti-looseness role. The speed wrench achieves easy mounting.

The front bottom waterproof rubber strip 14, the rear bottom waterproof rubber strip 291, and the side bottom waterproof rubber strip 38 are mounted and pressed in the grooves around the bottoms of the front part, the rear part, and the side part, and the surrounding rubber pipes are compressed with a plane of a compartment. The tonneau cover is completely fixed inside the compartment by the mounting clips on the inner side.

The mounting clip 70 is made of an aluminum material, is of a U-shaped structure, and has a thread. The profile is located at the bottom of the side panel and is provided with a screw sliding chute. A connection plate is mounted and locked with a screw. The connection plate is made of a sheet metal material and is molded by bending. The connection plate is parallel to a side edge of the automobile. The mounting clips 70 are mounted to a side sheet metal of the automobile and are locked with long screws on an outer side, and the sheet metal, the side edge of the automobile, and the aluminum clips are clamped. The tonneau cover frame is fixed. There are at least four or more groups of mounting clips 70.

Figure 32:
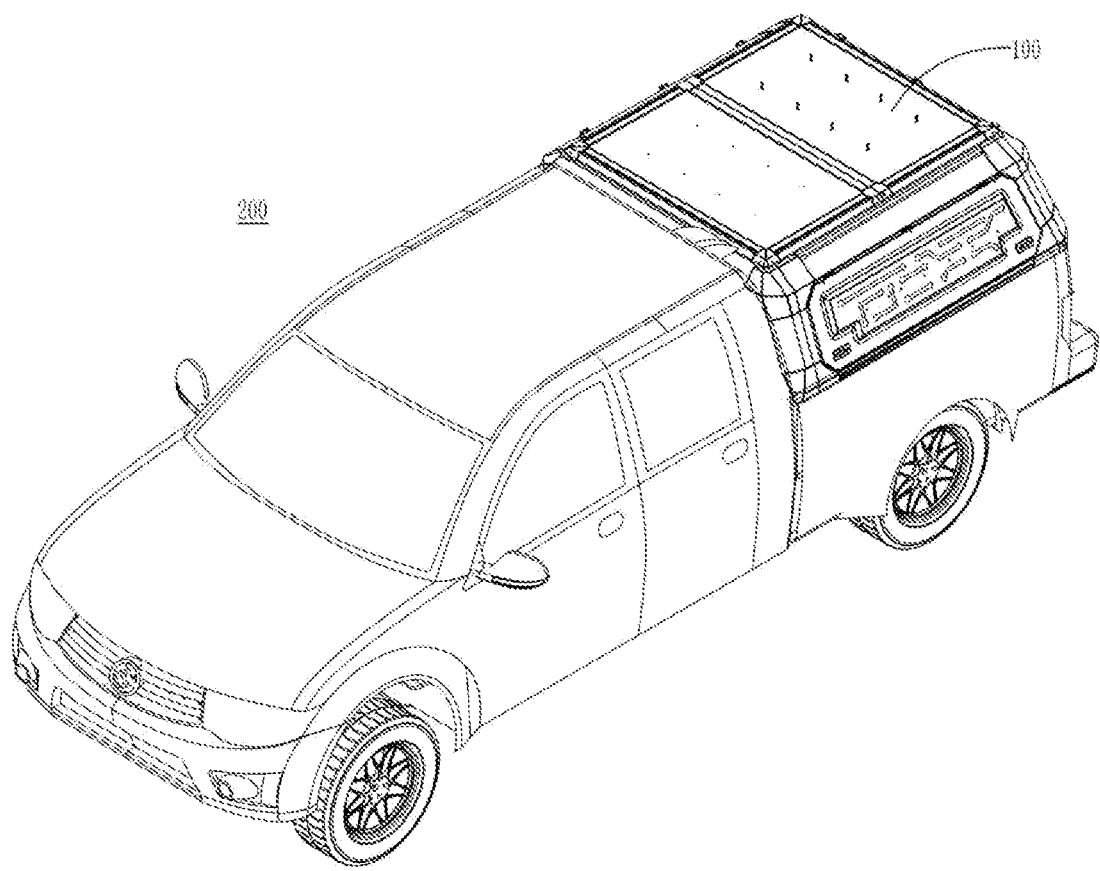
FIG. 32 is a schematic structural diagram of a vehicle according to a first embodiment of the present disclosure.
Figure 33:
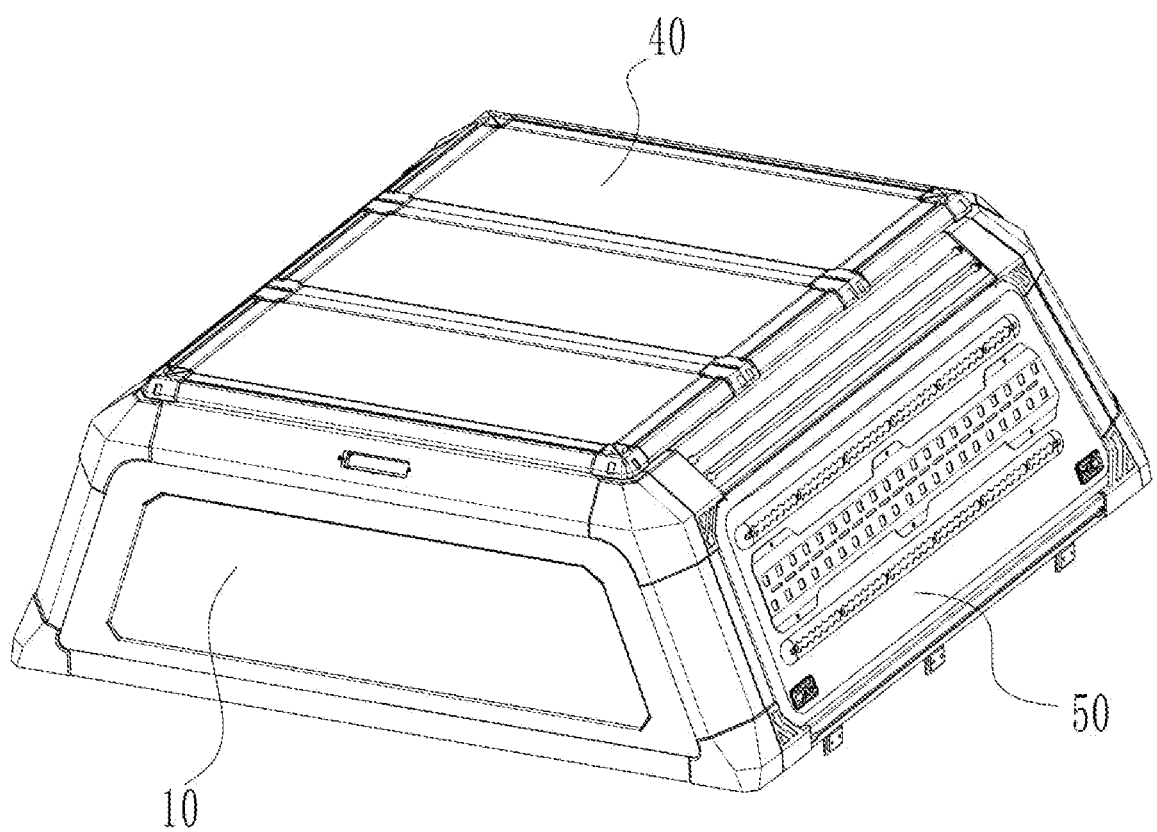
FIG. 33 is a schematic diagram of a three-dimensional structure of a first viewing angle according to a second embodiment of the present disclosure.
Figure 34:
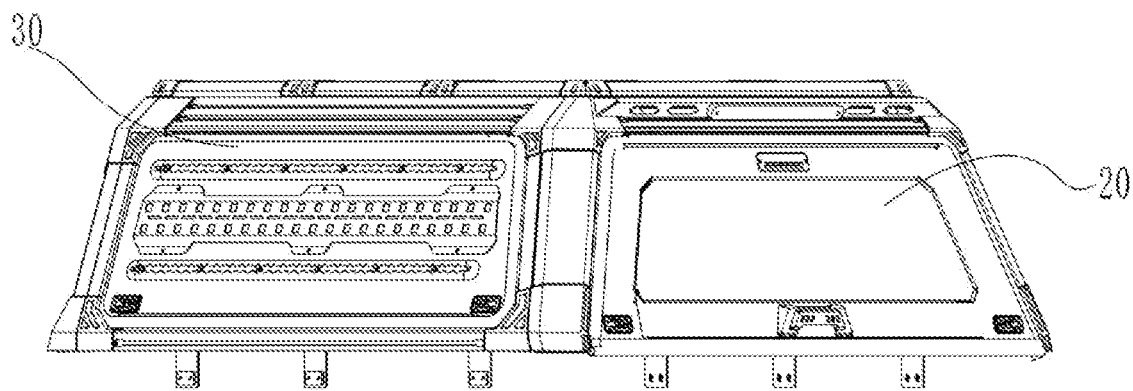
FIG. 34 is a schematic diagram of a three-dimensional structure of a second viewing angle according to a second embodiment of the present disclosure.
Figure 35:
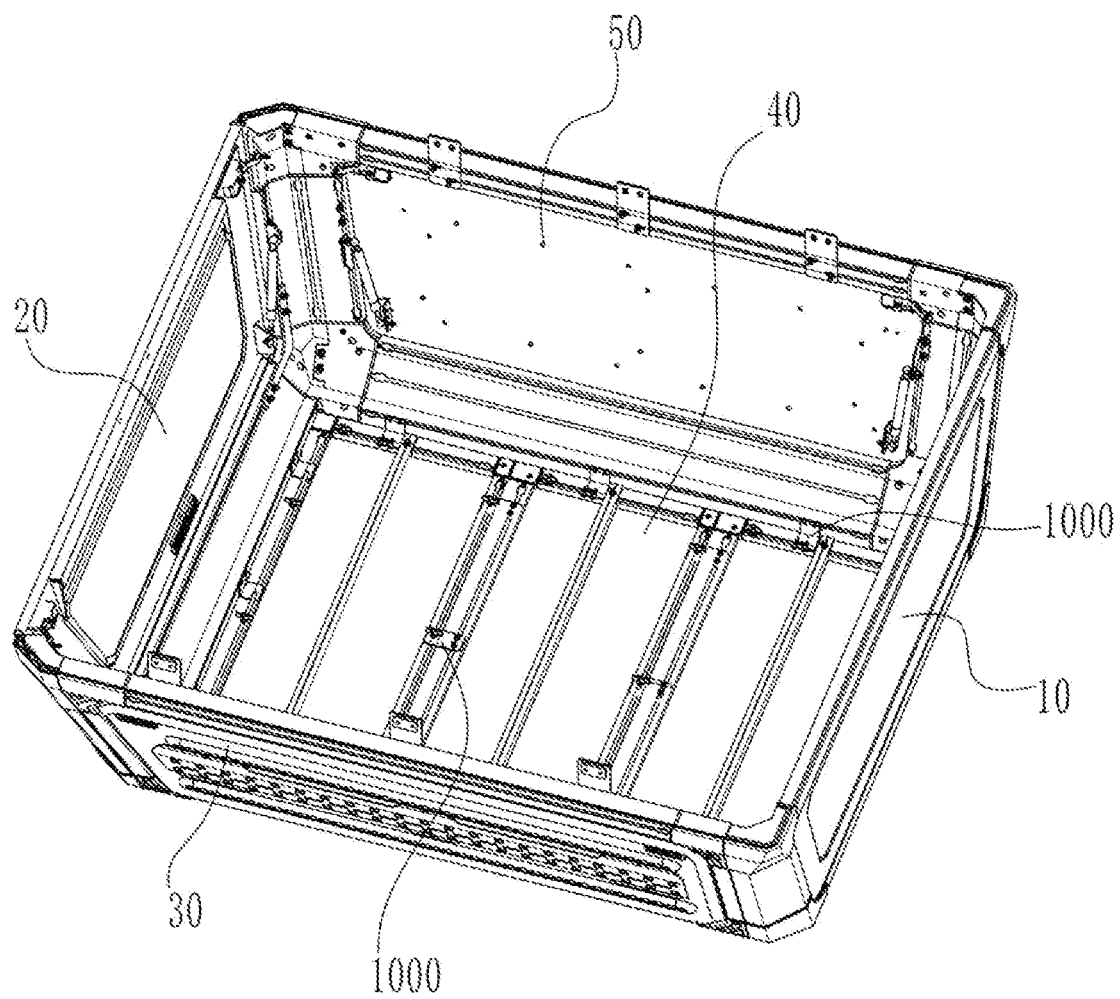
FIG. 35 is a schematic diagram of a three-dimensional structure of a bottom view according to a second embodiment of the present disclosure.
Figure 36:
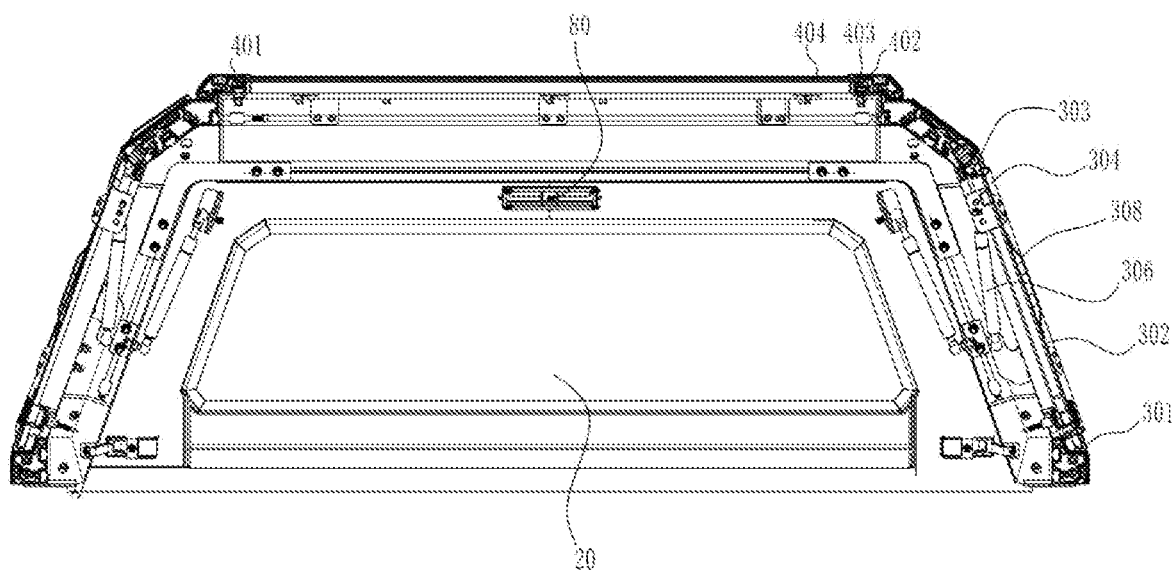
FIG. 36 is a schematic diagram of a sectional structure of a front view according to a second embodiment of the present disclosure.
Figure 37:
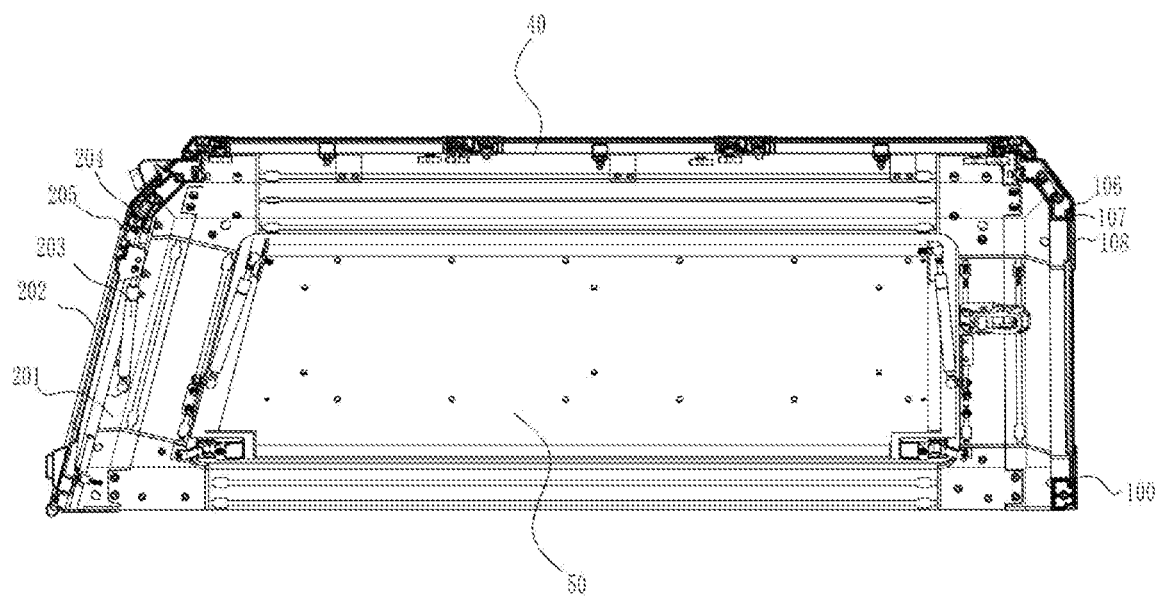
FIG. 37 is a schematic diagram of a sectional structure of a side view according to a second embodiment of the present disclosure.
Figure 38:
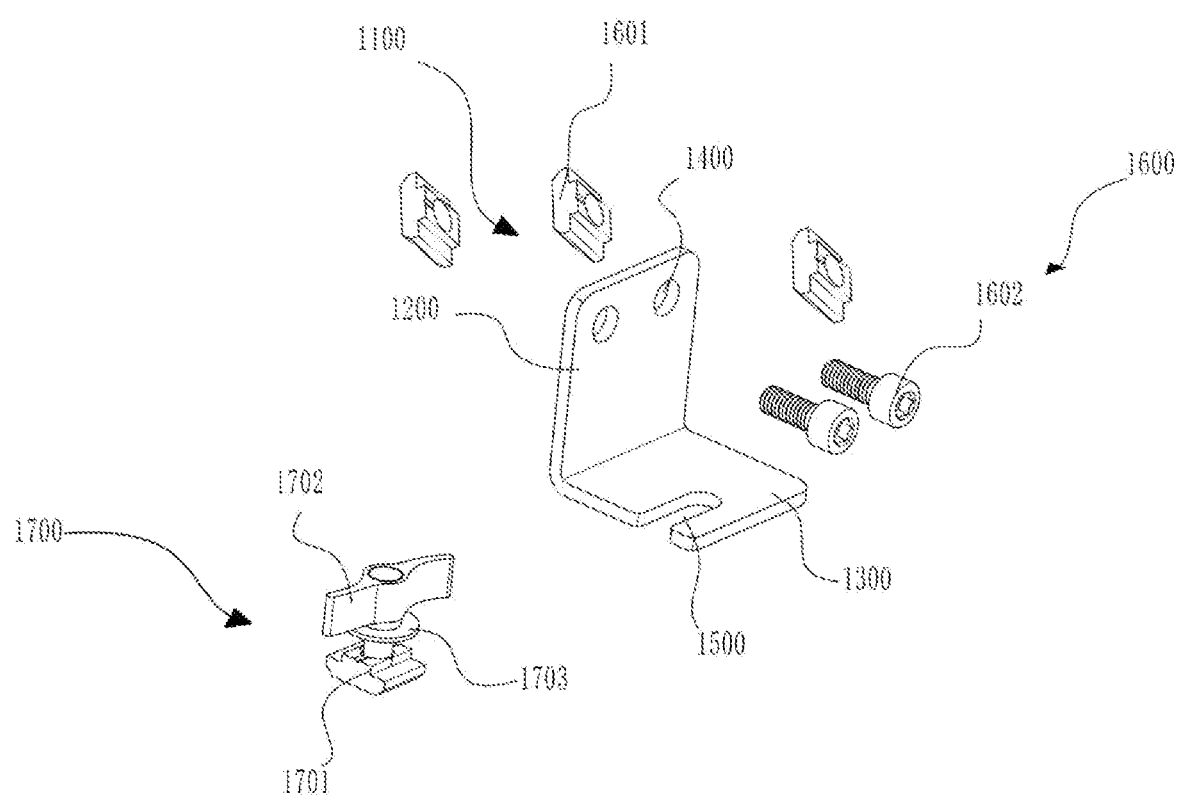
FIG. 38 is a first schematic structural diagram of a quick clamping structure in a second embodiment of the present disclosure.
Figure 39:
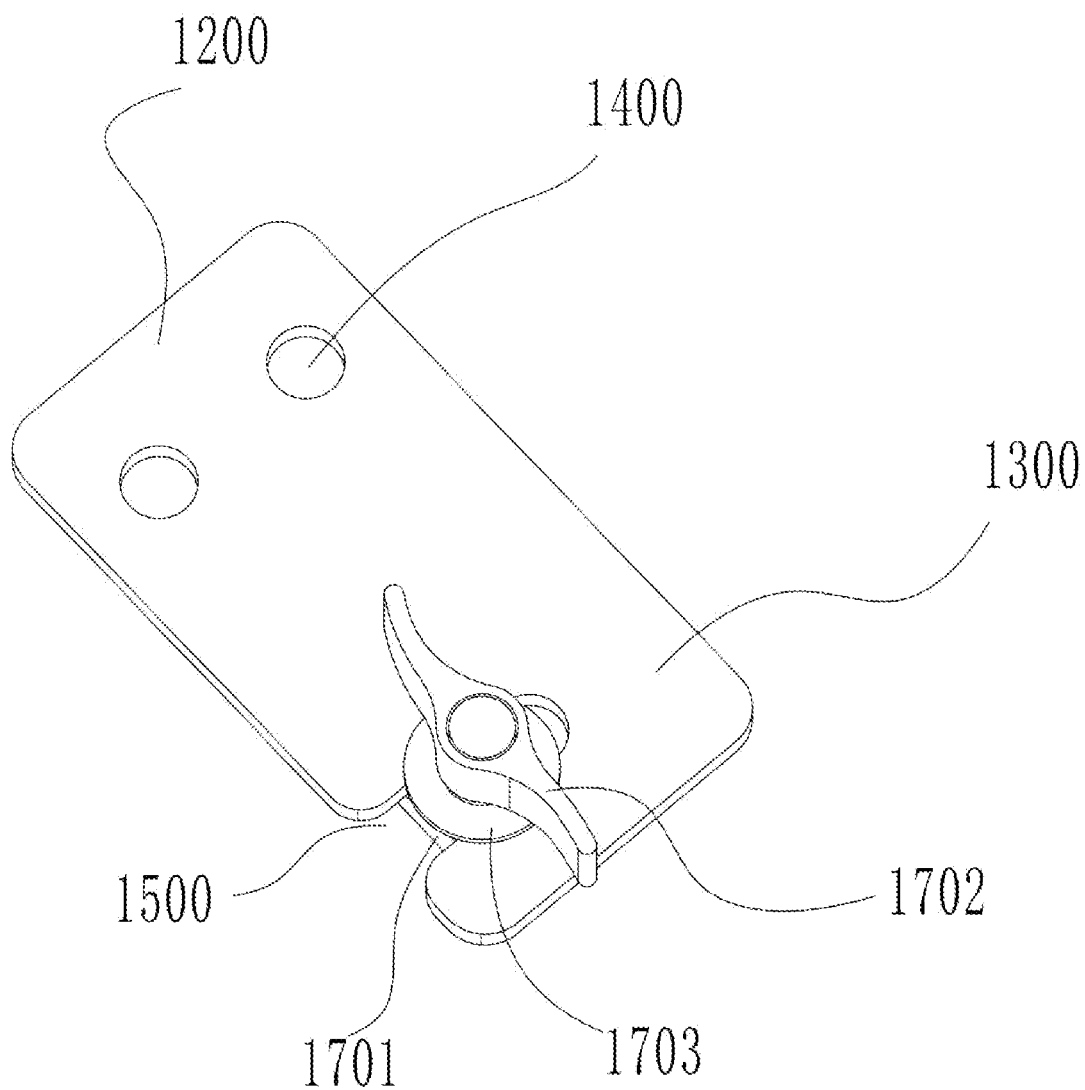
FIG. 39 is a second schematic structural diagram of a quick clamping structure in a second embodiment of the present disclosure.
Figure 40:
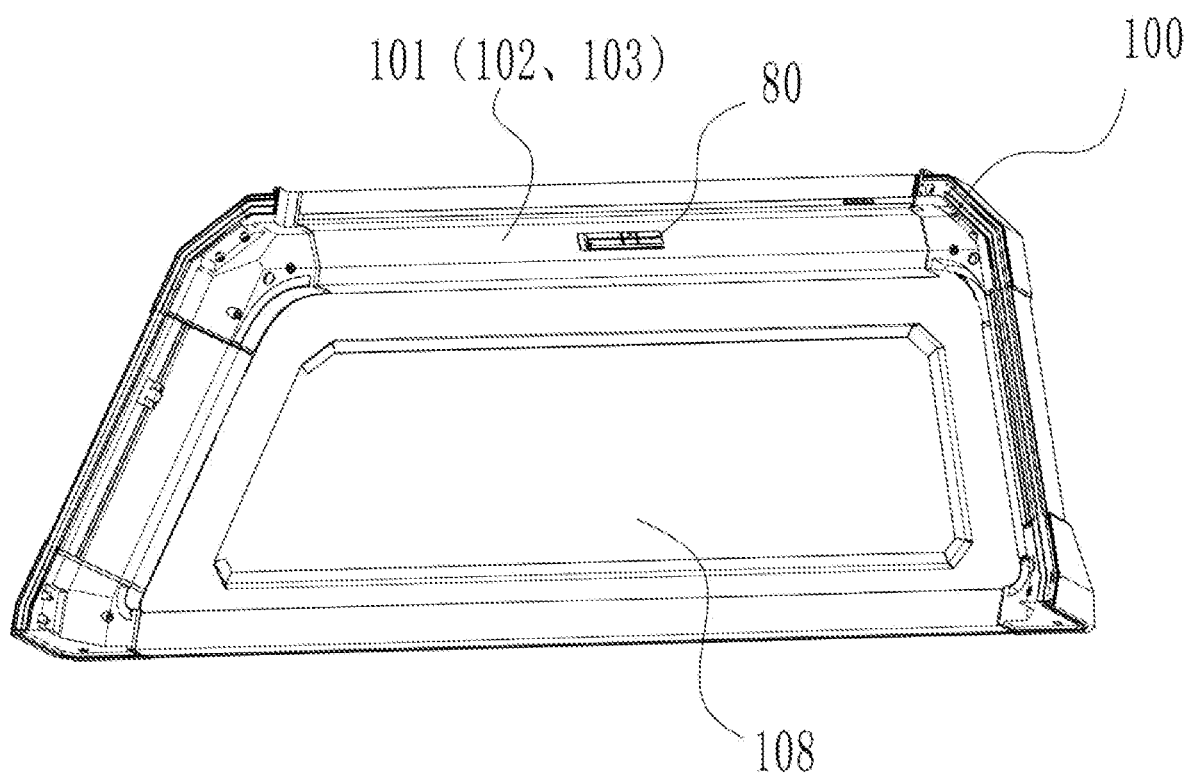
FIG. 40 is a schematic structural diagram of a front cover in a second embodiment of the present disclosure.
Figure 41:
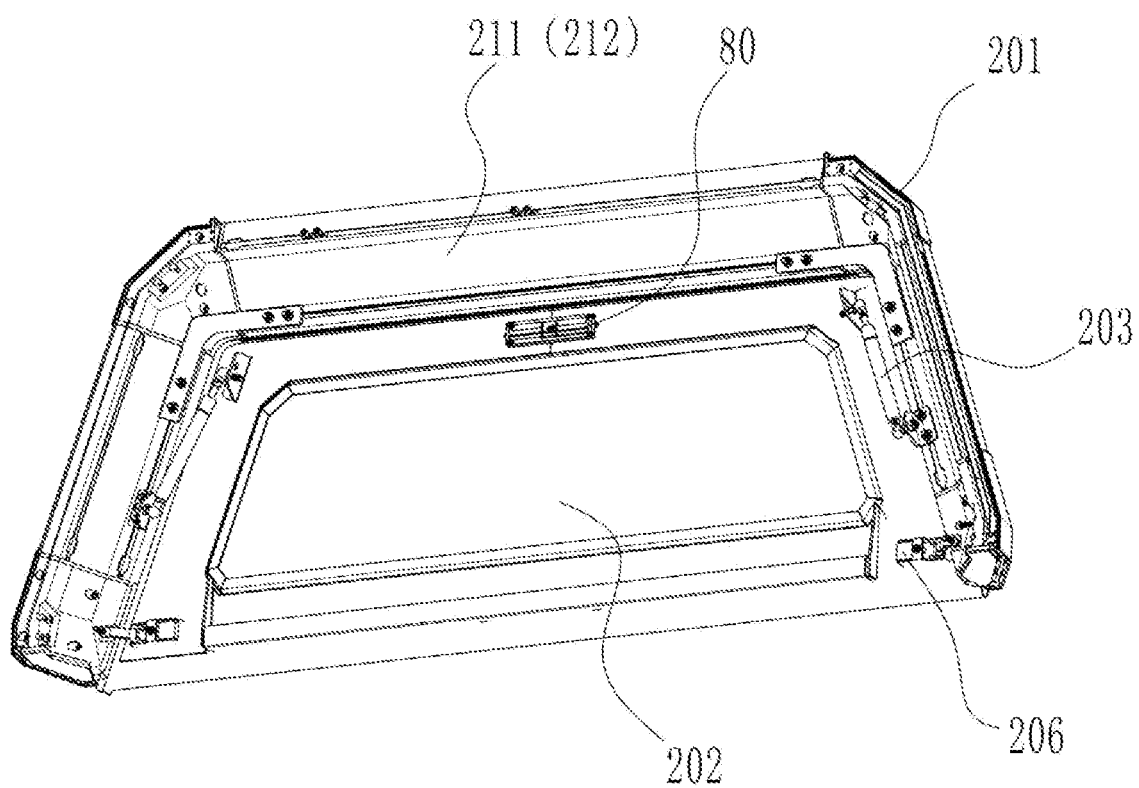
FIG. 41 is a schematic structural diagram of a rear cover in a second embodiment of the present disclosure.
Figure 42:
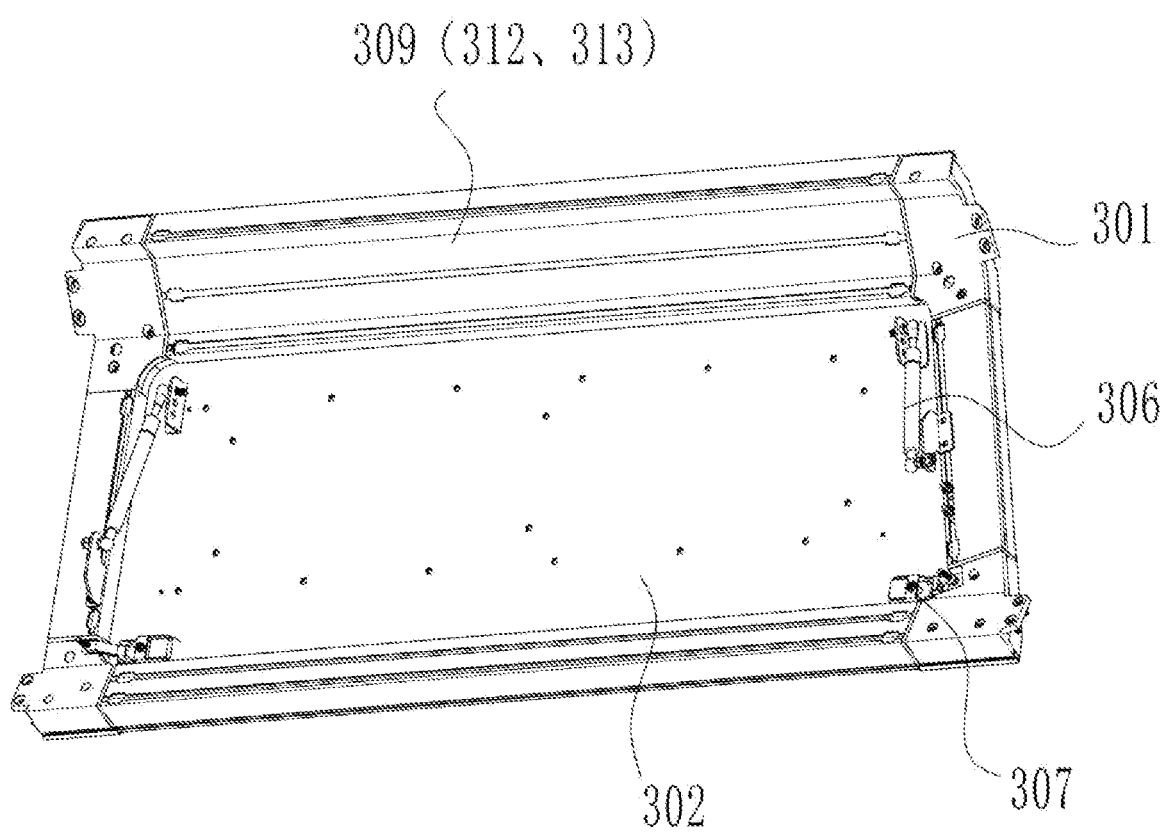
FIG. 42 is a schematic structural diagram of a first side cover and a second side cover in a second embodiment of the present disclosure.
Figure 43:
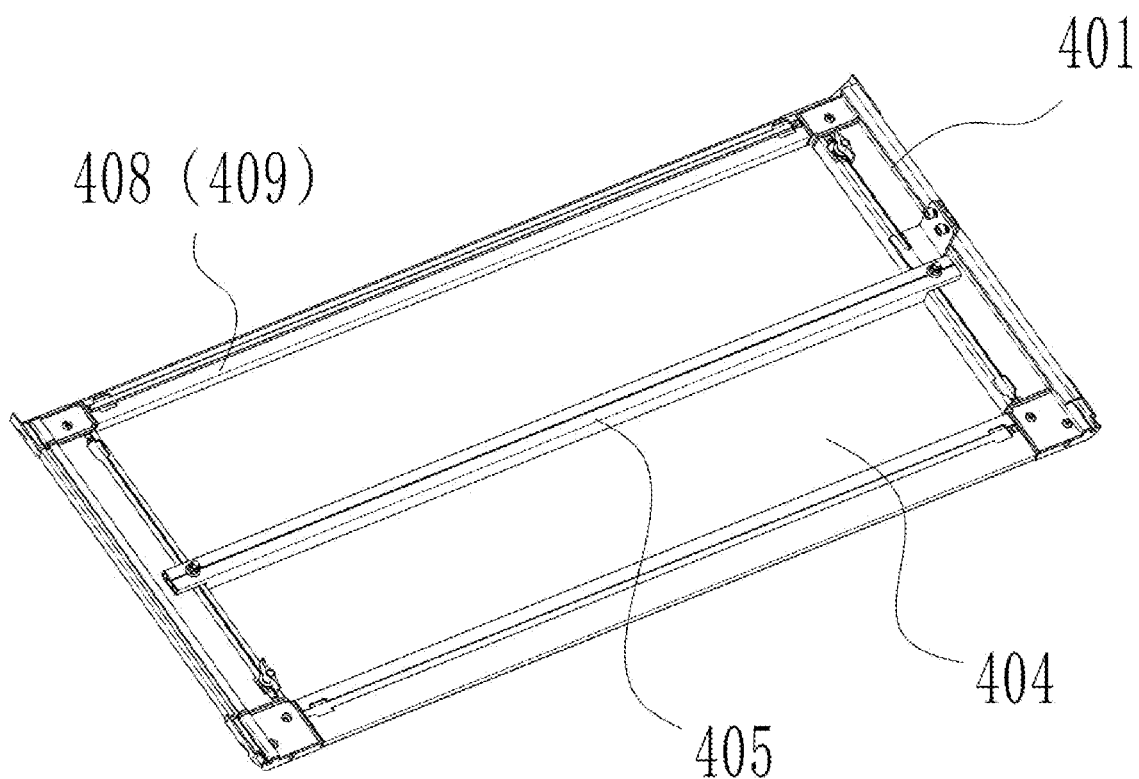
FIG. 43 is a schematic structural diagram of a top cover in a second embodiment of the present disclosure.
Figure 44:
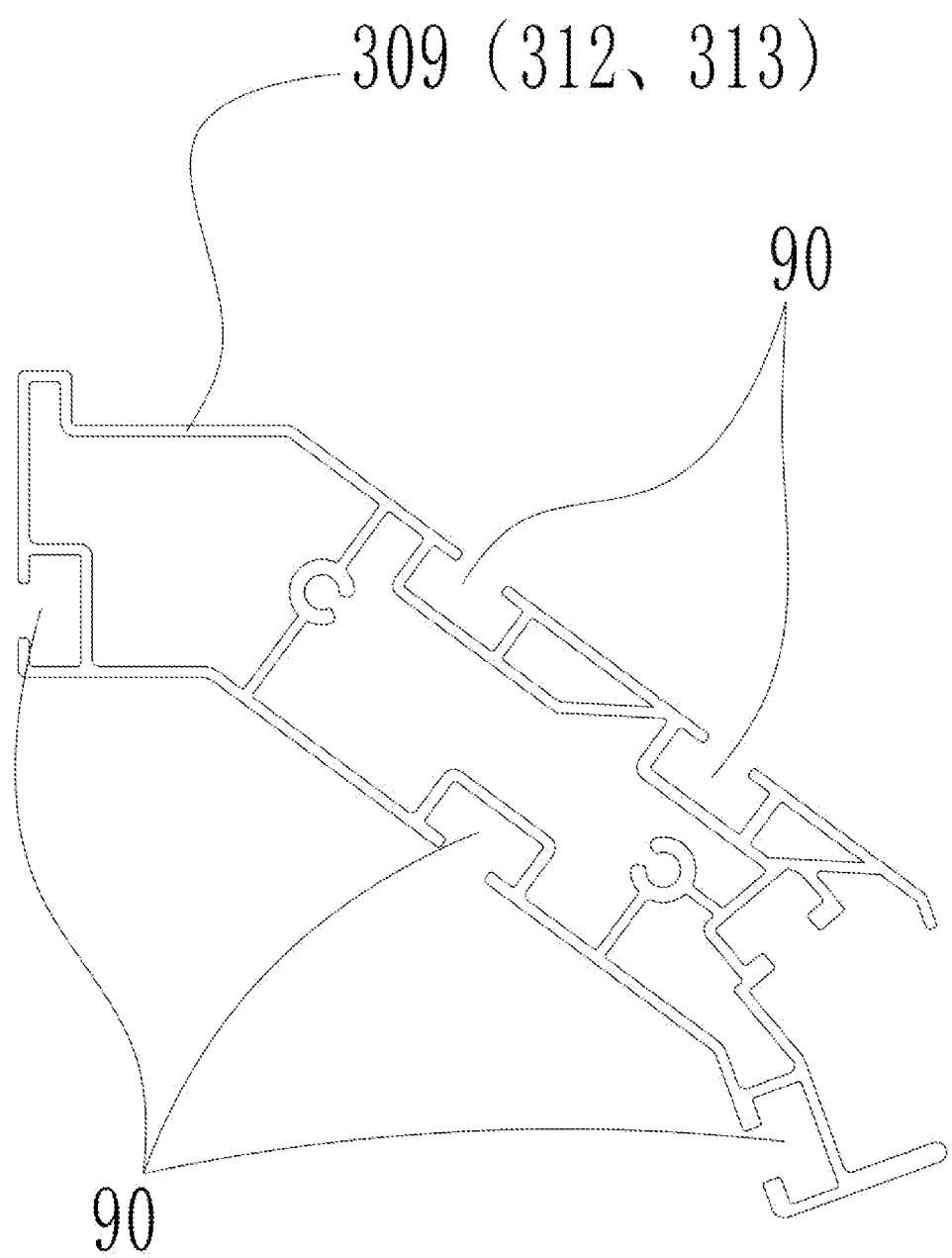
FIG. 44 is a schematic diagram of a cross-sectional structure of a first rear panel profile and a second rear panel profile in a second embodiment of the present disclosure.
Figure 45:
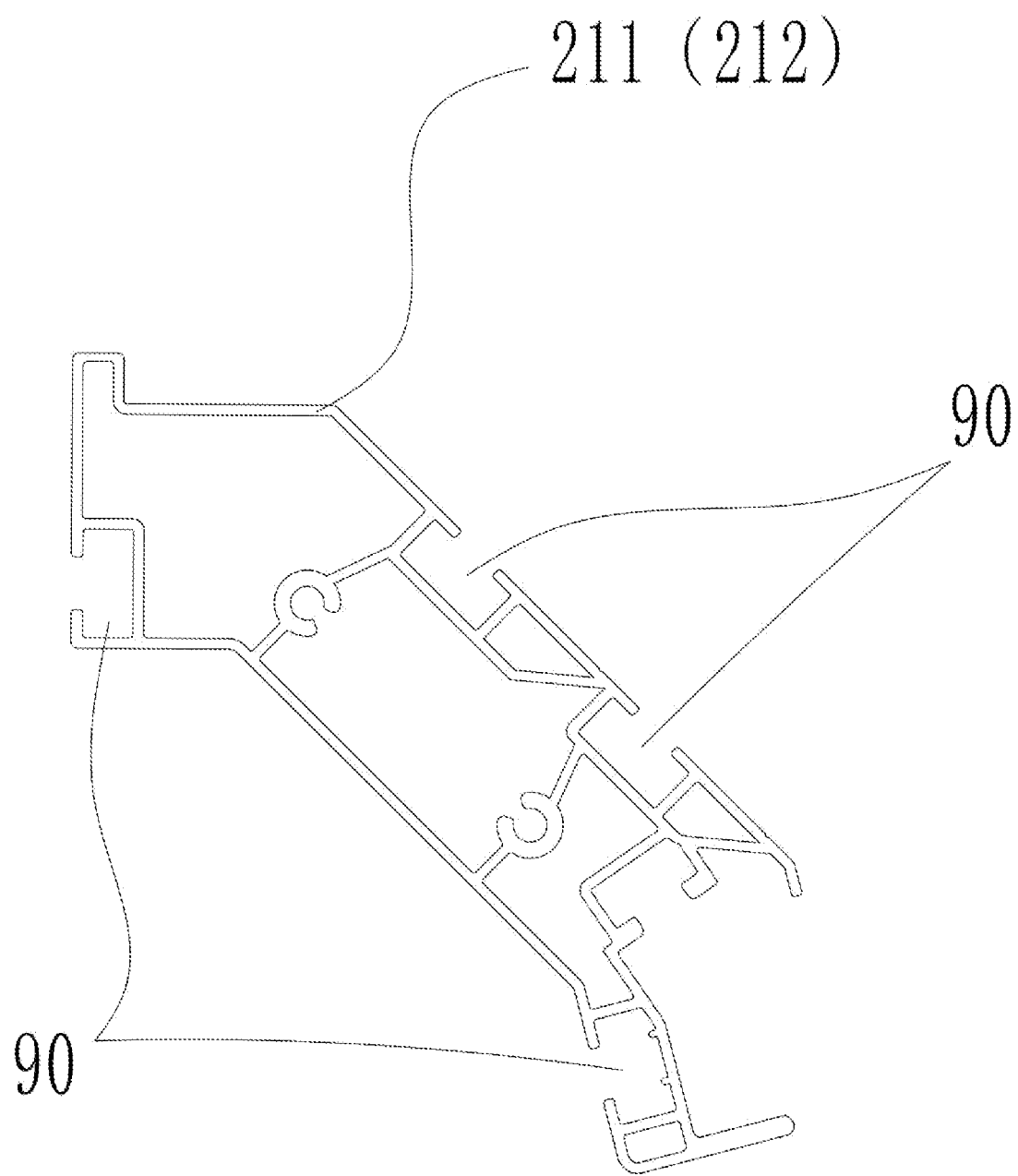
FIG. 45 is a schematic diagram of a cross-sectional structure of a first side panel profile, a second side panel profile, and a third side panel profile in a second embodiment of the present disclosure.
Figure 46:
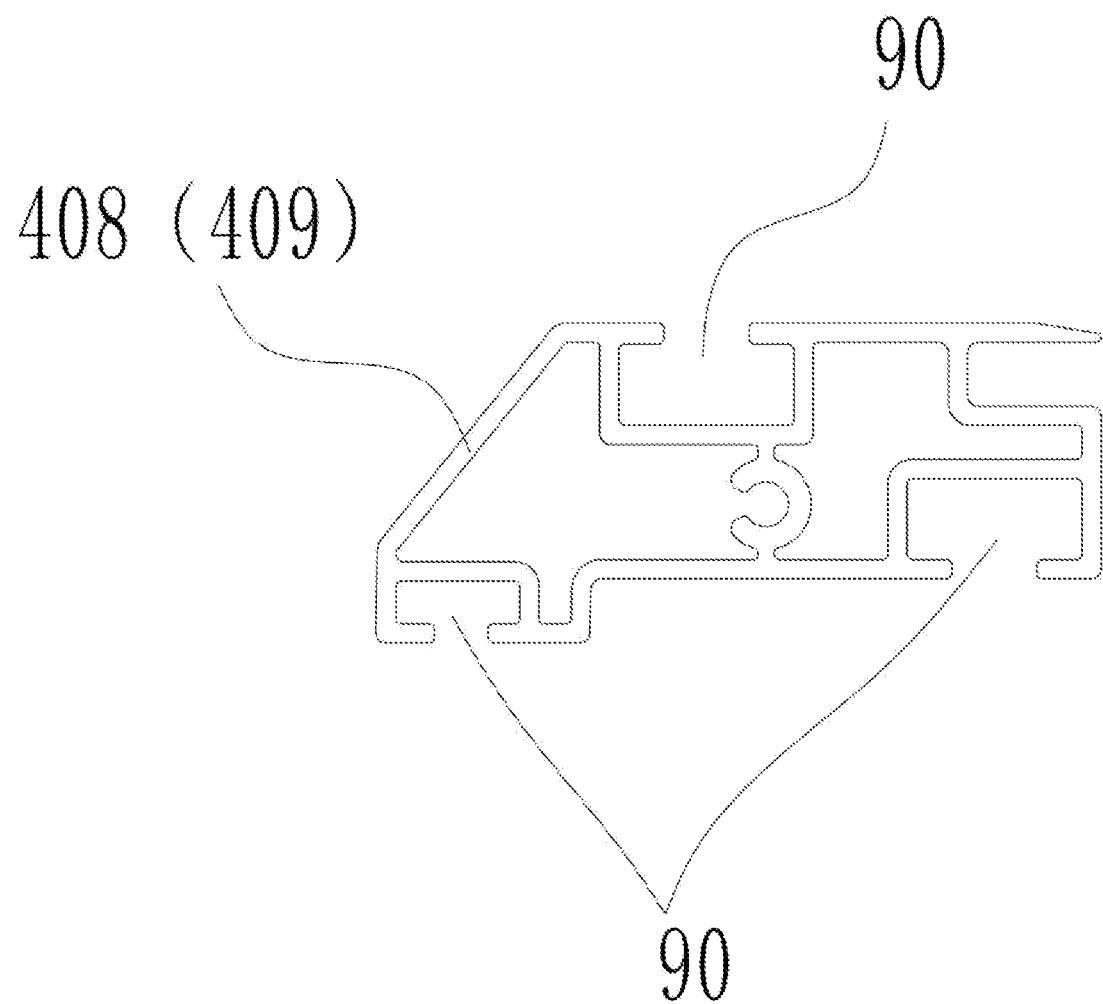
FIG. 46 is a schematic diagram of a first cross-sectional structure of a first top panel profile and a second top panel profile in a second embodiment of the present disclosure.
Figure 47:
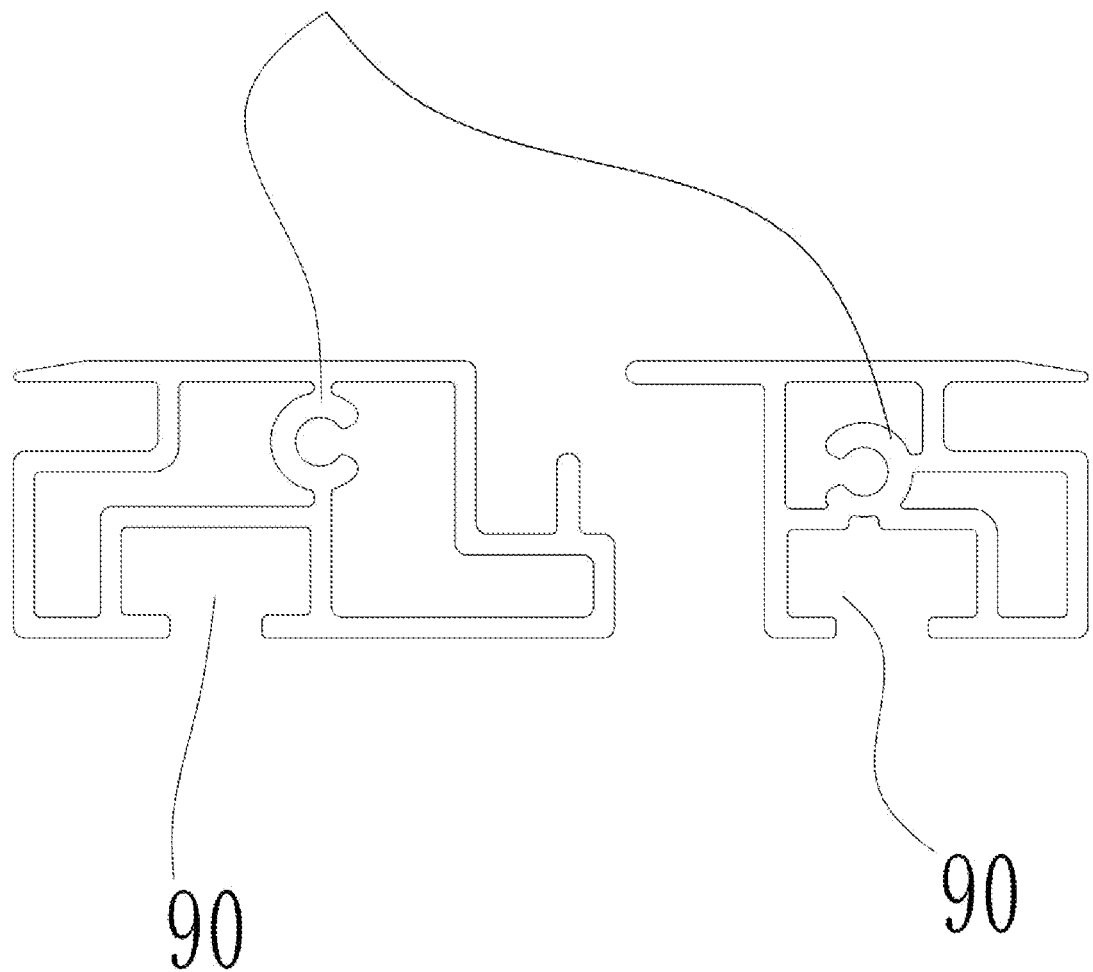
FIG. 47 is a schematic diagram of a second cross-sectional structure of a first top panel profile and a second top panel profile in a second embodiment of the present disclosure.
Figure 48:
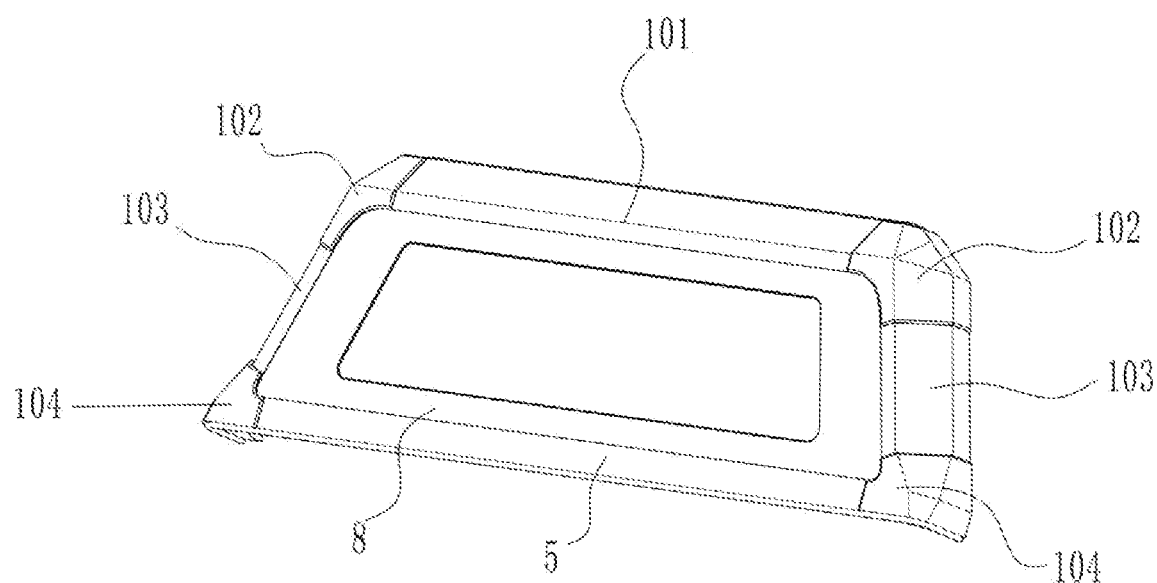
FIG. 48 is a schematic structural diagram of a front cover according to a second embodiment of the present disclosure.
Figure 49:
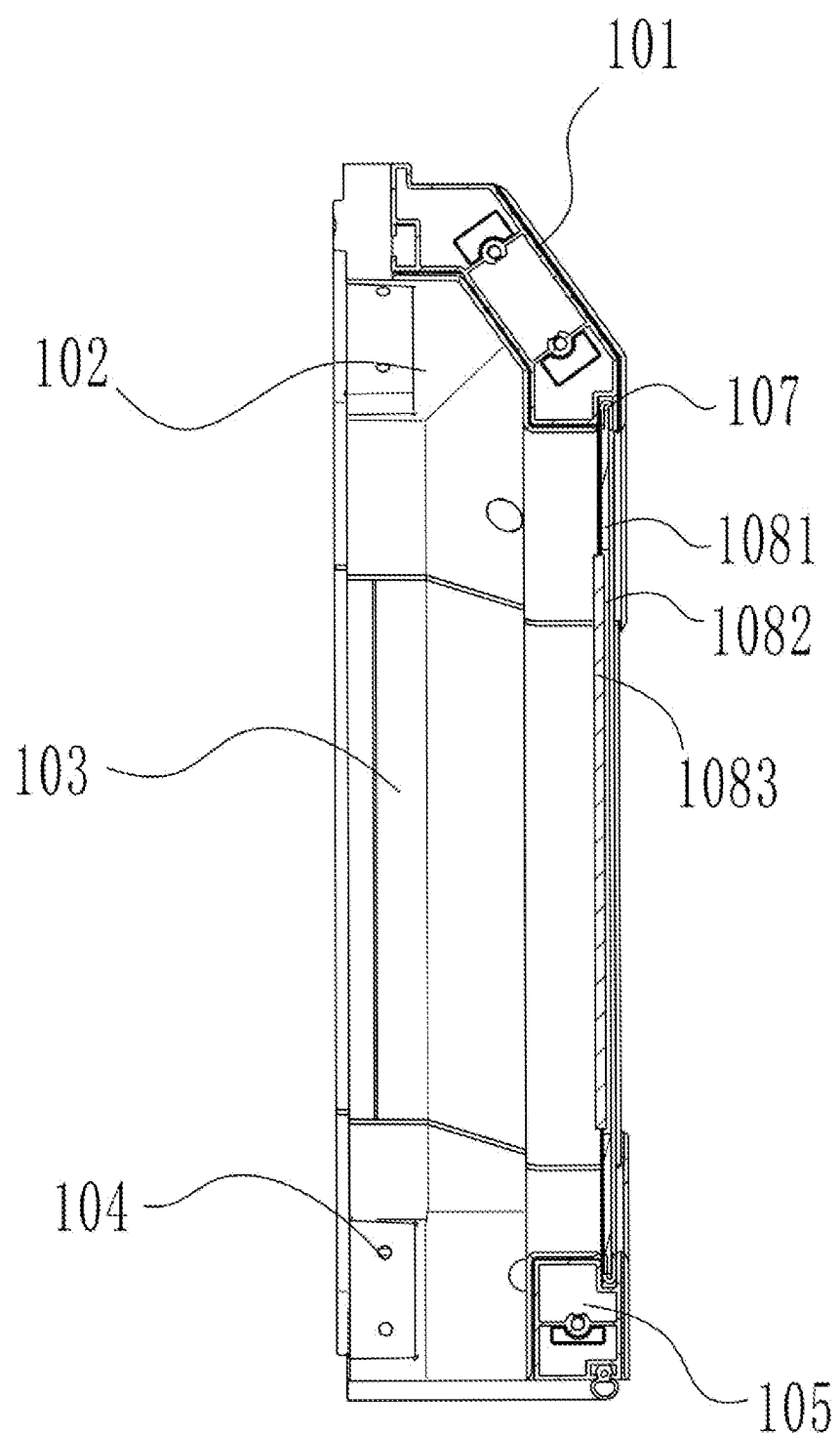
FIG. 49 is a schematic diagram of a longitudinal sectional structure of FIG. 48.
Figure 50:
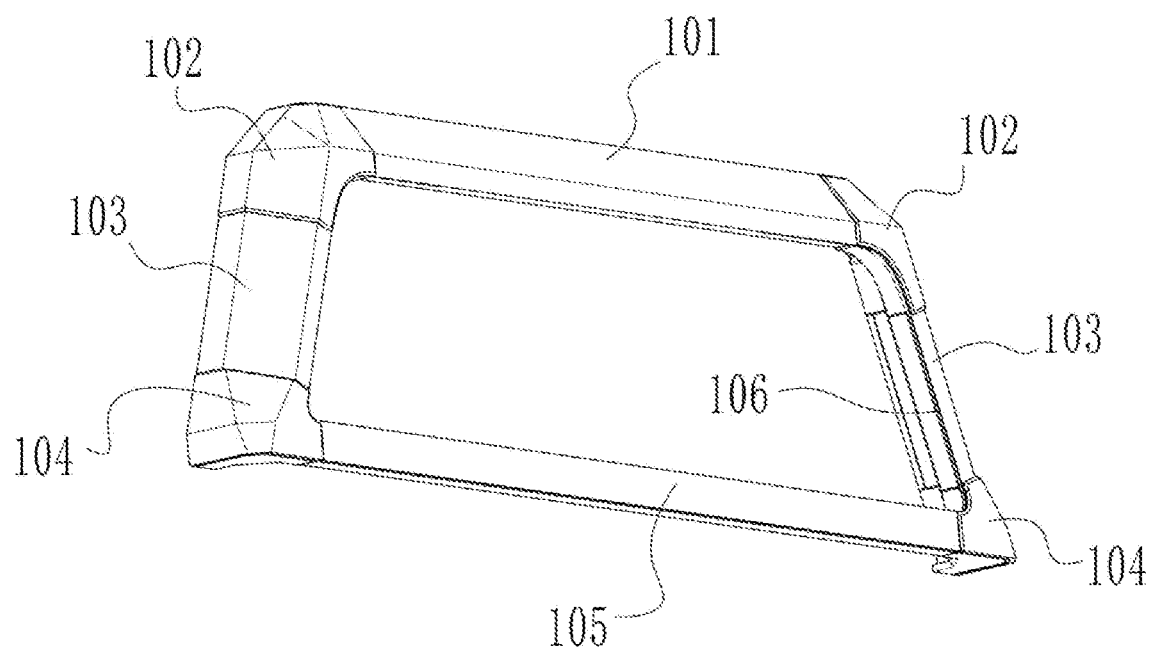
FIG. 50 is a schematic diagram of a front panel frame structure 100 according to a second embodiment of the present disclosure.
Figure 51:
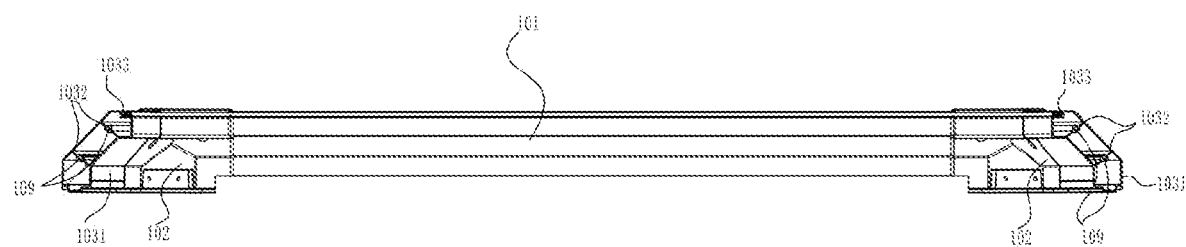
FIG. 51 is a schematic diagram of a transverse sectional structure of FIG. 50.
Figure 52:
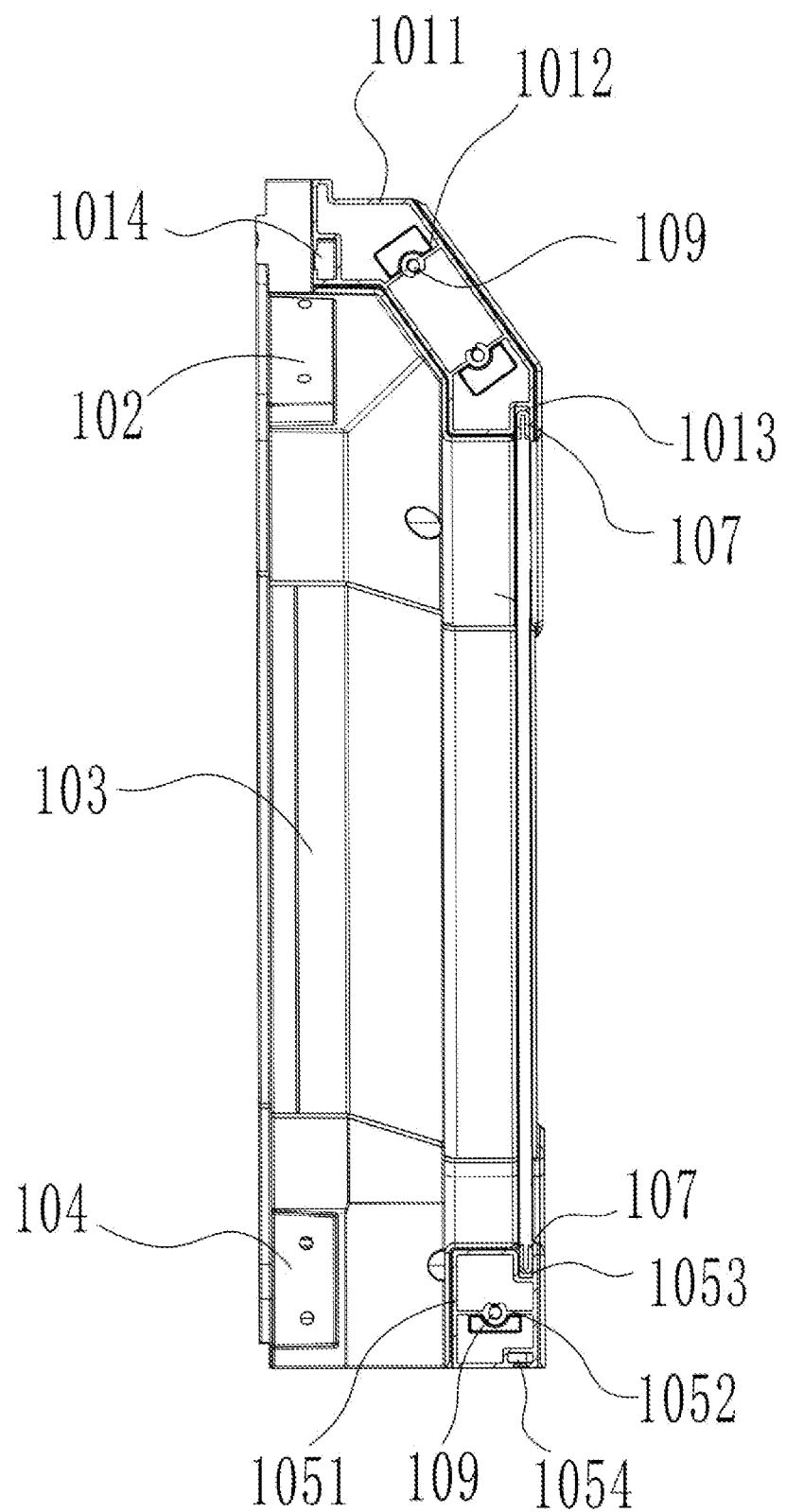
FIG. 52 is a schematic diagram of a longitudinal sectional structure of FIG. 50.
Figure 53:
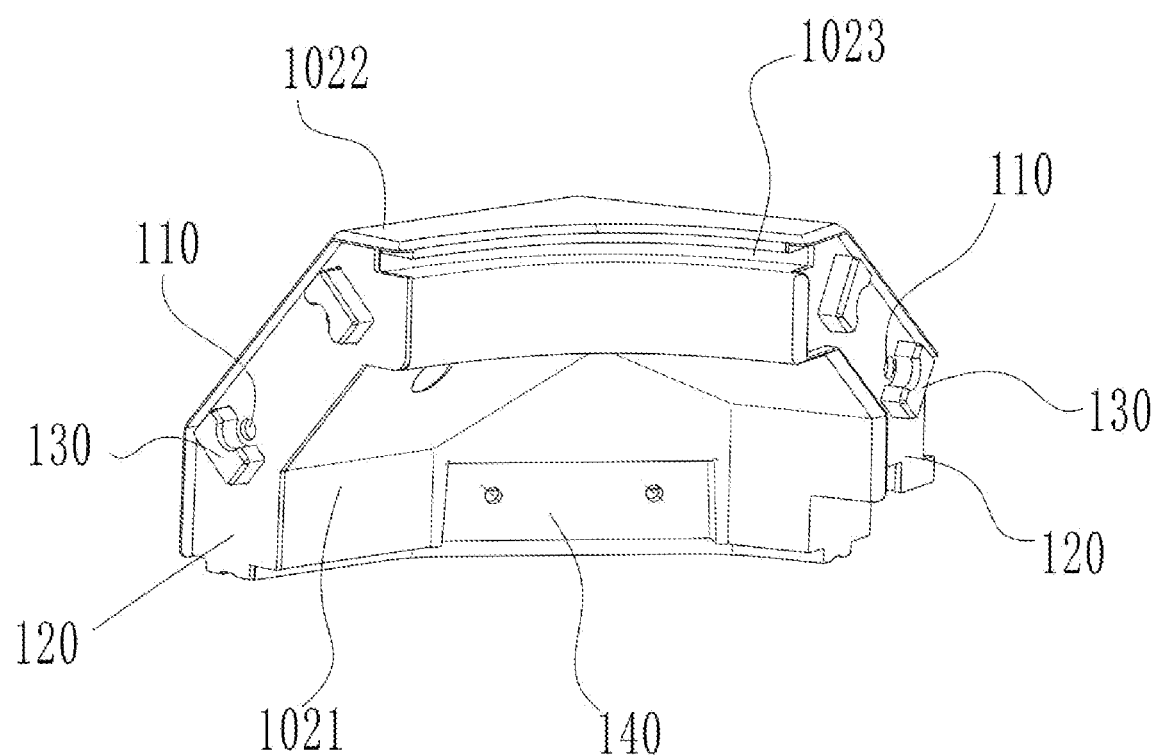
FIG. 53 is a schematic structural diagram of a first front panel end socket in a front cover according to a second embodiment of the present disclosure.
Figure 54:
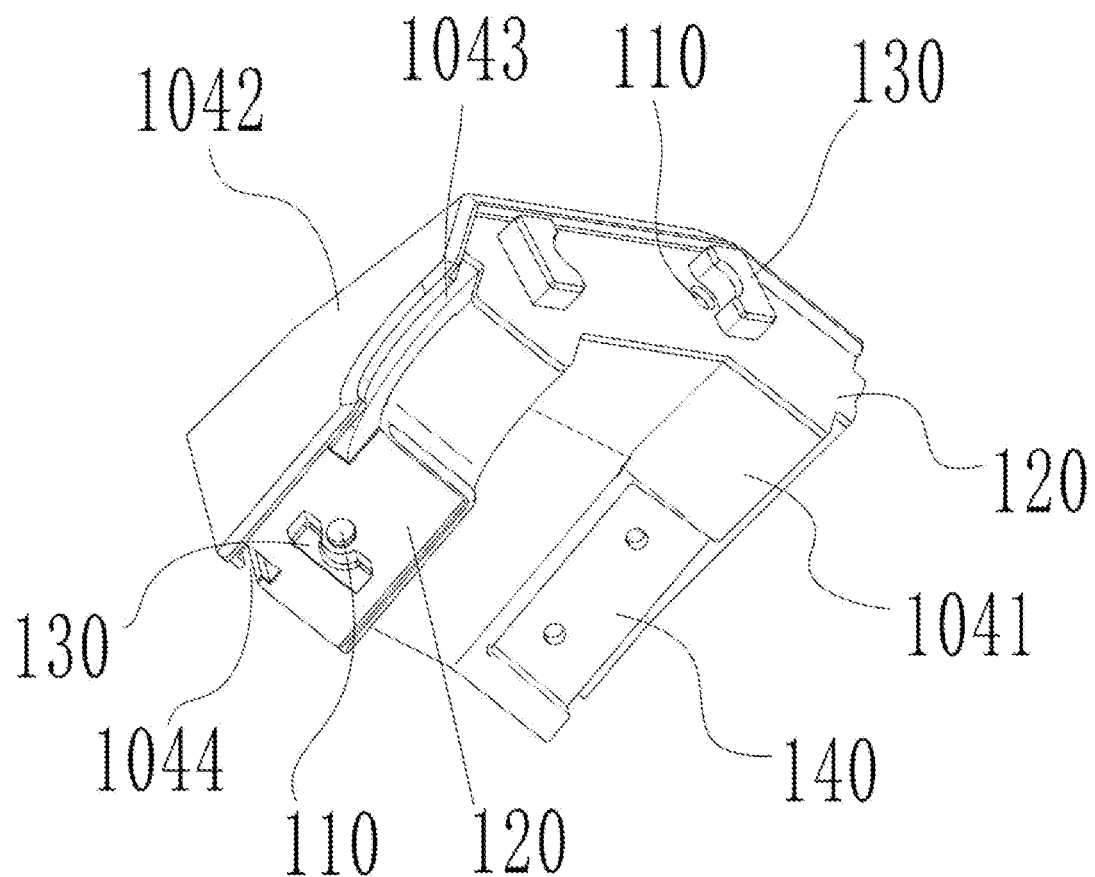
FIG. 54 is a schematic structural diagram of a first viewing angle of a second front panel end socket in a front cover according to a second embodiment of the present disclosure.
Figure 55:
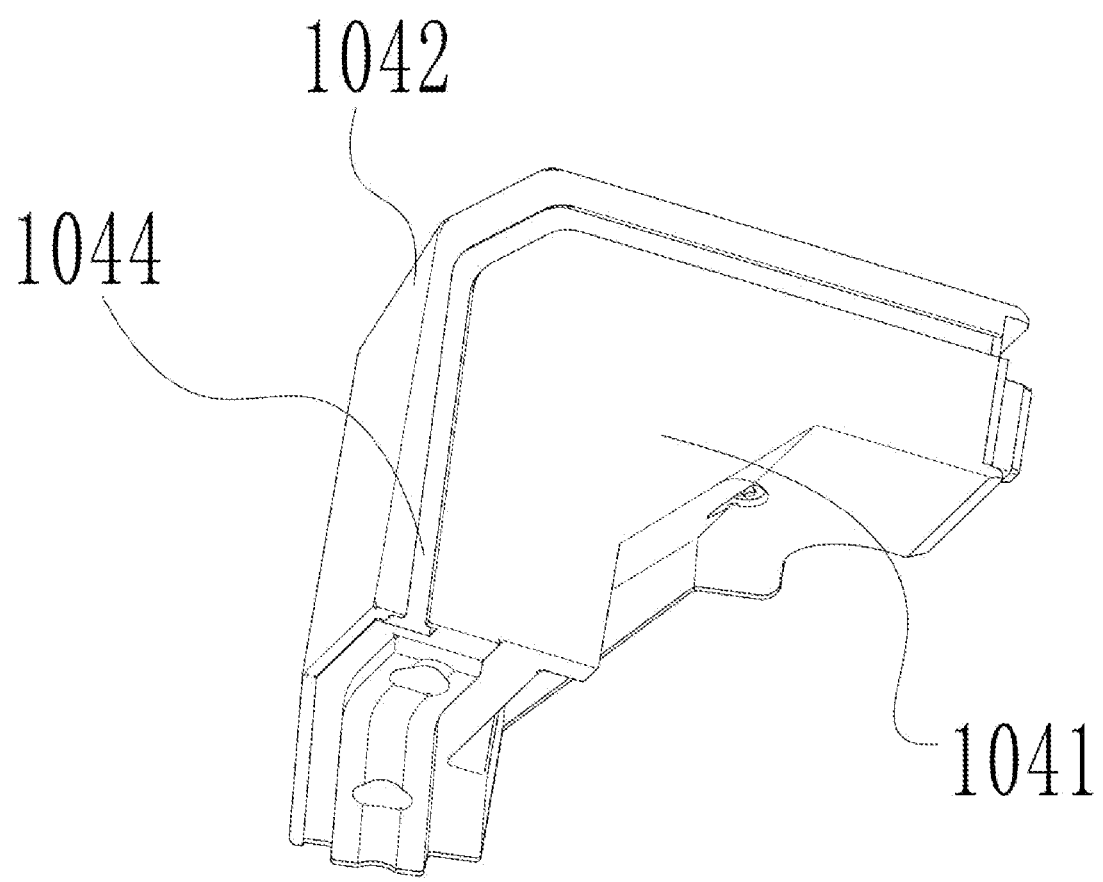
FIG. 55 is a schematic structural diagram of a second viewing angle of a second front panel end socket in a front cover according to a second embodiment of the present disclosure.
Figure 56:
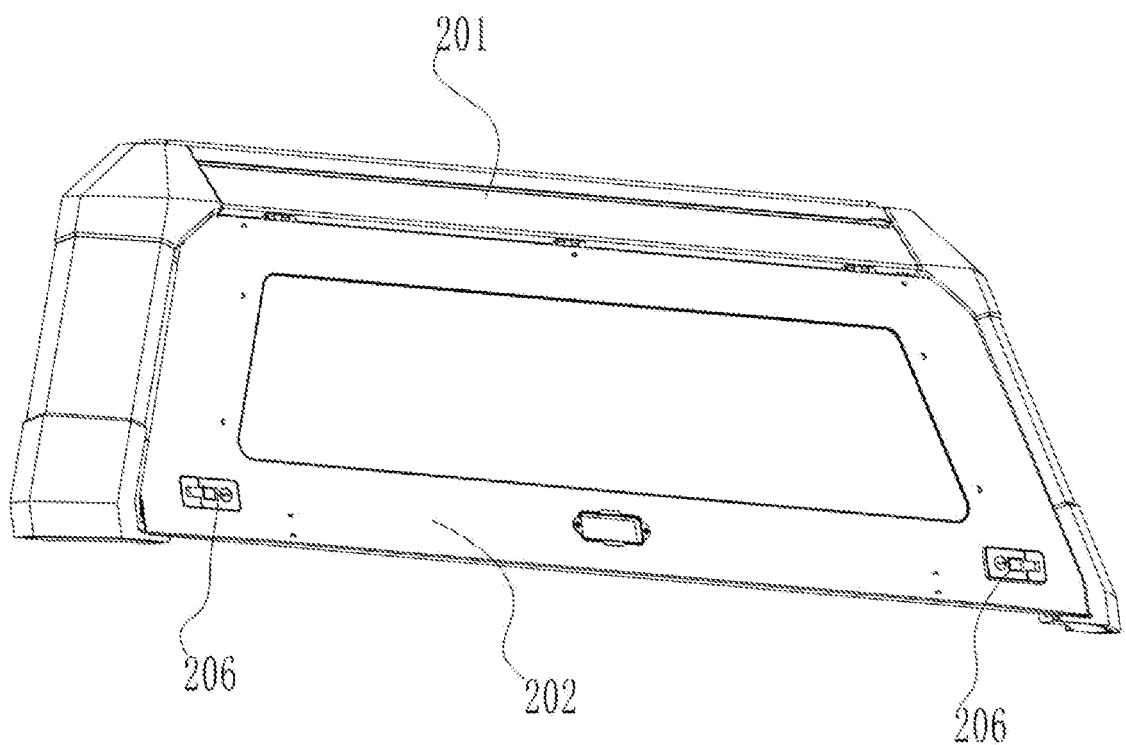
FIG. 56 is a schematic structural diagram of a first viewing angle of a rear cover according to a second embodiment of the present disclosure.
Figure 57:
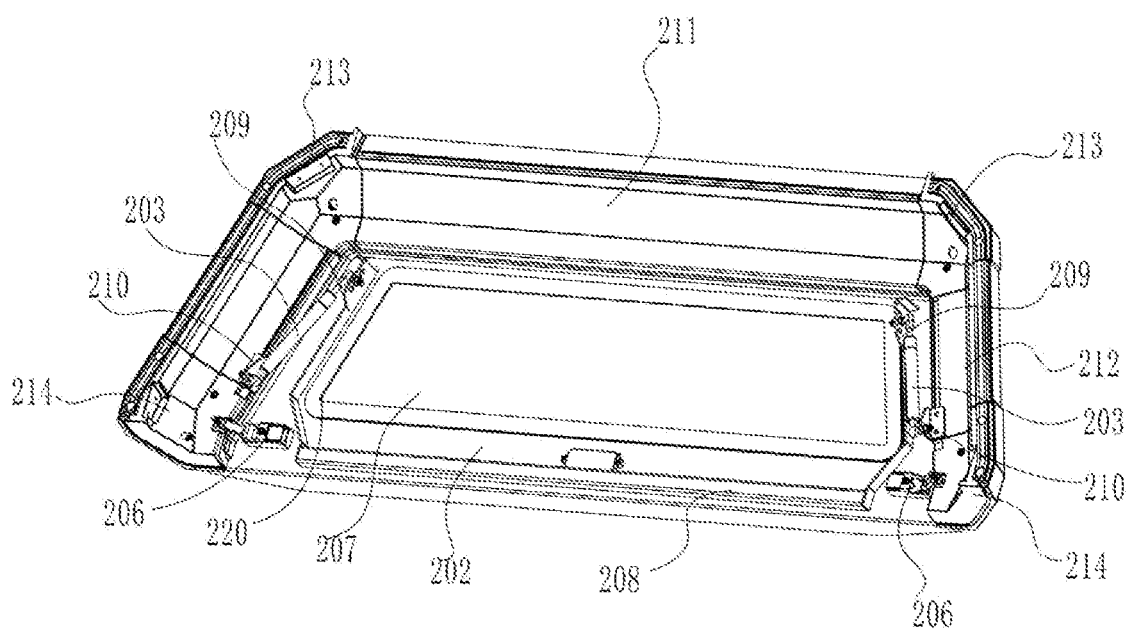
FIG. 57 is a schematic structural diagram of a second viewing angle of a rear cover according to a second embodiment of the present disclosure.
Figure 58:
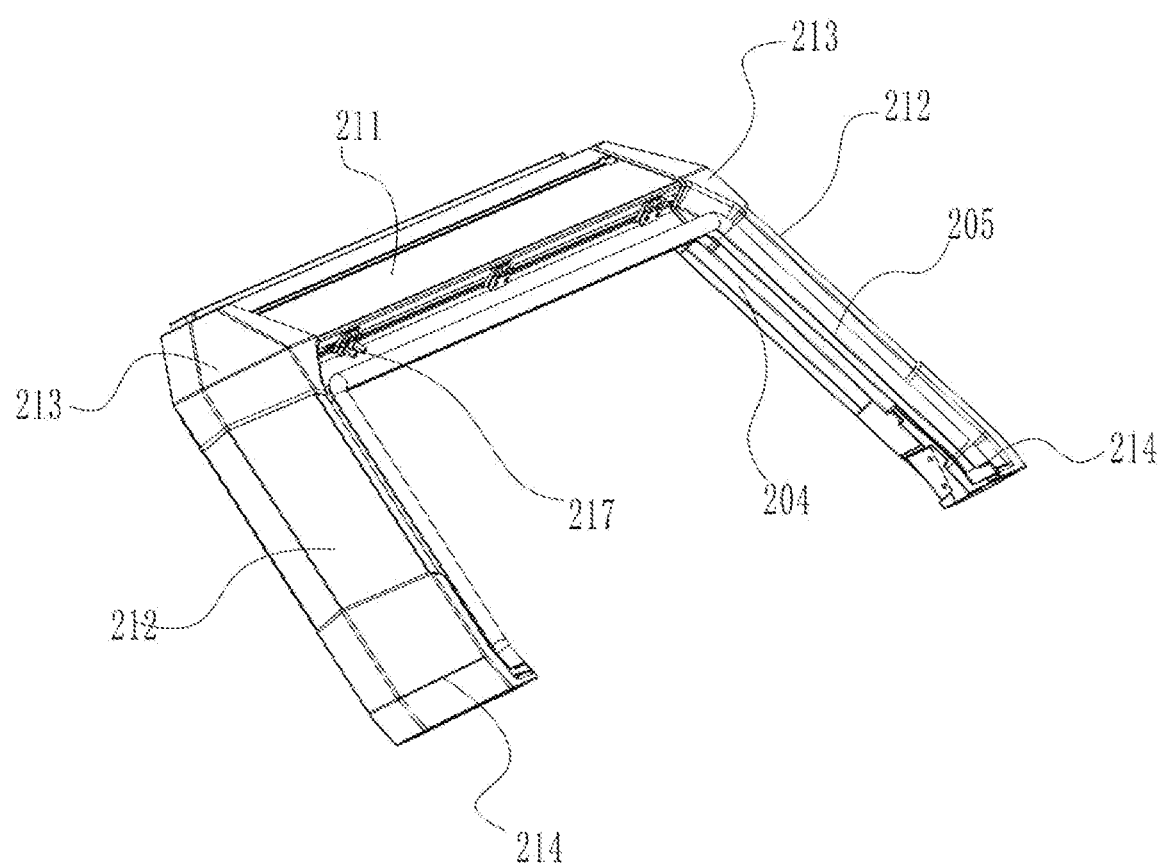
FIG. 58 is a schematic structural diagram of a rear panel frame structure of a rear cover in a second embodiment of the present disclosure.
Figure 59:
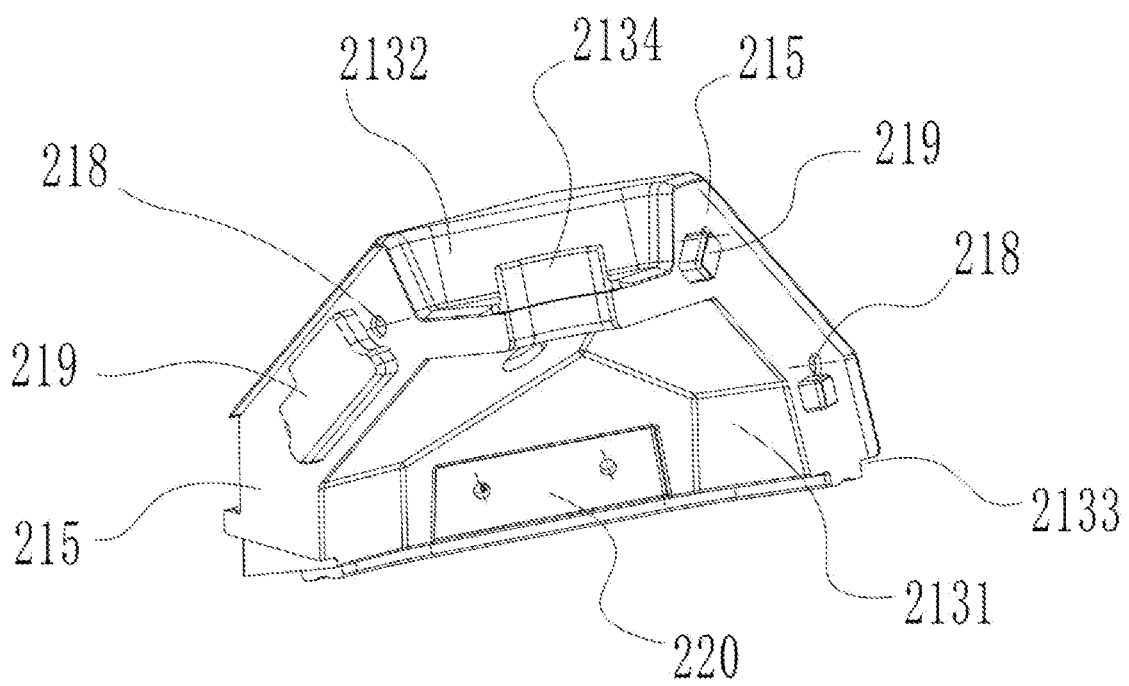
FIG. 59 is a schematic structural diagram of a first rear panel end socket in a second embodiment of the present disclosure.
Figure 60:
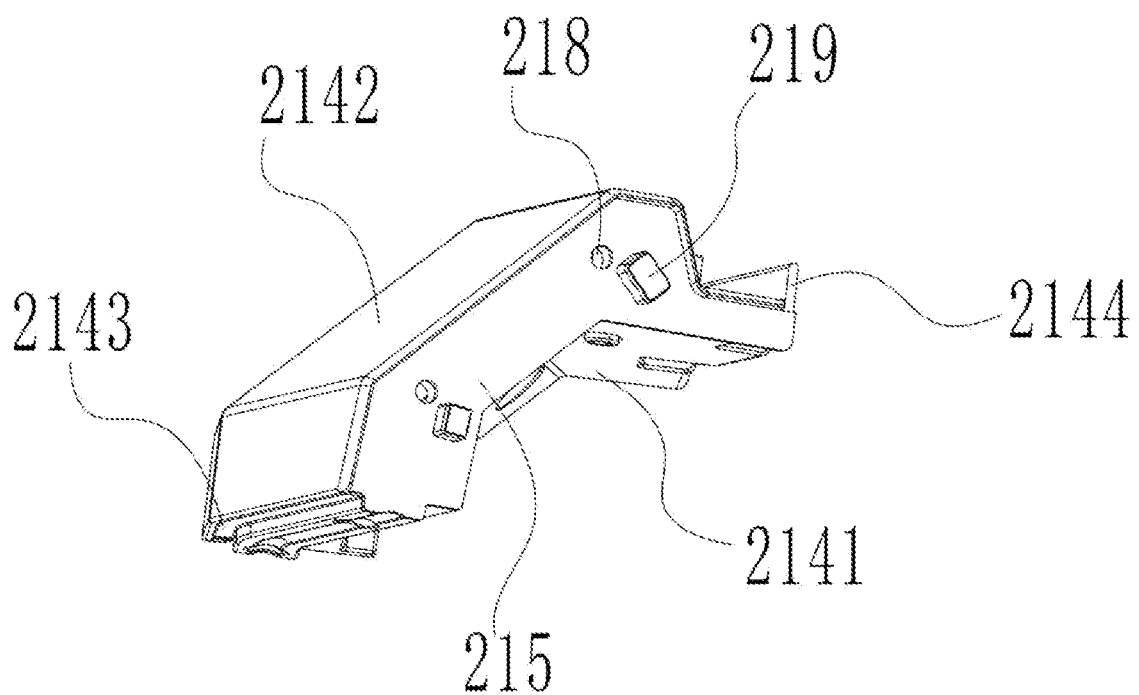
FIG. 60 is a schematic structural diagram of a first viewing angle of a second rear panel end socket in a second embodiment of the present disclosure.
Figure 61:
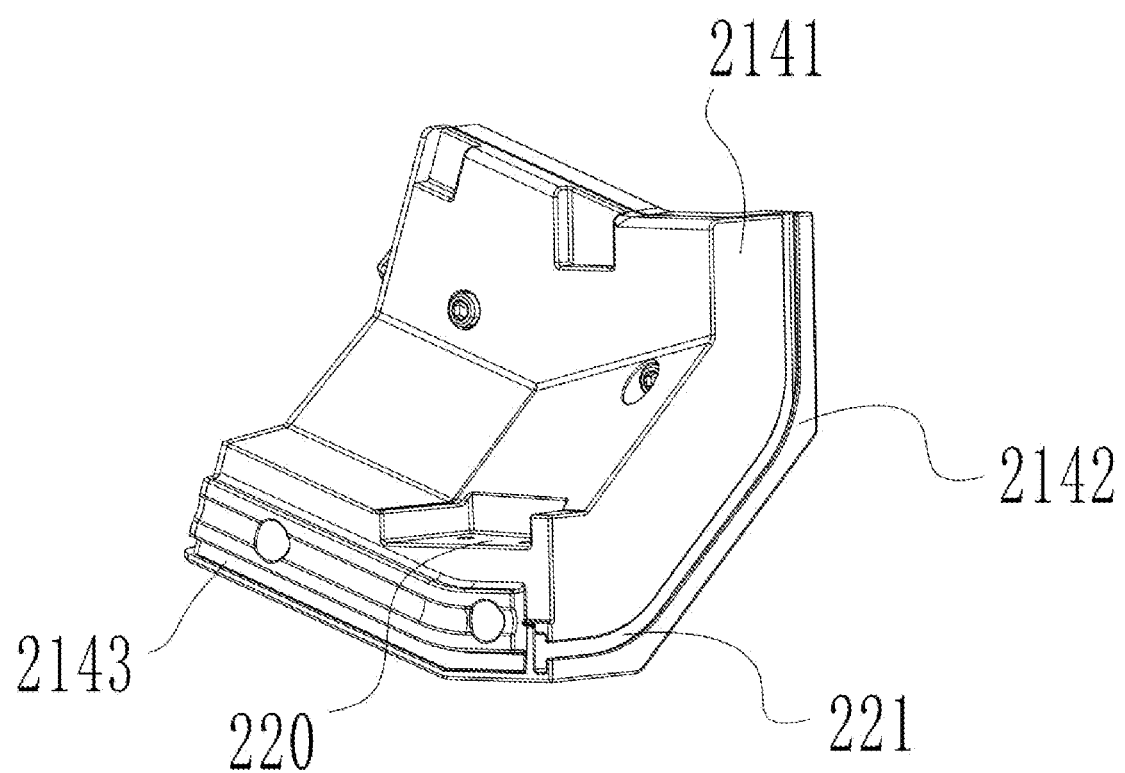
FIG. 61 is a schematic structural diagram of a second viewing angle of a second rear panel end socket in a second embodiment of the present disclosure.
Figure 62:
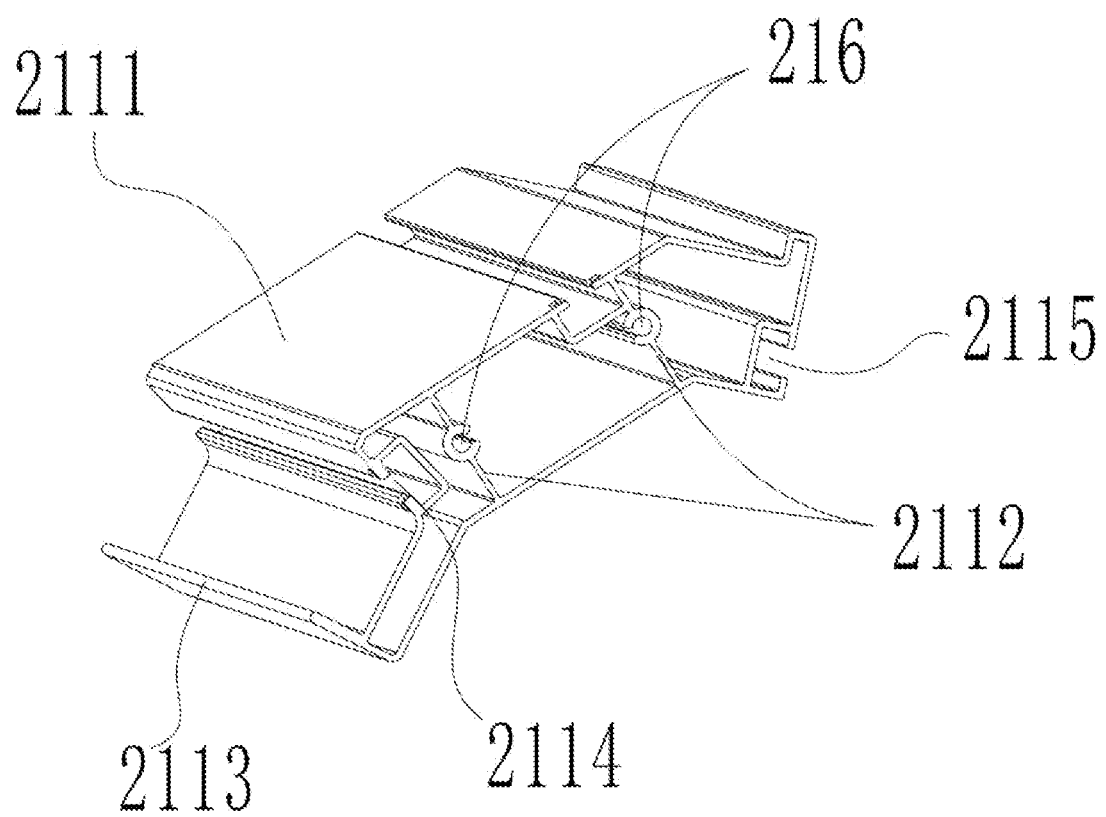
FIG. 62 is a schematic structural diagram of a first rear panel profile in a second embodiment of the present disclosure.
Figure 63:
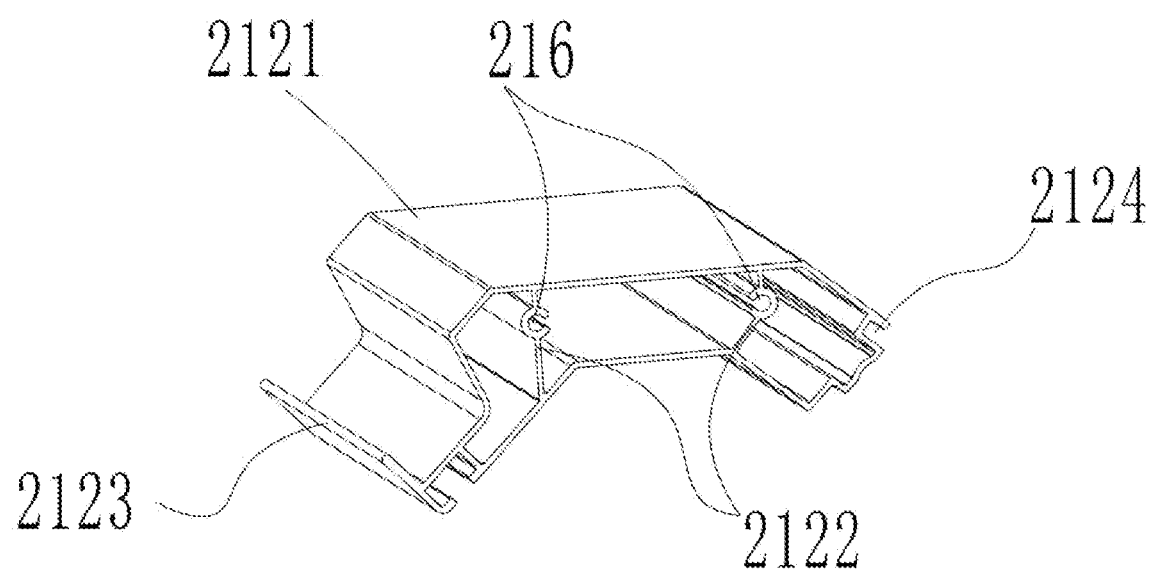
FIG. 63 is a schematic structural diagram of a second rear panel profile in a second embodiment of the present disclosure.
Figure 64:
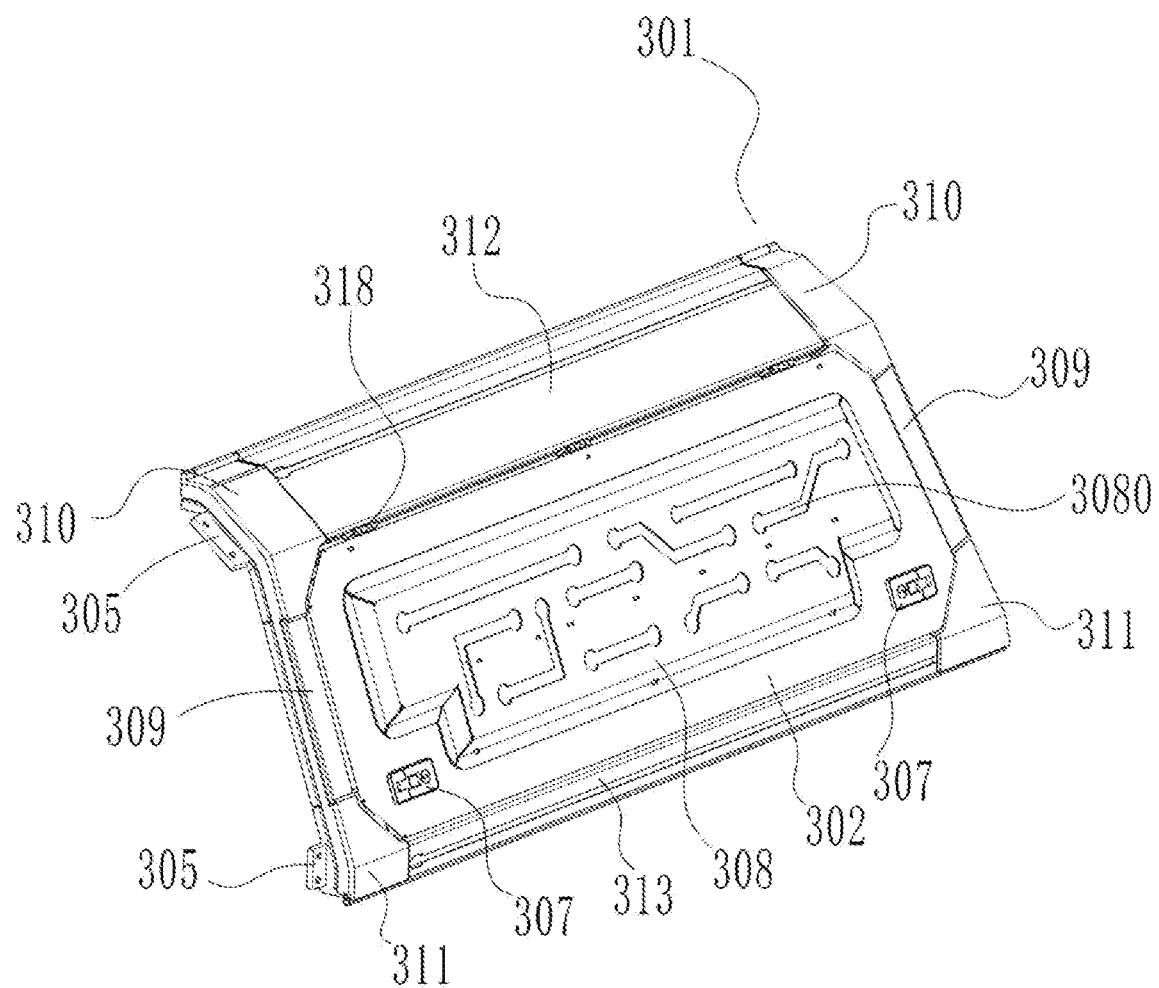
FIG. 64 is a schematic diagram of a three-dimensional structure of a first viewing angle of a side cover according to a second embodiment of the present disclosure.
Figure 65:
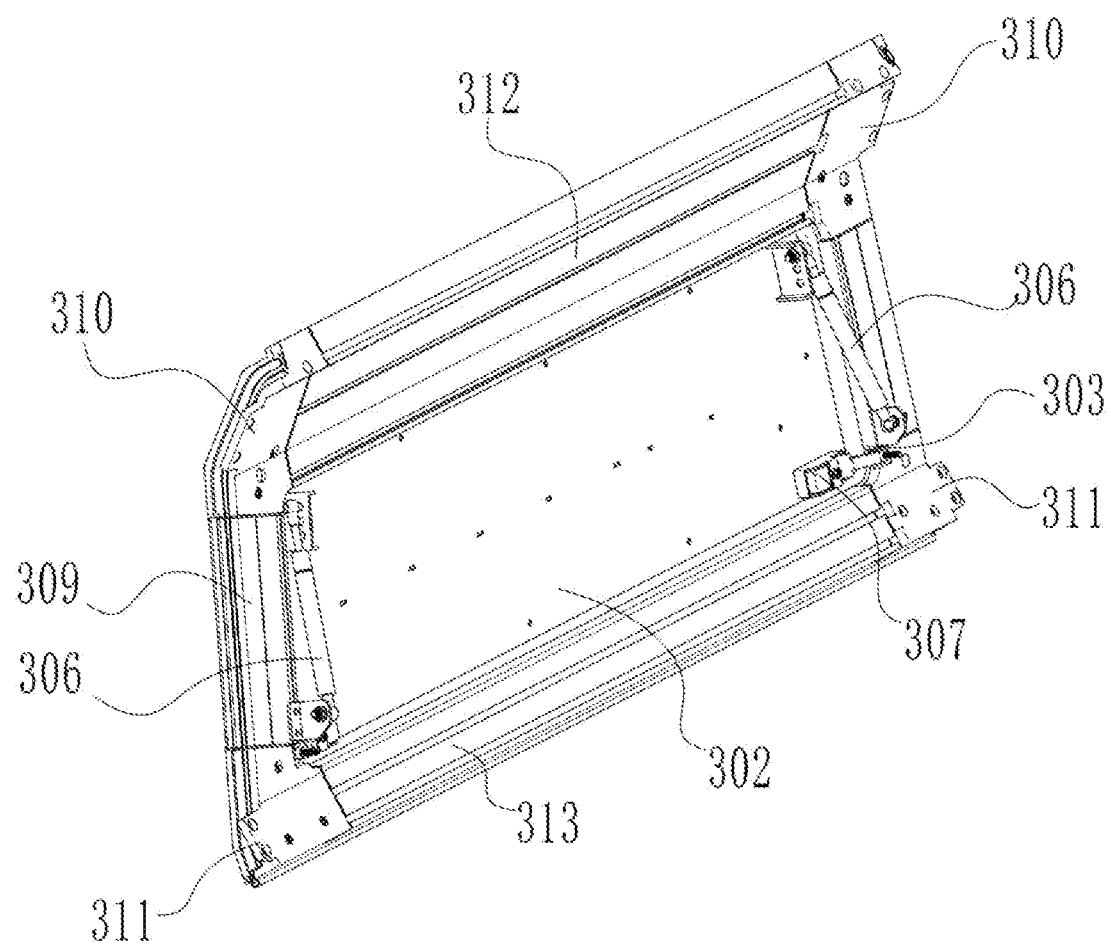
FIG. 65 is a schematic diagram of a three-dimensional structure of a second viewing angle of a side cover according to a second embodiment of the present disclosure.
Figure 66:
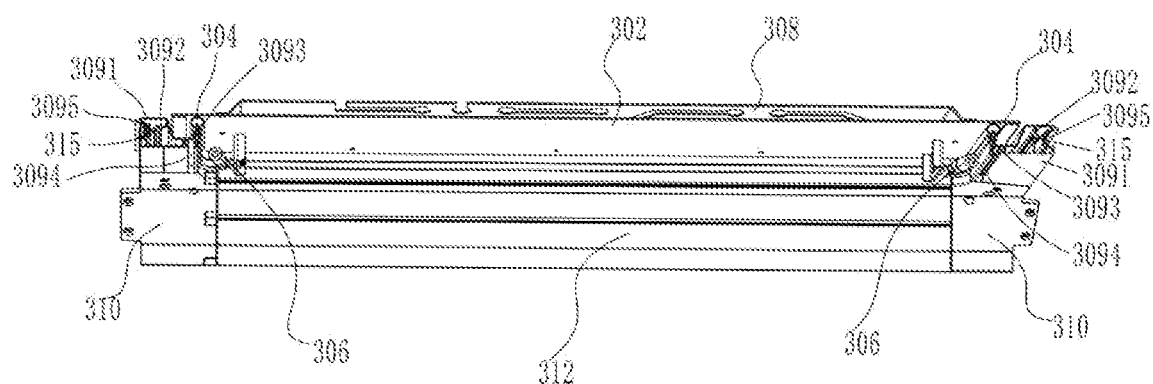
FIG. 66 is a schematic diagram of a transverse sectional structure of a side cover according to a second embodiment of the present disclosure.
Figure 67:
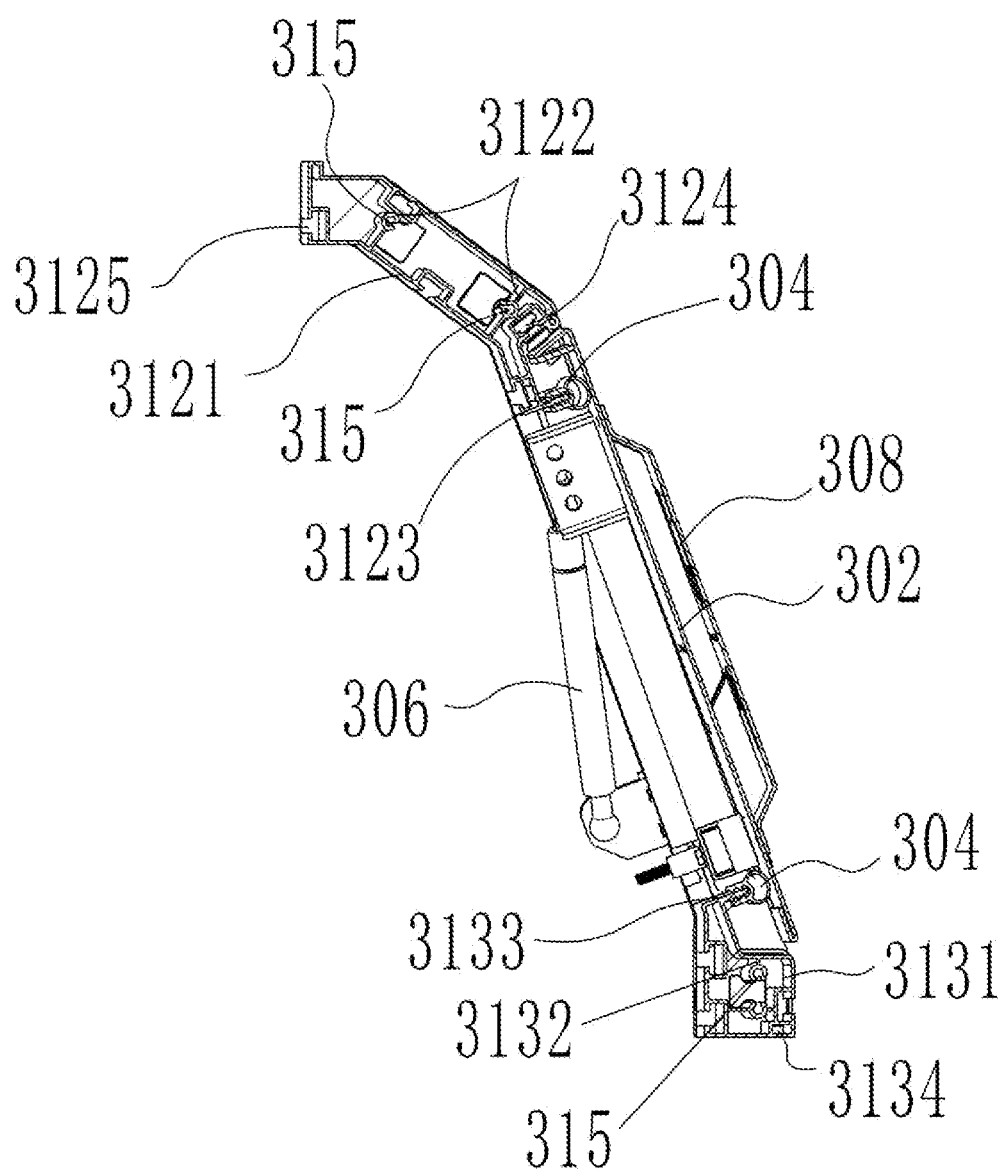
FIG. 67 is a schematic diagram of a longitudinal sectional structure of a side cover according to a second embodiment of the present disclosure.
Figure 68:
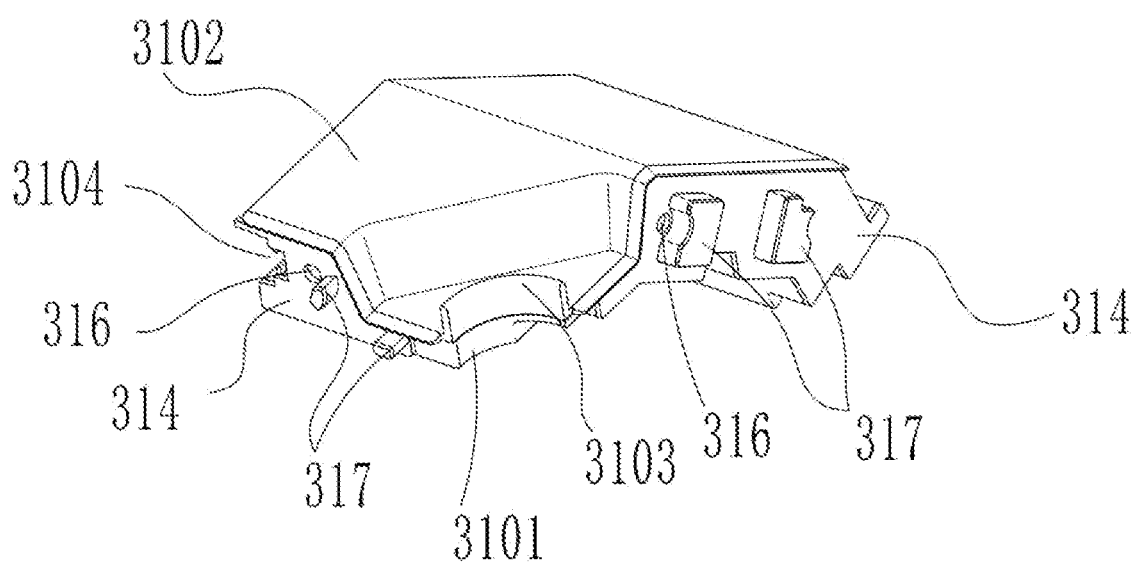
FIG. 68 is a schematic diagram of a three-dimensional structure of a first viewing angle of a first side panel end socket in the present disclosure.
Figure 69:
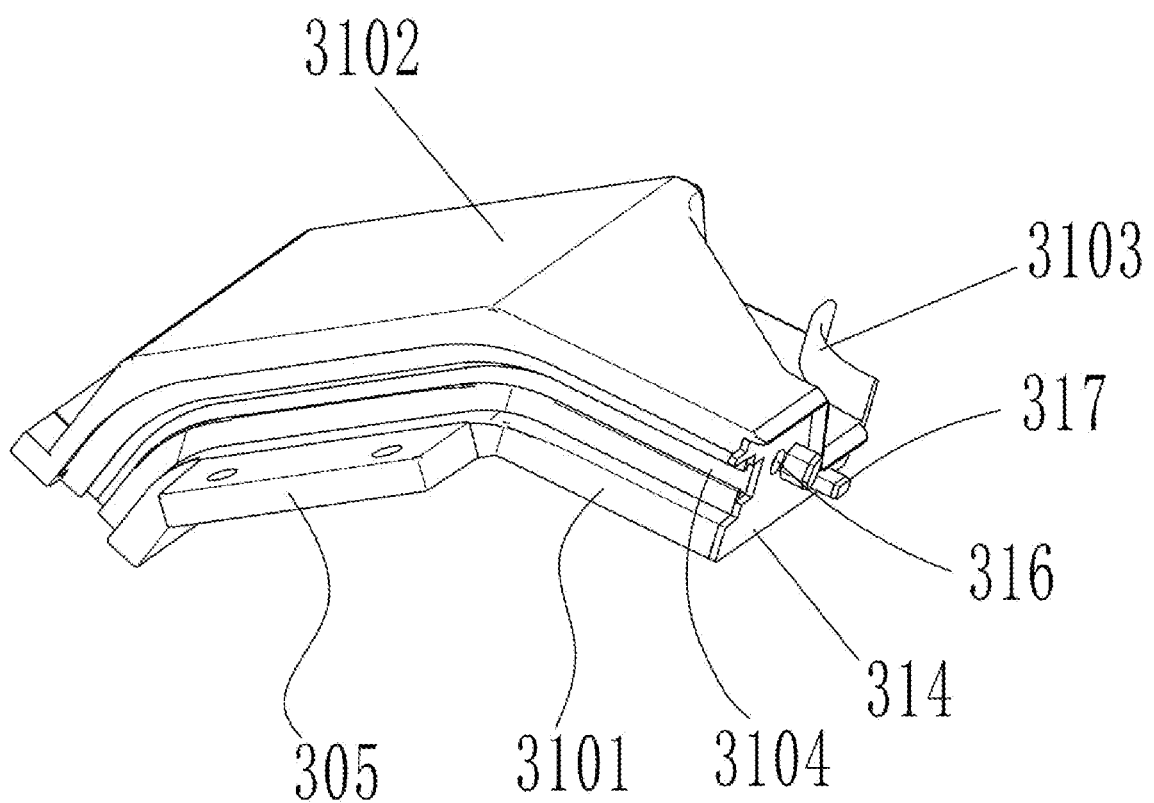
FIG. 69 is a schematic diagram of a three-dimensional structure of a second viewing angle of a first side panel end socket in the present disclosure.
Figure 70:
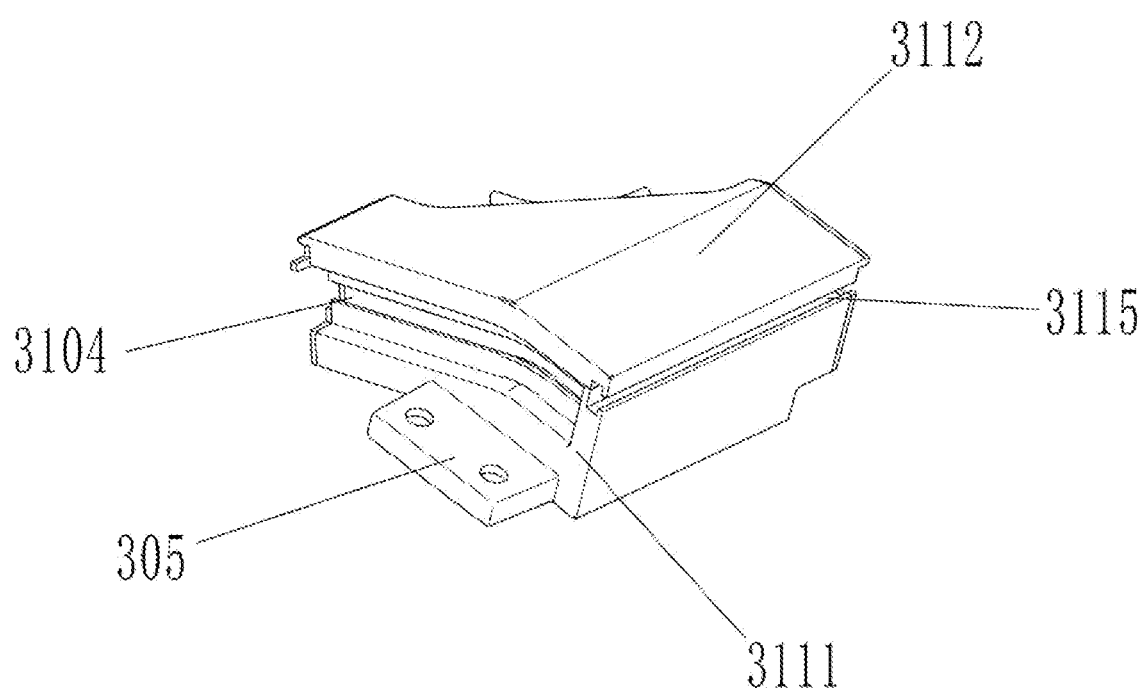
FIG. 70 is a schematic diagram of a three-dimensional structure of a first viewing angle of a second side panel end socket in the present disclosure.
Figure 71:
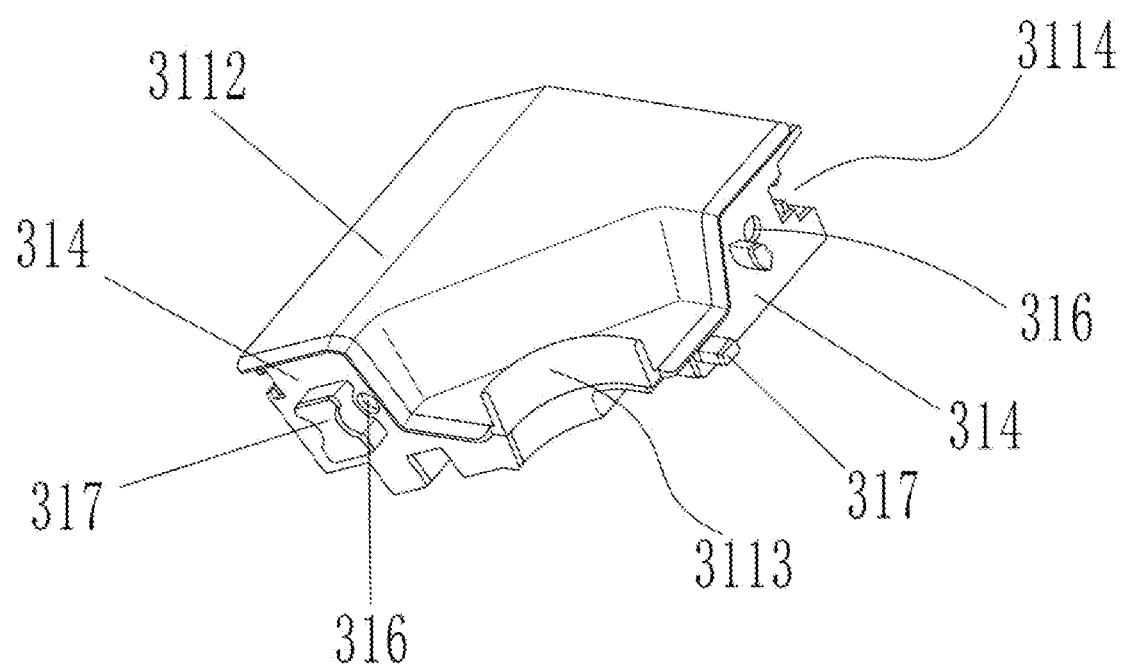
FIG. 71 is a schematic diagram of a three-dimensional structure of a second viewing angle of a second side panel end socket in the present disclosure.
Figure 72:
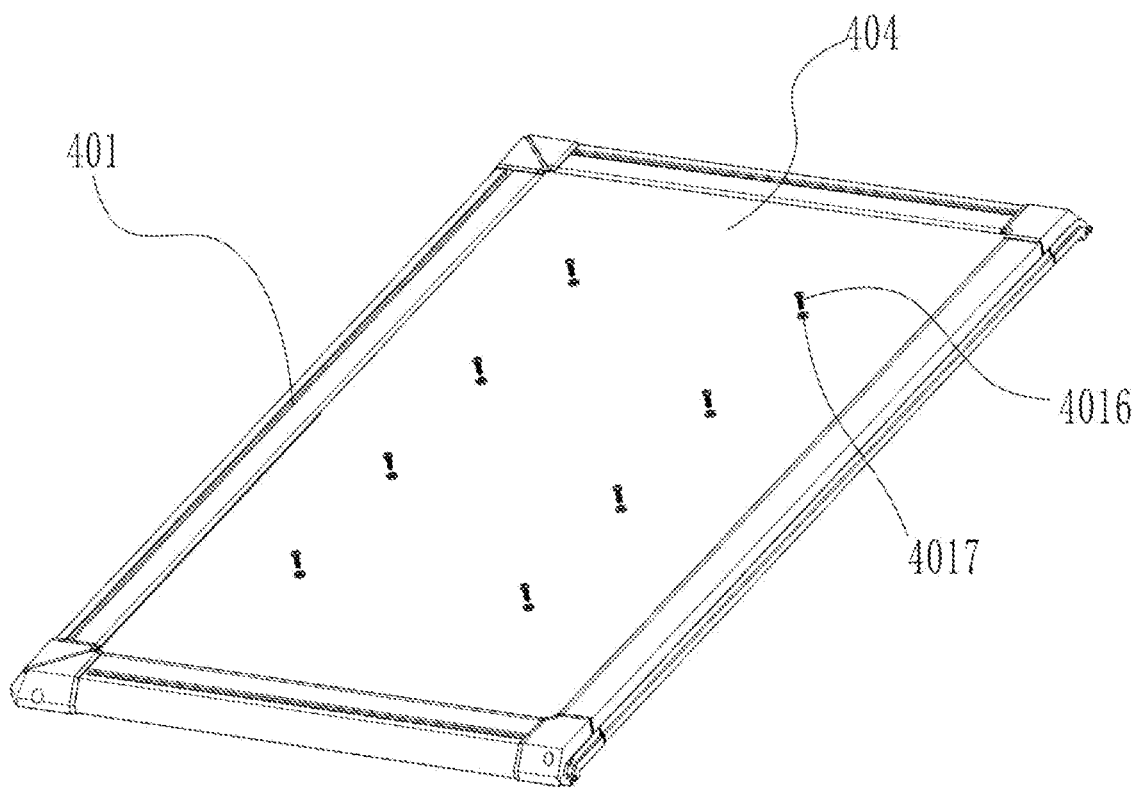
FIG. 72 is a schematic diagram of a three-dimensional structure of a top view of a top cover according to a second embodiment of the present disclosure.
Figure 73:
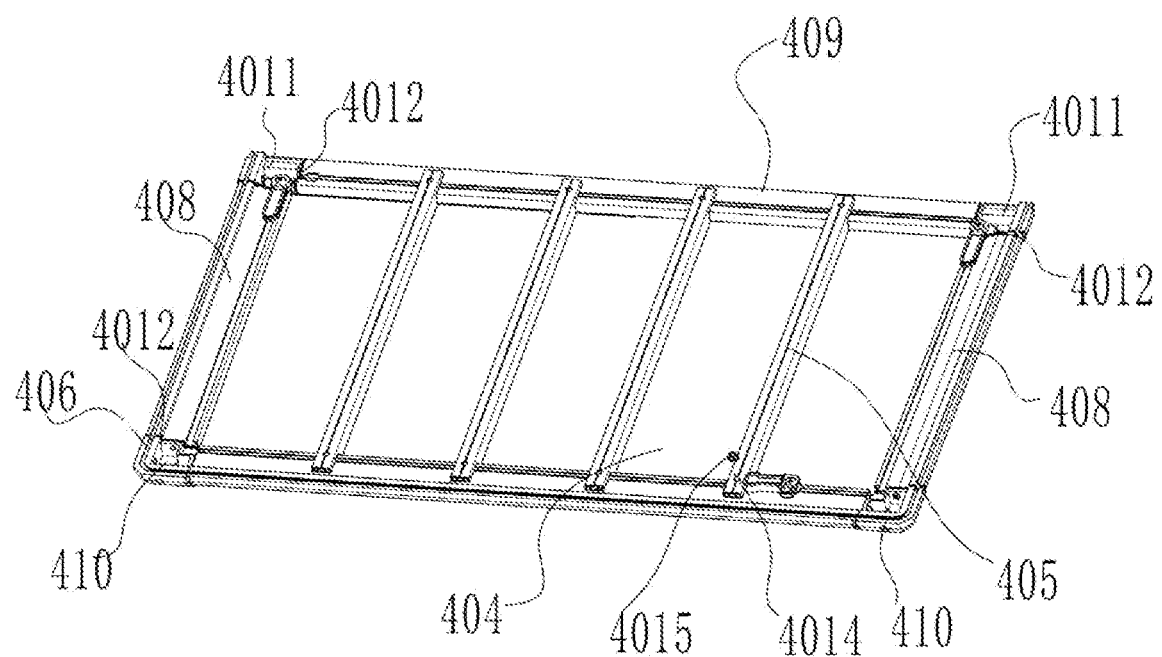
FIG. 73 is a schematic diagram of a three-dimensional structure of a bottom view of a top cover according to a second embodiment of the present disclosure.
Figure 74:
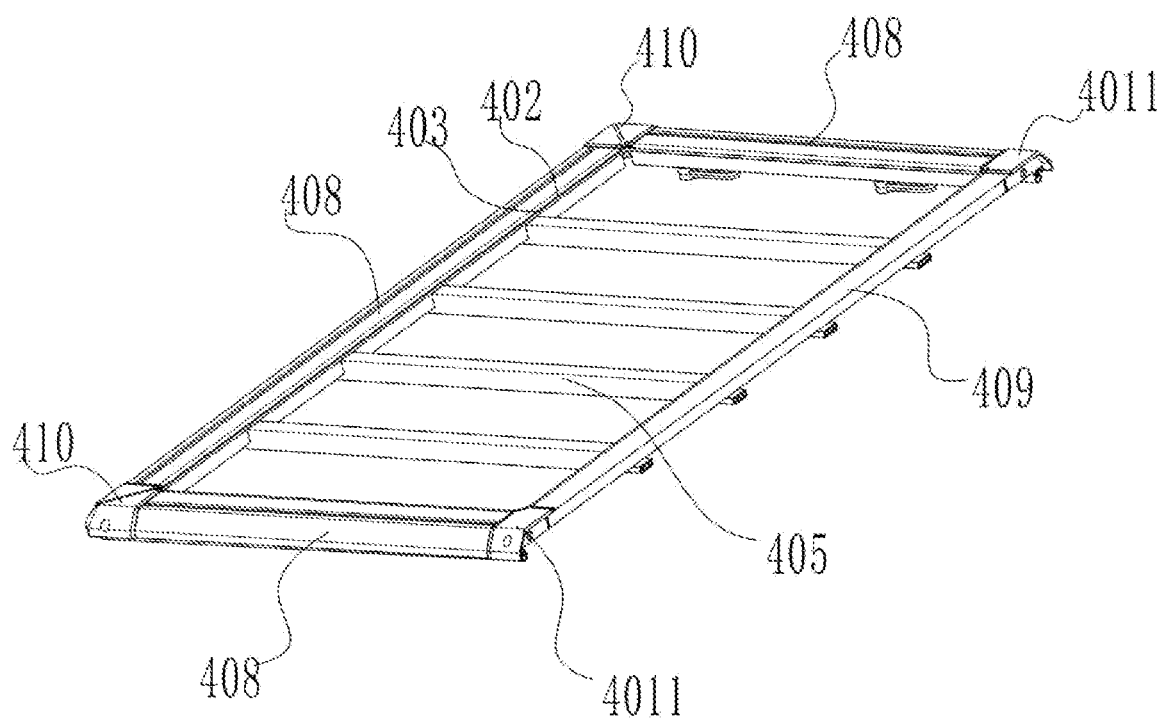
FIG. 74 is a schematic structural diagram of removing a top plate of top panel from a top cover according to a second embodiment of the present disclosure.
Figure 75:
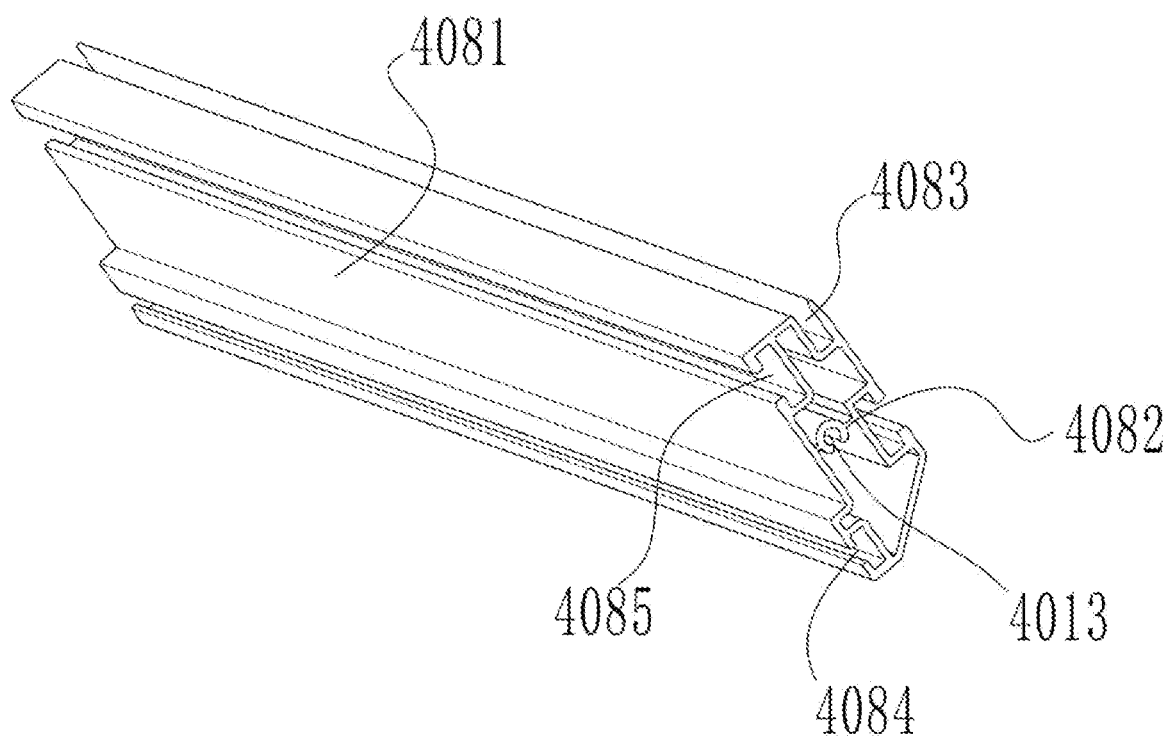
FIG. 75 is a schematic structural diagram of a first top panel profile in a second embodiment of the present disclosure.
Figure 76:
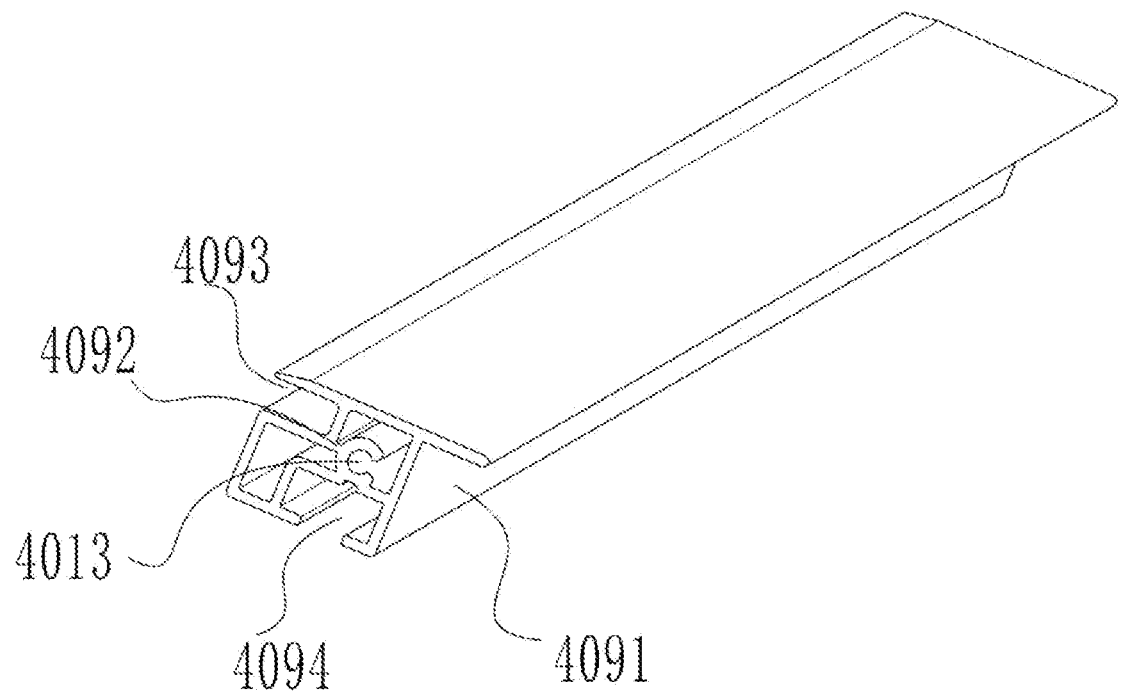
FIG. 76 is a schematic structural diagram of a second top panel profile in a second embodiment of the present disclosure.
Figure 77:
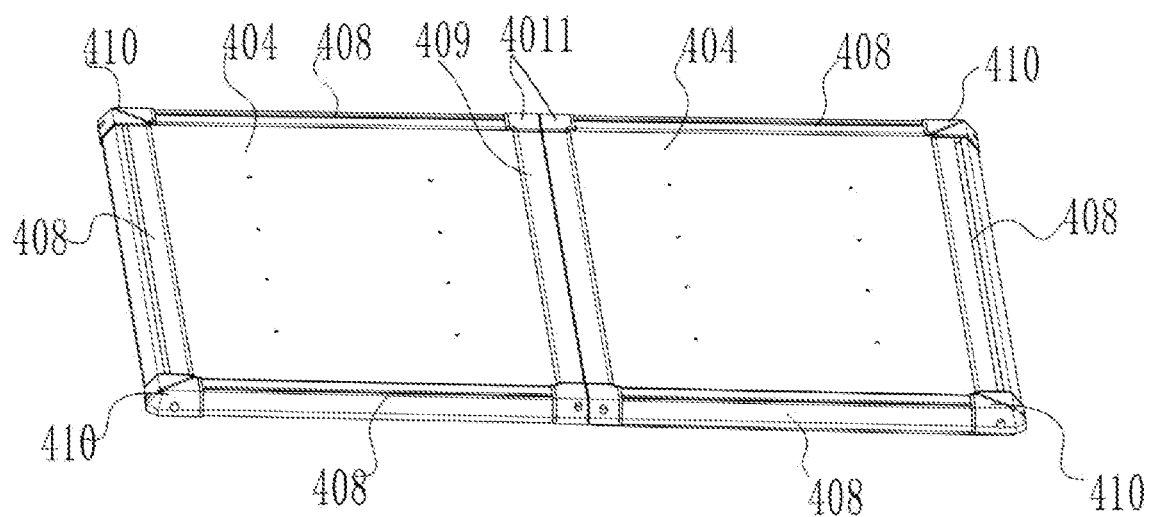
FIG. 77 is a schematic structural diagram of assembling two top panels in a second embodiment of the present disclosure.
Figure 78:
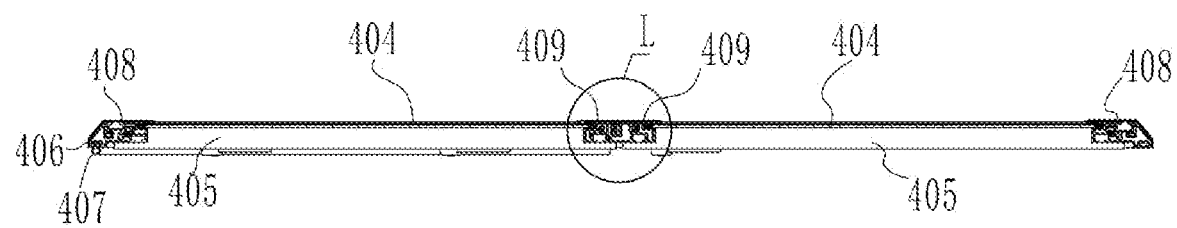
FIG. 78 is a schematic diagram of a transverse sectional structure of FIG. 77.
Figure 79:
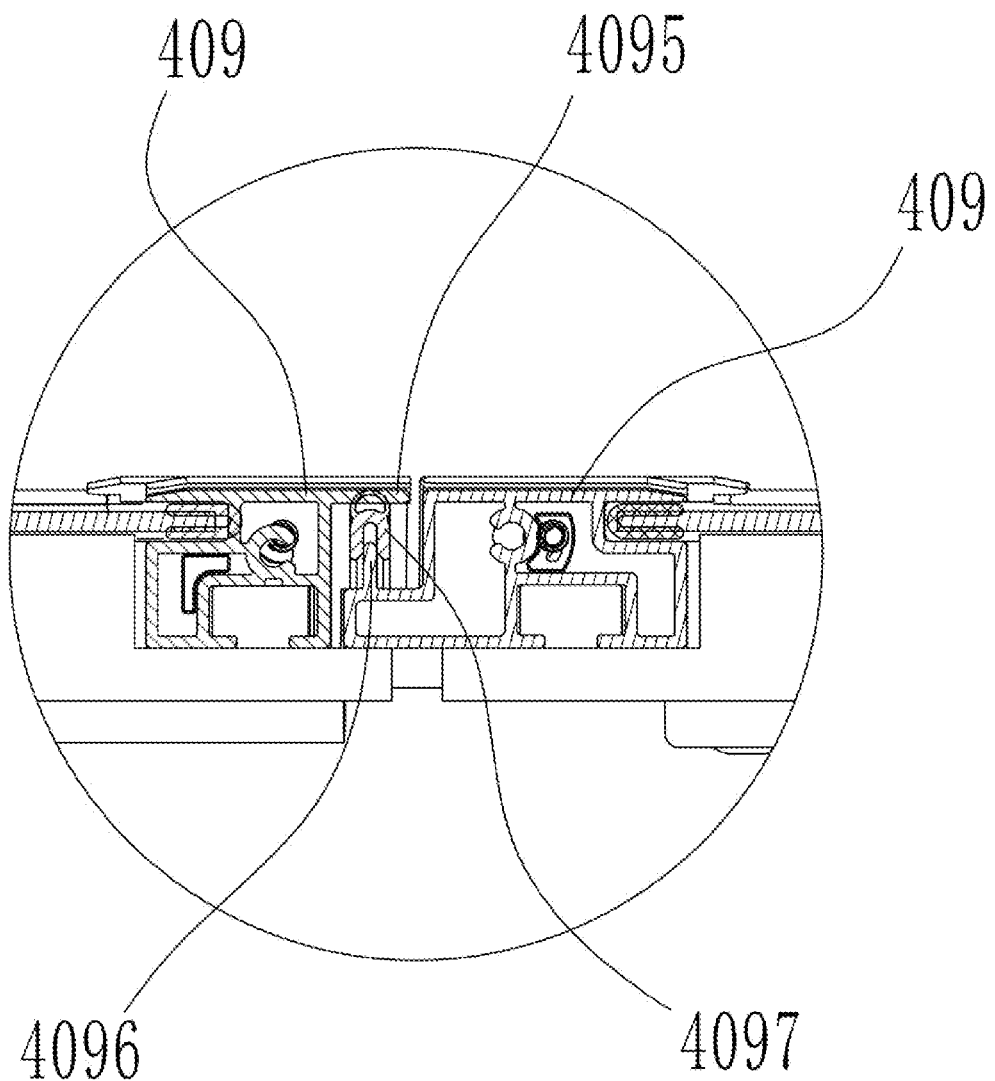
FIG. 79 is a partially enlarged structural diagram of part L in FIG. 78.
Figure 80:
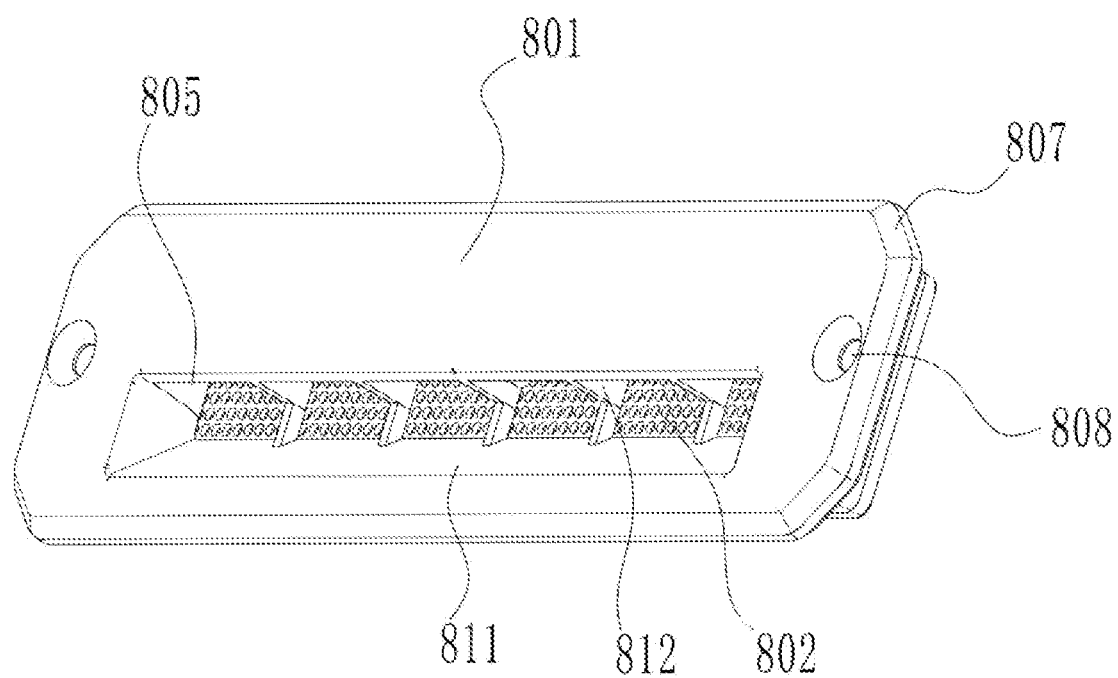
FIG. 80 is a schematic diagram of a three-dimensional structure of an air circulation device according to a third embodiment of the present disclosure.
Figure 81:
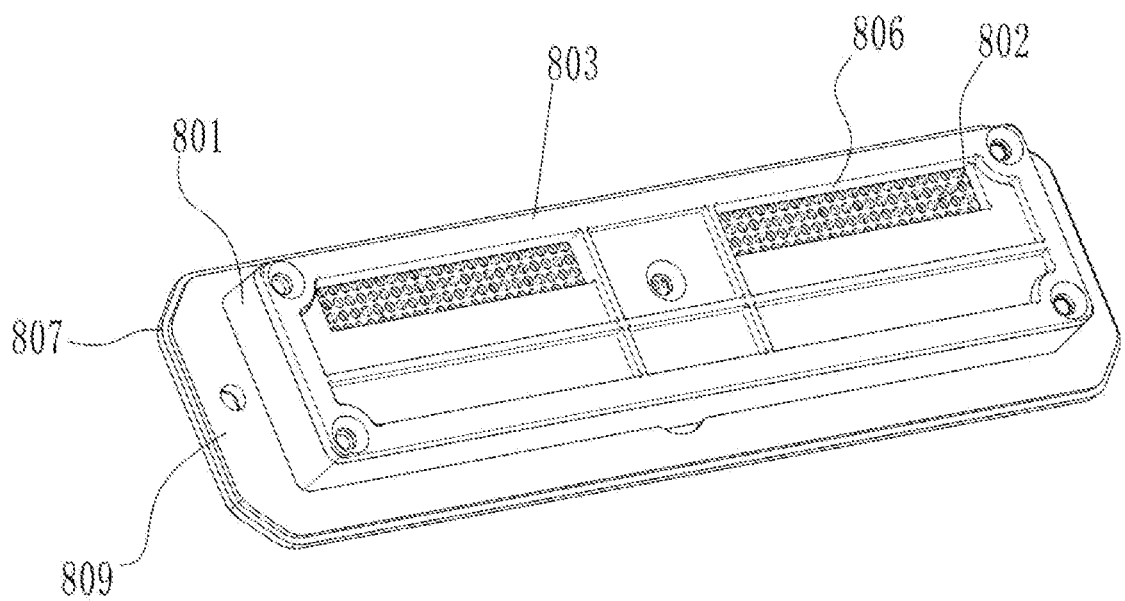
FIG. 81 is a schematic diagram of a three-dimensional structure of a rear view of FIG. 80.
Figure 82:
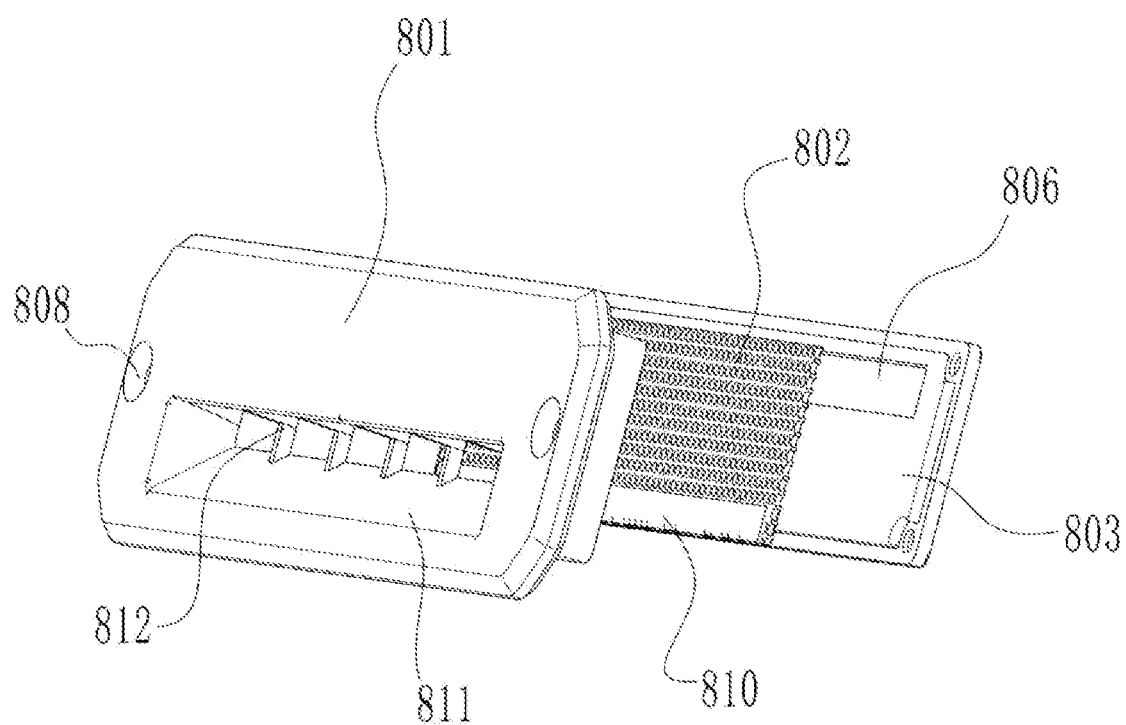
FIG. 82 is a schematic diagram of an exploded structure of a first viewing angle of an air circulation device according to a third embodiment of the present disclosure.
Figure 83:
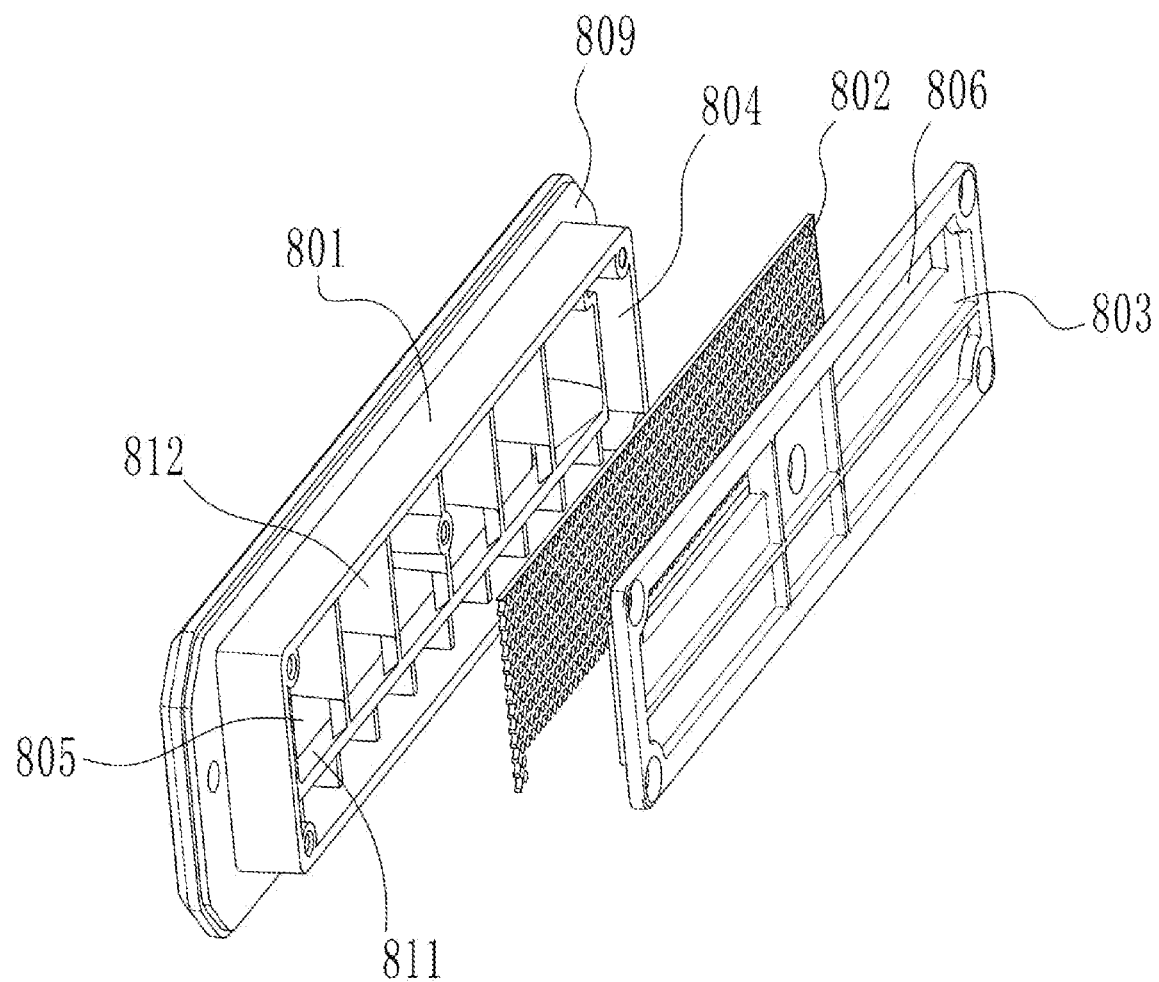
FIG. 83 is a schematic diagram of an exploded structure of a second viewing angle of an air circulation device according to a third embodiment of the present disclosure.

As shown in FIG. 32, the present disclosure provides a vehicle 200. The vehicle 200 includes any high-strength lightweight automobile compartment tonneau cover 100 described above.

Embodiment 2

As shown in FIG. 33 to FIG. 47, this embodiment provides a pickup truck tonneau cover, including a front cover 10, a rear cover 20, a first side cover 30, and a second side cover 50. The front cover 10, the rear cover 20, the first side cover 30, and the second side cover 50 are enclosed and connected to form a frame structure. The frame structure is provided with an upper opening and a lower opening, and at least one top cover 40 is mounted at the upper opening. There may be one to three top covers 40. A tonneau cover enclosed by the front cover 10, the rear cover 20, the first side cover 30, the second side cover 50, and the top cover 40 is mounted at a trunk of a pickup truck to protect the trunk. In specific applications, objects inside can be fetched and placed by corresponding opening and closing of the rear cover 20, the first side cover 30, the second side cover 50, and the like. After the tonneau cover is mounted, a user still needs to add a hanging function, an accessory extension function, and the like on an outer side or inner side of the tonneau cover in actual use. There is no corresponding extension structure reserved in the existing tonneau cover, so that the tonneau cover may be damaged when a new structure is mounted. Therefore, in order to achieve extension without changing the structure of the tonneau cover, the following improvements are made.

Specifically, the front cover 10 includes a first front panel profile 101, a second front panel profile 103, and a third front panel profile 105 which are used for being enclosed to form a front panel frame structure 100. The rear cover 20 includes a first rear panel profile 211 and a second rear panel profile 212 which are used for being enclosed to form a rear panel frame structure 201. Each of the first side cover 30 and the second side cover 50 includes a first side panel profile 309, a second side panel profile 312, and a third side panel profile 313 which are used for being enclosed to form a side panel frame structure 301. The top cover 40 includes a first top panel profile 408 and a second top panel profile 409 which are used for being enclosed to form a top panel frame structure 401. At least one sliding chute 90 that extends in a lengthwise direction is arranged on an inner side and/or an outer side of each of the first front panel profile 101, the second front panel profile 103, the third front panel profile 105, the first rear panel profile 211, the second rear panel profile 212, the first side panel profiles 309, the second side panel profiles 312, the third side panel profiles 313, the first top panel profile 408, and the second top panel profile 409. Specifically, during the arrangement, the sliding chutes 90 can be considered to be arranged on some corresponding profiles or all the profiles according to an actual usage need. Specific arrangement positions and whether the sliding chutes are arranged on the inner and outer sides can be selected according to an actual need. The main improvement is that after the sliding chutes 90 are arranged on the corresponding profiles, new structures such as extension guide rails can be mounted through fasteners matched with the sliding chutes 90, without damaging the structure of the tonneau cover. Furthermore, after the sliding chutes 90 are reserved, the user can quickly mount expandable functional members according to an actual usage need. When the sliding chutes 90 are arranged during profile forming, the structural strength and stability of the profiles can be guaranteed.

As a result, the structural stability of the tonneau cover is always maintained when the extension function is added.

Meanwhile, due to the adding of the sliding chutes 90, at least one quick clamping structure 1000 is arranged at each of adjacent connection positions between two adjacent members among the first front panel profile 101, the second front panel profile 103, the third front panel profile 105, the first rear panel profile 211, the second rear panel profile 212, the first side panel profiles 309, the second side panel profiles 312, the third side panel profiles 313, the first top panel profile 408, and the second top panel profile 409. The profiles with the adjacent connection positions can be quickly assembled or disassembled through the quick clamping structures 1000, and the quick clamping structures 1000 are matched with the sliding chutes 90 for connection.

Each quick clamping structure 1000 includes a fixed bracket 1100; the fixed bracket 1100 includes a first connection plate 1200 and a second connection plate 1300; the first connection plate 1200 is provided with a first connection hole 1400; the second connection plate 1300 is provided with a U-shaped opening 1500; a first locking structure 1600 is arranged in one of the sliding chutes 90 located at the adjacent connection positions, and a second locking structure 1700 is arranged in the other sliding chute 90; the first locking structure 1600 passes through the first connection hole 1400 for locking; and the second locking structure 1700 is inserted into the U-shaped opening 1500 for locking. The first connection plate 1200 is fixed through the first locking structure 1600, and the second connection plate 1300 is locked through the second locking structure 1700 after sliding limitation. Thus, after the quick clamping structures 1000 are placed into the sliding chutes 90 in advance and then slide to predetermined fixed positions, the quick clamping structures are locked by the first locking structures 1600 and the second locking structures 1700.

There is an arrangement manner that two adjacent stages of sliding chutes 90 are perpendicular to each other or are located on the same horizontal plane. Therefore, the first connection plate 1200 and the second connection plate 1300 can be perpendicular to each other or located in the same plane as an integrated structure. This can be selected according to adjacent position relationships of the sliding chutes 90.

Specifically, the first locking structure 1600 includes a first T-shaped nut 1601 slidably arranged in the sliding chute 90; and the first T-shaped nut 1601 is in threaded connection with a fastening screw 1602. After sliding into the sliding chute 90, the first T-shaped nut 1601 is limited from being separated, and quick locking and connection are achieved after the fastening screw 1602 is locked on the first T-shaped nut 1601 through the first connection hole 1400.

The second locking structure 1700 includes a second T-shaped nut 1701 slidably arranged in the sliding chute 90; the second T-shaped nut 1701 is in threaded connection with a hand-threaded bolt 1702; and a compression flat washer 1703 sleeves the hand-threaded bolt 1702. The second T-shaped nut 1701 slides in the sliding chute 90 to drive the hand-threaded bolt 1702 to synchronously slide, so that after being inserted into the U-shaped opening 1500, the hand-threaded bolt 1702 is manually rotated to lock the quick clamping structure 1000, and the compression flat washer 1703 covers the U-shaped opening 1500 to bear the hand-threaded bolt 1702 and compress the quick clamping structure 1000.

Therefore, after the quick clamping structure 1000 is fastened at the corresponding position through the first locking structure 1600 in advance, quick locking or loosening is achieved by adjusting the position of the second locking structure 1700 to match the U-shaped opening 1500, so that quick assembling or disassembling can be achieved without using a tool.

The sliding chute 90 has a T-shaped cross section, which can enable the fastener to extend and limit the T-shaped nut inside, thereby achieving stable limitation and supporting during locking.

Specifically, the front panel frame structure 100 is provided with a first front panel sealing groove 106; a first front panel sealing rubber strip 107 and a front panel structure 108 embedded in the first front panel sealing rubber strip 107 are arranged in the first front panel sealing groove 106. The front panel frame structure 100 is provided with an air circulation device 80. In the rear cover 20, after the front panel structure 108 is sealed through the first front panel sealing rubber strip 107, a situation inside the trunk can be seen from the cab through the front panel structure 108. The front panel structure 108 has glass. Meanwhile, adding the air circulation device 80 can achieve circulation of air inside and outside the tonneau cover, as well as internal heat dissipation.

Based on the structure of the front cover, the following technical solutions can also be adopted. As shown in FIG. 48 to FIG. 55, the front cover is a part of the tonneau cover product. In the prior art, a sheet metal welded structure or an integrated structure of glass fiber reinforced plastics is used, so that the structural strength, the function of adjusting the size according to a vehicle model, and the like cannot be further optimized. The size is basically fixed after the product is formed. A new mold needs to be made to adjust the size, so that the product in the prior art has low adaptability. In order to improve the defects of the prior art, the front panel in this embodiment includes a first front panel profile 101 and first front panel end sockets 102 arranged at two ends of the first front panel profile 101. The two first front panel end sockets 102 are respectively connected with second front panel profiles 103; second front panel end sockets 104 are arranged on the second front panel profiles 103. A third front panel profile 105 is connected between the two second front panel end sockets 104; a front panel frame structure 100 is formed by enclosing the first front panel profile 101, the first front panel end sockets 102, the second front panel profiles 103, the second front panel end sockets 104, and the third front panel profile 105. The specific front panel frame structure 100 can adjust lengths of the first front panel profile 101, the second front panel profiles 103, and the third front panel profile 105 to adjust the basic size of the overall front panel. Front panel structures adapting to various sizes can be quickly formed without changing the structures of the first front panel end sockets 102 and the structures of the second front panel end sockets 104. Furthermore, the assembled structure is used, so that these components can be separately delivered and assembled, and the efficiency of product assembling is higher than the efficiency of direct product molding.

Meanwhile, a first front panel sealing groove 106 is arranged on the front panel frame structure 100. A first front panel sealing rubber strip 107 and a front panel structure 108 embedded in the first front panel sealing rubber strip 107 are arranged in the first front panel sealing groove 106, so that the structural stability and strength of the entire front panel are determined by the front panel frame structure 100. Therefore, the front panel structure 108 will not play a role of bearing as it is only for the convenience for a passenger inside the vehicle to see situations in the compartment through the front panel structure 108. However, good waterproof performance is achieved between the front panel structure 108 and the front panel frame structure 100 through the first front panel sealing groove 106 and the first front panel sealing rubber strip 107, avoiding water leakage from the front panel. The first front panel sealing groove 106 is composed of the first front panel profile 101, the second front panel profiles 103, the third front panel profile 105, the first front panel end sockets 102, and the second front panel end sockets 104, so the first front panel sealing rubber strip 107 is of an integrated structure that can compensate for gaps at joints of the split structures, thereby ensuring the sealing performance.

The first front panel profile 101 includes a first front panel profile body 1011 composed of two layers of hollow profiles, and a cross-sectional structure of the first front panel profile body 1011 is not limited. The main consideration is that the integrated double-layer profile structure has better structural strength and stability than a sheet metal structure. Meanwhile, in order to facilitate the connection and mounting of the first front panel end sockets 102, two first front panel locking members 1012 located in a hollow region are arranged on the first front panel profile body 1011 at an interval. The first front panel locking members 1012 are provided with front panel fastening holes 109. Each first front panel locking member 1012 can be in a structural form composed of a column having a notch in a middle part and reinforcing ribs arranged between the column and the two layers of profiles. On the one hand, it is convenient for integrated molding, and on the other hand, the front panel fastening holes 109 can be through holes. The notches are matched with screws for locking, without looseness, which improves the generality.

Meanwhile, a first front panel U-shaped groove 1013 that is used for constituting the first front panel sealing groove 106 is arranged on one side of the first front panel profile body 1011. A corresponding portion of the first front panel sealing rubber strip 107 can be inserted into the first front panel U-shaped groove 1013. A first front panel T-shaped sliding chute 1014 is arranged on the other side of the first front panel profile body 1011. A T-shaped sealing rubber hose can be mounted inside the first front panel T-shaped sliding chute 1014 to facilitate sealing with an adjacent matching structure, such as sealing after the top panel is mounted.

In addition, each second front panel profile 103 includes a second front panel profile body 1031 composed of two layers of hollow profiles. A cross-sectional structure of the second front panel profile body 1031 is not limited, as long as it can adapt to the connection with the first front panel end socket 102 and can also meet the sealing performance-related feature that need to be met after the front panel is mounted in the future. The second front panel profile body 1031 is provided with two second front panel locking members 1032 located in a hollow region and corresponding to a spacing distance between the two first front panel locking members 1012. The second front panel locking members 1032 are provided with front panel fastening holes 109. Similarly, the second front panel profiles 103 can be connected to the first front panel end sockets 102 and the second front panel end sockets 104 through the second front panel locking members 1032 and the front panel fastening holes 109. Meanwhile, a second front panel U-shaped groove 1033 used for constituting the first front panel sealing groove 106 is arranged on one side of the second front panel profile body 1031. Similarly, a corresponding portion of the first front panel sealing rubber strip 107 can be inserted into the second front panel U-shaped groove 1033.

The third front panel profile 105 includes a third front panel profile body 1051 composed of two layers of hollow profiles. Similarly, a cross-sectional structure of the third front panel profile body 1051 is not limited, as long as the cross-sectional structure can be designed correspondingly to specifically meet corresponding connection requirements. The third front panel profile body 1051 is provided with a third front panel locking member 1052 located in a hollow region; the locking member is provided with a front panel fastening hole 109. Connection to the second front panel end sockets 104 is achieved through the third front panel locking member 1052 and the front panel fastening hole 109. Meanwhile, a third front panel U-shaped groove used for constituting the first front panel sealing groove 106 is arranged on one side of the third front panel profile body 1051, and a second front panel T-shaped sliding chute 1054 is arranged on the other side of the third front panel profile body 1051. A corresponding portion of the first front panel sealing rubber strip 107 can be inserted into the third front panel U-shaped groove. The second front panel T-shaped sliding chute 1054 can mount a T-shaped sealing rubber hose. This facilitates sealing of a mounting position after the product is mounted in the compartment.

The first front panel profile 101 and the second front panel profiles 103 are connected through the first front panel end sockets 102. A specific structure of each first front panel end socket includes a first front panel connection seat 1021 and a first front panel end cover 1022 locked on the first front panel connection seat 1021. The first front panel end cover 1022 is detachable, which facilitates a fastening operation inside during specific connection. A fourth front panel U-shaped groove 1023 used for constituting the first front panel sealing groove 106 is provided between the first front panel end cover 1022 and the first front panel connection seat 1021. Similarly, a corresponding portion of the first front panel sealing rubber strip 107 can be inserted into the fourth front panel U-shaped groove 1023 to achieve locking. Front panel mounting holes 110 corresponding to the front panel fastening hole 109 of the first front panel locking member 1012 and the front panel fastening hole 109 of the second front panel locking member 1032 are respectively arranged at two connection ends of the first front panel connection seat 1021. After fasteners passing through the front panel mounting holes 110 are locked on the corresponding front panel fastening holes 109 of both the first front panel locking member 1012 and the second front panel locking member 1032, the first front panel connection seat 1021 fixedly connects the first front panel profile 101 to the second front panel profile 103, and the first front panel end cover 1022 is then fixed on the first front panel connection seat 1021 to complete the fixed connection.

The second front panel profiles 103 and the third front panel profile 105 are connected through the second front panel end sockets 104. A specific structure of each second front panel end socket includes a second front panel connection seat 1041 and a second front panel end cover 1042 locked on the second front panel connection seat 1041. A fifth front panel U-shaped groove 1043 that constitutes the first front panel sealing groove 106 is provided between the second front panel end cover 1042 and the second front panel connection seat 1041. A corresponding portion of the first front panel sealing rubber strip 107 can also be inserted into fifth front panel U-shaped groove 1043 to achieve sealing. Front panel mounting holes 110 corresponding to the front panel fastening hole 109 of the second front panel locking member 1032 and the front panel fastening hole 109 of the third front panel locking member 1052 are respectively arranged at two connection ends of the second front panel connection seat 1041. Similarly, after the second front panel end cover 1042 is opened, the second front panel connection seat 1041 is fixedly connected to the second front panel profile 103 and the third front panel profile 105 through fasteners, and the second front panel end cover 1042 is then fixedly mounted, so as to complete the mounting and connection of the entire second front panel end socket 104.

Specifically, when the first front panel connection seat 1021 and the second front panel connection seat 1041 are used as intermediate connectors to achieve connection, connection parts also need to be sealed. Front panel sealing gaskets 120 are arranged at the two connection ends of the first front panel connection seat 1021 and the two connection ends of the second front panel connection seat 1041. The front panel sealing gaskets 120 can be respectively fixed on end surfaces of the connection ends in an adhesion manner, so that they will not be separated during subsequent mounting. Front panel bosses 130 that pass through the front panel sealing gaskets 120 are arranged at the two connection ends of the first front panel connection seat 1021 and the two connection ends of the second front panel connection seat 1041. The number and shapes of the corresponding front panel bosses 130 are based on the number and shape of the first front panel locking member 1012, the number and shape of the second front panel locking member 1032, and the number and shape of the third front panel locking member 1052, so that it can be convenient for achieving primary positioning through the front panel bosses 130 when the first front panel connection seat 1021 and the second front panel connection seat 1041 are locked.

Meanwhile, a third front panel T-shaped sliding chute 1044 is formed in the second front panel connection seat 1041. The second front panel T-shaped sliding chute 1054 and the third front panel T-shaped sliding chute 1044 constitute a second sealing groove used for mounting, connection, and sealing. A T-shaped sealing rubber hose is threaded into the second sealing groove to facilitate sealing of a mounting position after the product is mounted in the compartment.

In order to facilitate achieving connection with the side panel during the mounting of the entire front panel, front panel recesses 140 used for connecting the side panel are arranged on the first front panel connection seat 1021 and the second front panel connection seat 1041, so as to mount connectors on the front panel recesses 140 to achieve the fixed connection between the front panel and the side panel.

Specifically, the front panel structure 108 includes a front panel fixing plate 1081 and a front panel slotted hole 1082 formed in the front panel fixing plate 1081; front panel glass 1083 is embedded in the front panel fixing plate 1081. The front panel glass 1083 is at least partially exposed out of the front panel slotted hole 1082. Specifically, after the front panel glass 1083 is embedded in the front panel fixing plate 1081, the mounting position can be sealed through a sealing rubber pad, so that after the front panel glass 1083 is mounted and sealed, a situation in the compartment can also be seen through the front panel glass 1083.

A rear panel door plate 202 is rotatably mounted on the rear panel frame structure 201. Rear panel gas springs 203 are arranged between the rear panel door plate 202 and the rear panel frame structure 201. The rear panel frame structure 201 is provided with a rear panel sealing flange and a rear panel waterproof rubber hose 205 sleeving the rear panel sealing flange. When the rear panel door plate 202 is in a closed state, the rear panel door plate compresses the rear panel waterproof rubber hose 205; and the rear panel frame structure 201 is provided with an air circulation device 80. After the front cover 10 is relatively assembled and fixed, the rear panel door plate 202 can rotate relative to the rear panel frame structure 201 to achieve an opened or closed state. When the rear panel door plate is opened, an object can be fetched from the inside or placed. When closed, the rear panel door plate 202 compresses the rear panel waterproof rubber hose 205 to achieve reliable sealing, thus ensuring the overall sealing performance of the tonneau cover. The rear panel gas springs 203 adopt the existing structure and is used for achieving supporting when the rear panel door plate 202 is opened or closed.

Based on the structure of the rear cover, the following technical solutions can also be adopted. As shown in FIG. 56 to FIG. 63, the rear cover includes a U-shaped combined rear panel frame structure 201. A rear panel door plate 202 is rotatably mounted on the rear panel frame structure 201; rear panel gas springs 203 are arranged between the rear panel door plate 202 and the rear panel frame structure 201. Through the combined rear panel frame structure 201, the size of the tonneau cover can be adaptively adjusted according to the size of the compartment of the pickup truck, and the rear panel frame structure has good structural supporting strength and is hard to deform in an actual application process, thus ensuring the flexibility of rotation of the rear panel door plate 202 relative to the rear panel frame structure 201. Furthermore, in the rotation process of the rear panel door plate 202, the rear panel gas springs 203 support the rear panel door plate 202 in an opened state and buffer the rear panel door plate 202 in a closed state.

After being closed, the rear panel door plate 202 needs to meet a good sealing effect. A rear panel sealing flange 204 and a rear panel waterproof rubber hose 205 sleeving the rear panel sealing flange 204 are arranged on the rear panel frame structure 201. When the rear panel door plate 202 is in the closed state, the rear panel door plate 202 compresses the rear panel waterproof rubber hose 205 to ensure the good waterproof sealing effect. Furthermore, rear panel push locks 206 are also arranged between the rear panel door plate 202 and the rear panel frame structure 201. The closed state of the rear panel door plate 202 is locked through the rear panel push locks 206, and can only be unlocked by a matching key, thus protecting the objects in the compartment after the rear panel door plate 202 is closed.

In order to facilitate seeing the states of the objects in the compartment from the rear panel door plate 202, specifically, a rear panel slotted hole 2020 and rear panel glass 207 fixed on the rear panel door plate 202 and covering the rear panel slotted hole 2020 are arranged on the rear panel door plate 202. A space between the rear panel glass 207 and the rear panel door plate 202 is filled with glue for the rear panel glass 207, so that the situation in the compartment can be seen from the outside through the rear panel glass 207.

Specifically, a rear panel rigid rod 208 and first rear panel sheet metal parts 209 respectively fixed at two end portions of the rear panel rigid rod 208 are fixed on an inner side of the rear panel door plate 202. The rear panel frame structure 201 is provided with second rear panel sheet metal parts 210 corresponding to the first rear panel sheet metal parts 209. One ends of the rear panel gas spring 203 are mounted on the first rear panel sheet metal parts 209, and the other ends are mounted on the second rear panel sheet metal parts 210. The rear panel door plate 202 is thin. Through the arrangement of the rear panel rigid rod 208 and the first rear panel sheet metal parts 209, the strength of the rear panel door plate 202 can be enhanced. Furthermore, after the rear panel gas springs 203 are mounted, and the second rear panel sheet metal parts 210 are mounted and fixed on the rear panel frame structure 201, corresponding position adjustment can be achieved according to the elasticity of the rear panel gas springs 203, which is convenient for adjusting the elastic acting forces for opening and closing the rear panel door plate 202.

Specifically, the rear panel frame structure 201 includes a first rear panel profile 211 and second rear panel profiles 212. The first rear panel profile 211 and the second rear panel profiles 212 are both extruded aluminum profiles, and their cross-sectional structures are not limited, as long as connection and hermetical mounting are achieved. First rear panel end sockets 213 are mounted at two ends of the first rear panel profile 211. The second rear panel profiles 212 are mounted on the first rear panel end sockets respectively. Second rear panel end sockets 214 are mounted at tail ends of the second rear panel profiles 212. Rear panel waterproof rubber pads 215 are arranged at two connection ends of the first rear panel end sockets 213 and two connection ends of the second rear panel end sockets 214. The first rear panel profile 211 and the second rear panel profiles 212 are connected under the connection action of the first rear panel end sockets 213 and the second rear panel end sockets 214 to form the rear panel frame structure 201. Furthermore, the rear panel waterproof rubber pads 215 achieve waterproof sealing of the joints. Thus, the entire rear panel frame structure 201 is more stable in structure and can have good structural strength.

The first rear panel profile 211 includes a first rear panel profile body 2111 composed of two layers of hollow profiles. First rear panel profile locking members 2112 are arranged in the first rear panel profile body 2111 at an interval. The first rear panel profile locking members 2112 are provided with rear panel fastening holes 216. The first rear panel end sockets 213 are in fastened connection through the rear panel fastening holes 216. A first rear panel profile flange 2113 used for constituting a portion of the rear panel sealing flange 204 is arranged on one side of the first rear panel profile body 2111. The first rear panel profile body 2111 is further provided with a first rear panel profile T-shaped groove I 2114 located on one side of the first rear panel profile flange 2113 and a first rear panel profile T-shaped groove II 2115 away from one side of the first rear panel profile flange 2113. A corresponding portion of the rear panel waterproof rubber hose 205 is positioned and mounted through the first rear panel profile flange 2113; the first rear panel profile T-shaped groove I 2114 is used for mounting the rear panel door plate 202; and the first rear panel profile T-shaped groove II 2115 are used for mounting the structure of the top panel, which is convenient for connection after the tonneau cover is subsequently assembled.

A T-shaped rear panel mounting screw 217 is arranged in the first rear panel profile T-shaped groove I 2114. The rear panel door plate 202 is connected to the rear panel mounting screw 217 through a hinge. The position can be relatively adjusted in the first rear panel profile T-shaped groove I 2114 through the rear panel mounting screw 217 to ensure that the rear panel door plate 202 has good rotation flexibility after being mounted through the hinge, which can avoid deformation caused by non-uniform stress on the rear panel door plate 202. After the hinge is fixed with the rear panel mounting screw 217 in the first rear panel profile T-shaped groove I 2114 and connects the rear panel door plate 202, hidden mounting is achieved. When the rear panel door plate 202 is in the opened or closed state, or in the process of rotating the rear panel door plate 202, the hinge observed from the outside is not exposed and is hidden inside.

The second rear panel profile 212 includes a second rear panel profile body 2121 composed of two layers of hollow profiles. Second rear panel profile locking members 2122 corresponding to the first rear panel profile locking members 2112 are arranged in the second rear panel profile body 2121 at an interval. The second rear panel profile locking members 2122 are provided with rear panel fastening holes 216. The second rear panel end sockets 214 are in fastened connection through the rear panel fastening holes 216. A second rear panel profile flange 2123 used for constituting a portion of the rear panel sealing flange 204 is arranged on one side of the second rear panel profile body. A second rear panel profile sealing groove 2124 used for mounting a sealing rubber strip is formed in one side of the second rear panel profile body 2121 away from the second rear panel profile flange 2123. Similarly, the second rear panel profile flange 2123 is used for positioning and mounting the rear panel waterproof rubber hose 205 at the corresponding part. Furthermore, after a sealing rubber strip is mounted in the second rear panel profile sealing groove 2124, good sealing can be achieved during the mounting of the side panel.

The first rear panel end sockets 213 are used for assembling and connecting the first rear panel profile 211 and the second rear panel profiles 212. Specifically, the first rear panel end sockets 213 include first rear panel end socket connection seats 2131. The first rear panel end socket connection seats 2131 are provided with rear panel mounting holes 218 corresponding to the rear panel fastening holes 216. After passing through the rear panel mounting holes 218, fasteners fasten and connect the first rear panel profile 211 to the second rear panel profiles 212. First rear panel end socket covers 2132 are mounted on the first rear panel end socket connection seats 2131, and the first rear panel end socket covers 2132 cover the inside. Furthermore, the first rear panel end socket covers 2132 and edges of the first rear panel end socket connection seats 2131 are enclosed to form a first rear panel end socket sealing groove 2133 corresponding to the second rear panel profile sealing groove 2124. After a sealing rubber strip is correspondingly mounted in the first rear panel end socket sealing groove 2133, the entire rear panel and the side panel can be well sealed during the mounting. Meanwhile, the first rear panel end socket covers 2132 are provided with a first rear panel end socket flange 2134 used for constituting a portion of the rear panel sealing flange 204. The rear panel waterproof rubber hose 205 at the corresponding part is positioned and mounted through the first rear panel end socket flange 2134, so as to achieve sealing when the rear panel door plate 202 is closed.

Specifically, the second rear panel end sockets 214 include second rear panel end socket connection seats 2141. The second rear panel end socket connection seats 2141 are provided with rear panel mounting holes 218 corresponding to the rear panel fastening holes 216. The second rear panel end socket connection seats 2141 are fixed onto the second rear panel profiles 212 through screws passing through the rear panel mounting holes 218, and second rear panel end socket covers 2142 are mounted on the second rear panel end socket connection seats 2141. The second rear panel end socket covers 2142 cover the inside. Furthermore, the second rear panel end socket covers 2142 and edges of the second rear panel end socket connection seats 2141 are enclosed to form a second rear panel end socket sealing groove 2143 corresponding to the second rear panel profile sealing groove 2124. A sealing rubber strip in the second rear panel end socket sealing groove 2143 achieves good sealing performance after the rear panel and the side panel are mounted. Meanwhile, the second rear panel end socket covers 2142 are provided with a second rear panel end socket flange 2144 used for constituting a portion of the rear panel sealing flange 204. A corresponding portion of the corresponding rear panel waterproof rubber hose 205 is positioned through the second rear panel end socket flange 2144, so as to achieve good sealing after the rear panel door plate 202 is closed.

In order to facilitate assembling the entire rear panel into the tonneau cover and satisfy the cooperation in the compartment, specifically, rear panel bosses 219 and rear panel recesses 220 are arranged at two connection ends of the first rear panel end sockets 213 and the second rear panel end sockets 214. The rear panel bosses 219 are plugged into the first rear pane profile 211 and the second rear panel profiles 212 to achieve primary positioning before fastening. The rear panel recesses 220 can achieve cooperation and fixed connection during assembling with the side panel. Meanwhile, rear panel T-shaped grooves 221 used for mounting sealing are arranged at bottoms of the second rear panel end sockets 214. After sealing rubber strips are mounted in the rear panel T-shaped grooves 221, corresponding mounting sealing is achieved when the rear panel is mounted on the compartment.

Similarly, an air circulation device 80 is arranged on the rear panel frame structure 201 to achieve internal and external air circulation. Specifically, the air circulation device 80 is of a structure with waterproof, insect-proof, and ventilation functions. For example, the air circulation device 80 may include a ventilation opening for communicating the inside to the outside and is provided with an insect-proof structure. Meanwhile, considering that external rainwater is quickly guided to be drained and prevented from entering the tonneau cover, for example, a rain blocking edge covers the ventilation opening. Of course, an existing mature modularized structure can also be used and directly mounted, as long as it satisfies the ventilation, waterproof, and insect-proof functions.

Specifically, a side panel door plate 302 is rotatably mounted on the side panel frame structure 301. A side panel gas spring 306 is arranged between the side panel door plate 302 and the rear panel frame structure 201. The side panel frame structure 301 is provided with a side panel sealing flange 303 and a side panel sealing rubber strip 304 sleeving the side panel sealing flange 303. The side panel door plate 302 compresses the side panel sealing rubber strip 304 when it is in a closed state. The side panel door plate 302 is provided with a side panel hanging plate 308. After the first side cover 30 and the second side cover 50 are mounted in the tonneau cover, the convenience of fetching and placing an object from the side surface of the compartment also needs to be considered. The side panel door plate 302 has an opened or closed state when it is rotated relative to the side panel frame structure 301. When the side panel door plate is in the opened state, an object can be fetched or placed. When the side panel door plate is in the closed state, sealing needs to be achieved. Specifically, the side panel sealing flange 303 supports the side panel sealing rubber strip 304, so that when closed, the side panel door plate 302 compresses the side panel sealing rubber strip 304 to achieve sealing.

The side panel gas springs 306 also adopt a mature product and is mainly used for achieving limited supporting when the side panel door plate 302 is opened or closed.

Meanwhile, the side panel door plate 302 is provided with the side panel hanging plate 308, which further adds an extension structure to meet the requirements in actual use. Specifically, the side panel hanging plate 308 can adopt a slotted platy structure, or a perforated platy structure. Specifically, a slot or hole can be arranged on the side panel hanging plate 308 according to an actual use need to achieve function extension and facilitate object hanging.

Based on the structure of each side cover, as shown in FIG. 64 to FIG. 71, the following technical solution can also be adopted. As a component that constitutes the tonneau cover, the side cover is used for connecting the front cover, the rear cover, and the top cover to assemble the entire tonneau cover. The side cover includes a combined side panel frame structure 301 and a side panel door plate 302 rotatably mounted on the side panel frame structure 301. The side panel frame structure 301 is provided with a side panel sealing flange 303 and side panel sealing rubber strips 304 sleeving the side panel sealing flange 303. The side panel door plate 302 compresses the side panel sealing rubber strips 304 when it is in a closed state. The size can be adjusted due to the adoption of the combined side panel frame structure 301. The size can be adaptively adjusted when the product is applied to compartments of pickup trucks with different sizes. The side panel sealing flange 303 is arranged on the side panel frame structure 301 to mount and fix the side panel sealing rubber strips 304, so that it is convenient for the side panel door plate 302 to compress the side panel sealing rubber strips 304 to achieve sealing after the side panel door plate 302 is closed. Meanwhile, side panel connection bosses 305 that extend towards two sides and are used for connection are arranged on the side panel frame structure 301. The side panel connection bosses 305 achieve fixed connection on the front panel and the rear panel. Through holes are formed in the side panel connection bosses 305, so that it is convenient for fastening screws to pass through to achieve fixed connection.

Meanwhile, side panel gas springs 306 and a side panel push lock 307 are arranged between the side panel door plate 302 and the side panel frame structure 301. The side panel gas springs 306 can play a role of supporting when the side panel door plate 302 is opened and can play a role of buffering when the side panel door plate 302 is closed. Furthermore, after the side panel door plate 302 is closed, the side panel push lock 307 achieves locking. The side panel door plate can be opened only after being unlocked using a corresponding key.

Specifically, after the entire side panel is assembled to the tonneau cover, the side panel door plate 302 is opened to facilitate fetching and placement of the objects inside. The side panel door plate 302 is closed to protect the objects inside.

Specifically, the side panel frame structure 301 includes two first side panel profiles 309 arranged in parallel; two ends of the first side panel profiles 309 are respectively connected with first side panel end sockets 310 and second side panel end sockets 311; the two first side panel end sockets 310 are connected with a second side panel profile 312, and the two second side panel end sockets 311 are connected with a third side panel profile 313. The first side panel profiles 309 are connected to the second side panel profile 312 through the first side panel end sockets 310, and the first side panel profiles 309 are connected to the third side panel profile 313 through the second side panel end sockets 311, so that the formed side panel frame structure 301 is of a combined structure. Furthermore, lengths of the first side panel profiles 309, the second side panel profile 312, and the third side panel profile 313 are adjusted to adjust the size of the entire side panel frame structure 301, which is suitable for adaptive adjustment of the size of the compartment of the pickup truck. Furthermore, the combined side panel frame structure 301 can have better bearing strength.

Connection end surfaces of the first side panel end sockets 310 and the second side panel end sockets 311 are provided with side panel waterproof rubber pads 314. Waterproof sealing of joints is achieved through the side panel waterproof rubber pads 314. Furthermore, the side panel connection bosses 305 are arranged on the first side panel end sockets 310 and the second side panel end sockets 311 and extend towards two sides.

Specifically, the first side panel profile 309, the second side panel profiles 312, and the third side panel profiles 313 are all extruded aluminum profiles. Compared with a welded structure, this structure has high structural strength and can be conveniently molded and machined.

The first side panel profile 309 includes a first side panel profile main body 3091 composed of two layers of hollow profiles. First side panel profile locking members 3092 are arranged in the first side panel profile main body 3091; the first side panel profile locking members 3092 are provided with side panel fastening holes 315; and the first side panel end sockets 310 and the second side panel end sockets 311 are mounted and fixed through the side panel fastening holes 315. Furthermore, the first side panel profile main body 3091 is provided with first side panel profile flanges 3093 used for constituting a portion of the side panel sealing flange 303. After assembling, the first side panel flanges 3093 become a portion of the side panel sealing flange 303 to sleeve and support the sealing rubber pads at the corresponding positions. Meanwhile, the first side panel profile main body 3091 is provided with first side panel profile T-shaped grooves 3094 used for mounting the side panel gas springs 306. After T-shaped bolts are slidably mounted in the first side panel profile T-shaped grooves 3094, the mounting positions of the side panel gas springs 306 can be adjusted to achieve good opened and closed states of the side panel door plate 302. Furthermore, the first side panel profile main body 3091 is provided with first side panel profile sealing grooves 3095 located on one sides of the side panel connection bosses 305, facilitating the mounting of the sealing strips during the mounting of the front panel and the rear panel.

Specifically, each second side panel profile 312 includes a second side panel profile main body 3121 composed of two layers of hollow profiles. Second side panel profile locking members 3122 are arranged in the second side panel profile main body 3121 at an interval; side panel fastening holes 315 are formed in the second side panel profile locking members 3122. The first side panel end sockets 310 and the second side panel profile main body 3121 are mounted and fixed through the side panel fastening holes 315 and fasteners. The second side panel profile main body 3121 is provided with a second side panel profile flange 3123 used for constituting the side panel sealing flange 303. The second side panel profile flange 3123 sleeves and fixes a corresponding portion of the side panel sealing rubber strip 304. Meanwhile, the second side panel profile main body 3121 is provided with a second side panel profile T-shaped groove I 3124 located on one side of the second side panel profile flange 3123; a T-shaped connection bolt is slidably mounted in the second side panel profile T-shaped groove I 3124; and the side panel door plate 302 is mounted on the connection bolt through a hidden side panel hinge 318. After the side panel hinge 318 is fixed through the connection bolt, the side panel door plate 302 is mounted and can be rotatably opened and closed relative to the second side panel profiles 312. The hidden side panel hinge means that after the connection bolt is mounted through the second side panel profile T-shaped groove I 3124, and the side panel hinge 318 is fastened on the connection bolt and is then fastened and mounted on the side panel door plate 302, the side panel hinge 318 will not be exposed and hidden inside when the side panel door plate 302 is in the opened or closed state or in the relative rotation process of the side panel door plate 302.

The second side panel profile main body 3121 is provided with a second side panel profile T-shaped groove II 3125. A sealing strip mounted in the second side panel profile T-shaped groove II 3125 achieves sealing when the top panel is mounted on the entire side panel.

Specifically, the third side panel profile 313 includes a third side panel profile main body 3131 composed of a hollow profile. Third side panel profile locking members 3132 are arranged in the third side panel profile main body 3131 at an interval. Side panel fastening holes 315 are formed in the third side panel profile locking members 3132. The third side panel profile main body 3131 and the second side panel end sockets 311 are fixedly connected through cooperation between the side panel fastening holes 315 and fasteners. The third side panel profile main body 3131 is provided with a third side panel profile flange 3133 used for constituting a portion of the side panel sealing flange 303. A corresponding portion of the side panel sealing strip 304 is fixed through the third side panel profile flange 3133. The third side panel profile main body 3131 is provided with a third side panel profile T-shaped groove 3134 located on one side away from the third side panel profile flange 3133 and used for mounting and sealing. After a sealing strip is mounted in the third side panel profile T-shaped groove 3134, a sealing role can be played on the compartment after the mounting.

It should be noted that specific sectional structures of the first side panel profile 309, the second side panel profiles 312, and the third side panel profile 313 will not be limited, as long as during corresponding assembling, reliable connection and corresponding sealing can be achieved.

Specifically, the first side panel end sockets 310 include first side panel end socket connection seats 3101. The first side panel end socket connection seats 3101 are respectively provided with side panel mounting holes 316 corresponding to the first side panel profile locking members 3092 and the second side panel profile locking members 3122. Fasteners pass through the side panel mounting holes 316 to fix the first side panel profile 309 and the second side panel profiles 312. First side panel end socket covers 3102 are mounted on the first side panel end socket connection seats 3101. The first side panel end socket covers 3102 cover the internal structures. First side panel end socket flanges 3103 used for constituting a portion of the side panel sealing flange 303 is arranged on the first side panel end socket covers 3102, so that the first side panel end socket flanges 3103 clamp and locate a corresponding portion of the side panel sealing rubber strip 304.

The first side panel end socket covers 3102 and edge positions of the first side panel end socket connection seats 3101 are enclosed to form first side panel end socket sealing grooves 3104 communicated to the first side panel profile sealing grooves 3095. The first side panel end socket sealing grooves 3104 are used for mounting sealing strips for mounting the front panel and the rear panel. The side panel connection bosses 305 are portions of the first side panel end socket connection seats 3101, and the side panel connection bosses 305 fixedly connect the front panel with the rear panel.

Specifically, the second side panel end sockets 311 include second side panel connection seats 3111. The second side panel connection seats 3111 are respectively provided with side panel mounting holes 316 corresponding to the first side panel profile locking members 3092 and the third side panel locking members 3132. Fasteners passing through the side panel mounting holes 316 fixedly connect the first side panel profile 309 to the third side panel profile 313.

Furthermore, the second side panel connection seats 3111 are provided with second side panel end socket covers 3112. The first side panel end socket covers 3102 are provided with second side panel end socket flanges 3113 used for constituting portions of the side panel sealing flange 303. A corresponding portion of the side panel sealing rubber strip 304 is positioned through the second side panel end socket flanges 3113. Furthermore, the second side panel end socket covers 3112 and edge positions of the second side panel end socket connection seats 3111 are enclosed to form second side panel end socket sealing grooves 3114 communicated to the first side panel profile sealing grooves 3095. Thus, sealing strips for sealing connection positions for mounting the front panel and the rear panel are mounted through the first side panel profile sealing grooves 3095, the first side panel end socket sealing grooves 3104, and the second side panel end socket sealing grooves 3114, so as to ensure good sealing performance after the tonneau cover is assembled. Specifically, the second side panel end socket covers 3112 and bottom positions of the second side panel end socket connection seats 3111 are enclosed to form second side panel end socket T-shaped grooves 3115 used for mounting and sealing. The second side panel end socket T-shaped grooves 3115 are communicated to the third side panel profile T-shaped grooves 3134 to mount and position the entire sealing strip mounted on the compartment for sealing, which ensures the sealing of the entire side panel after mounting. The side panel connection bosses 305 are portions of the second side panel end socket connection seats 3111. The side panel connection bosses 305 are used for achieving fixed connection between the front panel and the rear panel.

In order to play a positioning role on the first side panel end socket connection seats 3101 and the second side panel end socket connection seats 3111 during mounting, side panel positioning bosses 317 extending outwards are arranged at two connection ends of the first side panel end socket connection seats 3101 and two connection ends of the second side panel end socket connection seats 3111. Through the side panel positioning bosses 317, corresponding fit plugging and positioning of the correspondingly connected first side panel profile locking members 3092, second side panel profile locking members 3122, or third side panel profile locking members 3132, so as to play a plugging and positioning role before fixing using fasteners.

Meanwhile, the side panel door plate 302 is provided with a side panel hanging plate 308. The side panel hanging plate 308 is provided with a plurality of side panel strip-shaped holes 3080. The side panel strip-shaped holes 3080 are of bent structures or linear structures, so that other objects can be hung on the side panel hanging plate 308.

The top cover 40 achieves good supporting and sealing. The top cover 40 will not be opened in a general case, but it needs to satisfy quick assembling or disassembling. An entire top cover 40 or a plurality of top covers 40 of the same structures can be mounted on the tonneau cover for top supporting and sealing. Specifically, the top panel frame structure 401 is provided with a first top panel sealing groove 402. A top panel sealing rubber strip 403 and top plates 404 of top panel embedded into the top panel sealing rubber strip 403 are arranged in the first top panel sealing groove 402. The top panel frame structure 401 is further provided with at least one top panel crossbeam 405 used for supporting the top plates 404 of top panel. The top plates 404 of top panel are sealed through second sealants to make the entire top cover 40 into a unit module. When a plurality of top covers 40 are assembled and connected, sealing rubber strips are also arranged at edges of the correspondingly matched top covers 40 to achieve sealing. The existing structure disclosed can be adopted.

Based on the structure of the top cover, the following technical solution can also be adopted. As shown in FIG. 72 to FIG. 79, the top cover is a part of the tonneau cover. Specifically, during combination and assembling, there may be one, two, three, or more top covers. The quantity can be preferably selected according to the size of the compartment matched with the tonneau cover. The top cover bears the top after being mounted in the tonneau cover, so that the top cover needs to have good bearing strength and deformation resistance. Specifically, the top cover includes a combined top panel frame structure 401 and a first top panel sealing groove 402 arranged on the top panel frame structure 401. A top panel sealing rubber strip 403 is arranged in the first top panel sealing groove 402. The top cover further includes top plates 404 of top panel clamped into the top panel sealing rubber strip 403. Sine the top panel frame structure 401 is of the combined structure, a corresponding top panel size can be matched according to the size of the compartment by adaptively adjusting the size of the top panel frame structure 401 only, which facilitates assembling the tonneau cover. Lengths of some profiles in the tonneau cover can be adjusted. The first top panel sealing groove 402 and the top panel sealing rubber strip 403 cooperate with each other to achieve good sealing on the top plates 404 of top panel after assembling.

In order to further ensure the bearing strength of the top plates 404 of top panel, top panel crossbeams 405 with adjustable spacings are mounted on the top panel frame structure 401 at intervals. The top plates 404 of top panel and the top panel crossbeams 405 are locked through fasteners. Based on the sizes of the top plates 404 of top panel, the plurality of top panel crossbeams 405 are arranged at intervals to uniformly support the top plates 404 of top panel, so as to ensure the bearing strength of the top plates 404 of top panel. Meanwhile, the top plates 404 of top panel are further fixed on the top panel crossbeams 405, which further improves the structural stability of top plates 404 of top panel.

Meanwhile, when the top panel is mounted in the tonneau cover, the mounting position needs to be sealed. Specifically, a second top panel sealing groove 406 is formed in the top panel frame structure 401. The second top panel sealing groove 406 is provided with a top panel T-shaped rubber hose 407 used for mounting and sealing. After the top panel T-shaped rubber hose 407 is mounted through the second top panel sealing groove 406, sealing fitness in a mounting state is achieved.

Specifically, the top panel frame structure 401 includes first top panel profiles 408 and second top panel profiles 409. The three first top panel profiles 408 are connected in sequence through first top panel end sockets 410. The second top panel profiles 409 are mounted on two oppositely arranged first top panel profiles 408 through second top panel end sockets 4011. Top panel sealing pads 4012 are arranged at connection ends of the first top panel end sockets 410 and the second top panel end sockets 4011. The top panel sealing pads 4012 seal joints after assembling. In order that the assembled top panel frame structure 401 has general constituting profiles, two kinds of profile structures and two kinds of end socket structures are mainly adopted. Specifically, the first top panel profiles 408 and the second top panel profiles 409 all extruded aluminum profiles, so that they have good structural strength. Sectional structures are not limited as long as sealing and mounting requirements can be met during assembling. The top panel crossbeams 405 are mounted on the second top panel profiles 409 and the first top panel profiles 408 parallel to the second top panel profiles 409. The top panel crossbeams 405 are uniformly distributed in a lengthwise direction of the entire top panel frame structure 401, and a spacing distance can be adjusted according to the structures of the top plates 404 of top panel. The first top panel profiles 408 and the second top panel profiles 409 can be locked by screws passing through the first top panel end sockets 410 and the second top panel end sockets 4011. Furthermore, before locking, the profiles can be positioned in advance. Thus, convex blocks are arranged at connection ends of the first top panel end sockets 410 and the second top panel end sockets 4011. The convex blocks are plugged into the first top panel profiles 408 and the second top panel profiles 409 to play a role of primary positioning. In addition, it should be noted that the first top panel profiles 408 may have different sizes in one top panel, but they have the same sectional structures which are different from cross sections of the second top panel profiles 409. Lengths of specific profiles are correspondingly adjusted according to size requirements.

Each first top panel profile 408 includes a first top panel profile body 4081 composed of two layers of hollow profiles. A first top panel profile locking member 4082 is arranged in the first top panel profile body 4081. A top panel locking hole 4013 is formed in the first top panel profile body 4082. The first top panel end socket 410 is fastened through the top panel locking hole 4013. A first top panel profile U-shaped groove 4083 used for constituting the first top panel sealing groove 402 and a first top panel profile T-shaped groove I 4084 used for constituting the second top panel sealing groove 406 are formed in the first top panel profile body 4081. A first top panel profile T-shaped groove II 4085 parallel to the first top panel profile T-shaped groove I 4084 is also formed in the first top panel profile body 4081. A corresponding portion of the top panel sealing rubber strip 403 is plugged into the first top panel profile U-shaped groove 4083 to seal a partial position. The first top panel profile T-shaped groove I 4084 is used for mounting a corresponding portion of the top panel T-shaped rubber hose 407. The top panel crossbeams 405 are mounted through the first top panel profile T-shaped groove II 4085, and a spacing distance can be adjusted according to the mounting positions.

Each second top panel profile 409 includes a second top panel profile body 4091 composed of two layers of hollow profiles. A second top panel profile locking member 4092 is arranged in the second top panel profile body 4091. A top panel locking hole 4013 is formed in the second top panel profile locking member 4092. The second top panel end socket 4011 is fastened and mounted through the top panel locking hole 4013, and a second top panel profile U-shaped groove 4093 used for constituting the first top panel sealing groove 402, and a second top panel profile T-shaped groove 4094 are formed in the second top panel profile body 4091. The top panel sealing rubber strip 403 at the corresponding part is plugged into the second top panel profile U-shaped groove 4093 for positioning and mounting, and the second top panel profile T-shaped groove 4094 is used for mounting the top panel crossbeams 405. Thus, the top panel crossbeams 405 can be mounted and fixed by the first top panel profile 408 parallel to the second top panel profile 409.

In order to achieve cooperation of assembling positions of two top panels, there is a structural difference in assembling portions of the corresponding second top panel profiles 409. A specific cooperation structure is as follows. A second top panel profile sealing plate 4095 extending towards one side away from the second top panel profile U-shaped groove 4093 is arranged on the second top panel profile body 4091; or, a second top panel profile vertical rib 4096 away from the second top panel profile U-shaped groove 4093 is arranged on the second top panel profile body 4091; and the second top panel profile vertical rib 4096 is sleeved with a second top panel profile waterproof rubber strip 4097. Thus, during assembling, the second top panel profile 409 on one top panel has the second top panel profile sealing plate 4095, and the second top panel profile 409 on the other top panel has the second top panel profile vertical rib 4096 and the second top panel profile waterproof rubber strip 4097 sleeving the second top panel profile vertical rib 4096. Therefore, during assembling, the second top panel profile sealing plate 4095 compresses the second top panel profile waterproof rubber strip 4097 to achieve good sealing and ensure the waterproof sealing performance of the assembled position.

Specifically, during mounting and fixing of the top panel crossbeams 405, spacing adjustment and fixing can be performed through the first top panel profile T-shaped groove II 4085 and the second top panel profile T-shaped groove 4094. Top panel T-shaped bolts 4014 are slidably mounted in the first top panel profile T-shaped groove II 4085 and the second top panel profile T-shaped groove 4094. Locking portions of the top panel T-shaped bolts 4014 are sleeved with top panel fastening nuts 4015 through the top panel crossbeams 405. The spacing adjustment is achieved through relative position movement of the top panel T-shaped bolts 4014, and the portions passing through the top panel crossbeams 405 are locked by the top panel fastening nuts 4015, so as to complete the fixing and mounting of the top panel crossbeams 405.

Meanwhile, after the top panel cross beams 405 are fixed, the top plates 404 of top panel are fixed on the top panel cross beams 405 through fasteners, which needs to satisfy good waterproof performance. Specifically, the fasteners include top panel self-tapping screws 4016 and top panel rubber pads 4017 screwed into the top panel self-tapping screws 4016. The top panel self-tapping screws 4016 are fixed on the top panel crossbeams 405 through the top plates 404 of top panel. Thus, after the top panel self-tapping screws 4016 are fixed on the top panel crossbeams 405 through the top plates 404 of top panel, the top panel rubber pads 4017 are compressed, so as to achieve sealing in a fastened state.

The rear panel door plate 202 and the side panel door plate 302 have the opened states or closed states. To protect the objects inside the tonneau cover, the rear panel frame structure 201 is provided with the rear panel push locks 206 for locking the rear panel door plate 202, and the side panel frame structure 301 is provided with the side panel push lock 307 for locking the side panel door plate 302. The rear panel door plate 202 is locked through the rear panel push locks 206, and the side panel door plate 302 is locked through the side panel push lock 307. To open the door plates, corresponding matching keys are required. Specifically, the rear panel push locks 206 and the side panel push lock 307 can use same or different keys. The door plates can only be opened by the keys, which ensures the burglar resistance.

Embodiment 3

Embodiment 2 has proposed that the air circulation devices are mounted on the front cover and the rear cover to achieve internal air circulation. In this implementation, a tonneau cover structure with an air circulation device and a specific structure of the air circulation device are described.

As shown in FIG. 80 to FIG. 84, the air circulation device 80 includes an upper cover 801 and a mosquito net 802 embedded in the upper cover 801. The upper cover 801 is provided with a bottom cover 803 used for compressing the mosquito net 802. After the mosquito net 802 is compressed through the bottom cover 803 and the bottom cover 803 is fixed on the upper cover 801 through screws, the entire structure is made into an independent module, which can be directly mounted for use to adapt to different types of tonneau covers.

The upper cover 801 is provided with a convection chamber 804; the upper cover 801 is provided with a first flowing port 805 communicated to the convection chamber 804; the bottom cover 803 is provided with a second flowing port 806 communicated to the convection chamber 804; and the first flowing port 805 and the second flowing port 806 are arranged in a staggered manner. Circulation of inside and outside air is achieved through the first flowing port 805, the second flowing port 806, and the convection chamber 804. Furthermore, the first flowing port 805 and the second flowing port 806 are arranged in the staggered manner, such a phenomenon of direct circulation between inside and outside can be avoided. Air gets in and out after being buffered by the convection chamber 804, so that external rainwater can be avoided from directly flowing into the product. The rainwater is blocked in the convection chamber 804, and the rainwater entering the convection chamber 804 can quickly flow out.

Specifically, when the upper cover 801 is mounted in the tonneau cover, the upper cover needs to be locked and sealed. Specifically, the upper cover 801 is provided with a sealing edge 807 extending outwards. The sealing edge 807 is provided with a circulation device fastening hole 808 used for fixing and mounting. Meanwhile, the sealing edge 807 is provided with a circulation device sealing pad I 809. A screw passing through a locking hole locks the upper cover 801 on the tonneau cover and compresses the circulation device sealing pad I 809, thus achieving external mounting and sealing after the air circulation device 80 is mounted on the tonneau cover.

Meanwhile, a circulation device sealing pad II 810 is arranged between the bottom cover 803 and the mosquito net 802. The circulation device sealing pad II 810 is arranged away from one side of the second flowing port 806. Considering that some rainwater passing through the convection chamber 804 and the mosquito net 802 may possibly flow downwards, after the circulation device sealing pad II 810 achieves sealing, the water flowing downwards flows out through the convection chamber 804, instead of entering the second flowing port 806.

In order to facilitate guiding the air into the convection chamber 804 and also make some water in the convection chamber 804 flow out quickly, a flow guide slope 811 extending towards the inside of the convection chamber 804 is arranged at an opening of the first flowing port 805 away from the second flowing port 806. External air can be guided to flow towards the inside through the flow guide slope 811, and the water flowing downwards can be guided to the outside on the mosquito net 802.

Specifically, in order to improve the flatness and stability of mounting of the mosquito net 802, a plurality of supporting rib plates 812 are uniformly distributed in the upper cover 801 at intervals. The mosquito net 802 is supported uniformly through the supporting rib plates 812, so that the mosquito net 802 is kept flat when compressed.

Figure 84:
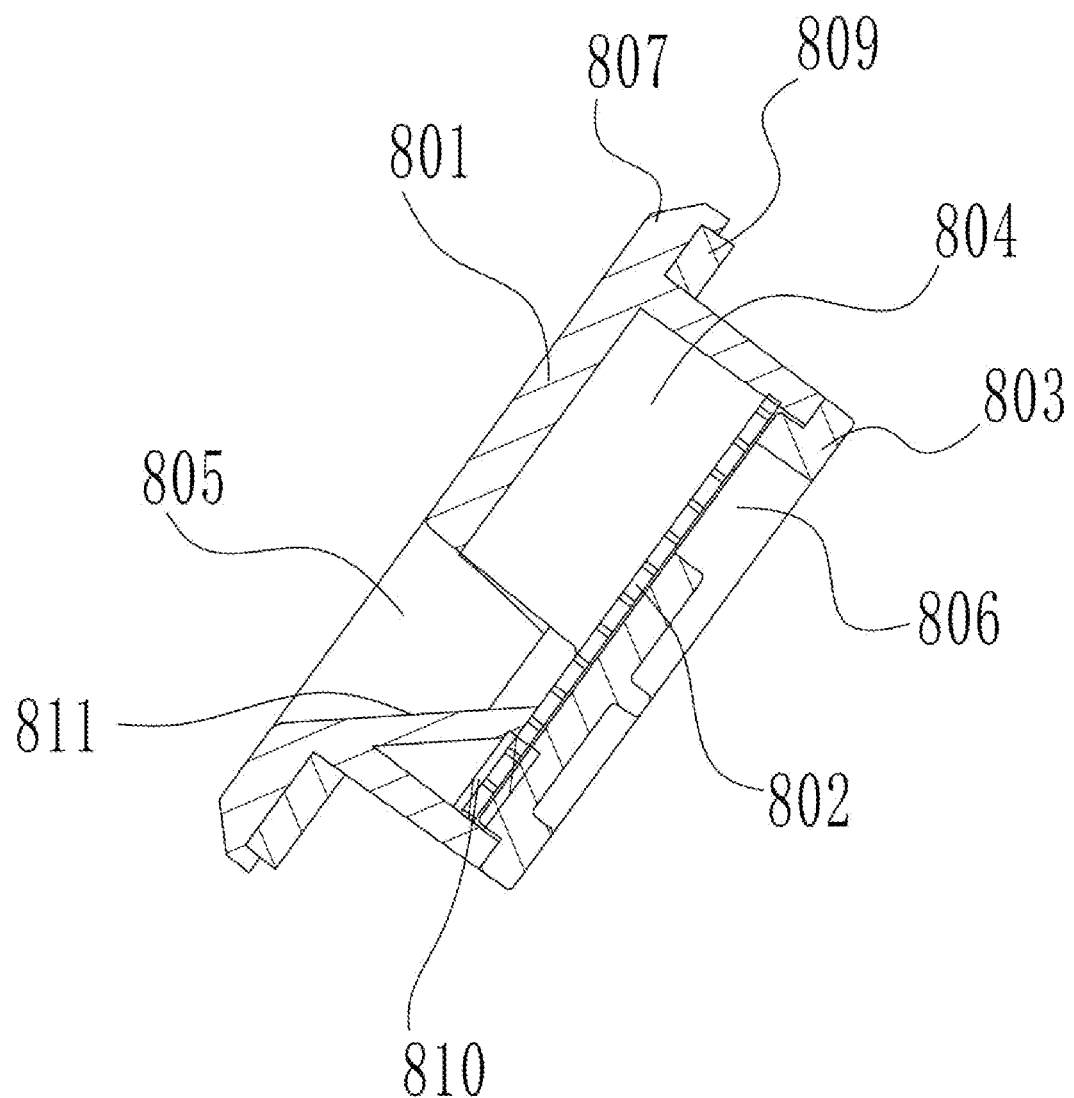
FIG. 84 is a schematic diagram of a sectional structure of an air circulation device according to a third embodiment of the present disclosure.

In order to ensure the waterproof effect and inside and outside circulation buffering, during specific mounting application of the air circulation device 80, as shown in FIG. 84, considering that an upper opening edge of the first flowing port 805 and a lower opening edge of the second flowing port 806 can be located on the same plane in an inclined mounting state, that is, considering that seen from the outside to the inside through the first flowing port 805, the second flowing port 806 is exactly covered, circulating air flows through a similarly "Z"-shaped path including the first flowing port 805, the convection chamber 804, and the second flowing port 806, and the external rainwater will only stay in the convection chamber 804 and then flows out along the flow guide slope 811 after entering the first flowing port 805. This effectively enhances the protection in the air circulation process and blocks the external rainwater.

Figure 85:
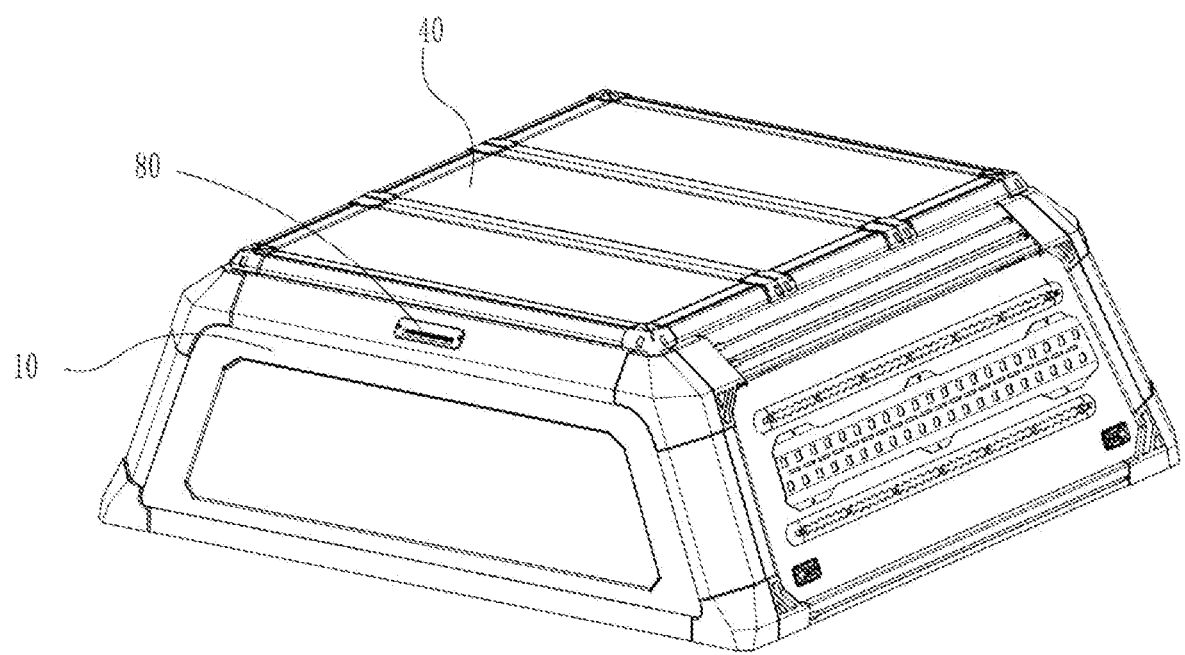
FIG. 85 is a schematic structural diagram of a first viewing angle of mounting an air circulation device in a tonneau cover.
Figure 86:
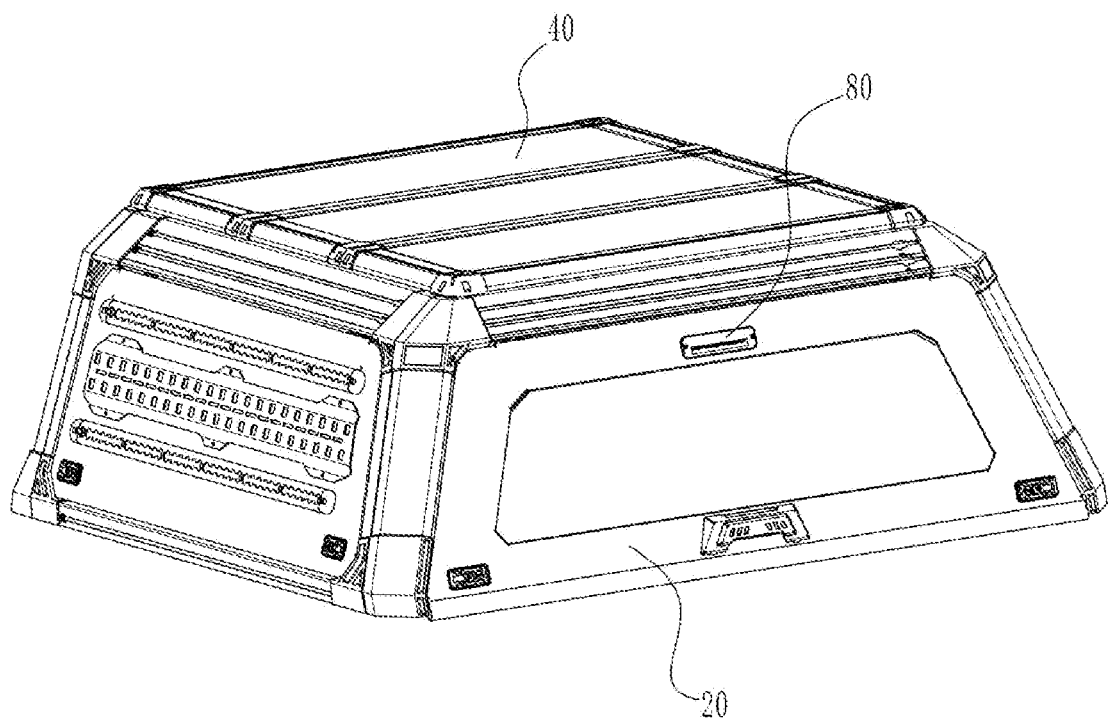
FIG. 86 is a schematic structural diagram of a second viewing angle of mounting an air circulation device in a tonneau cover.

Based on the above implementations, as shown in FIG. 85 and FIG. 86, this implementation provides a pickup truck tonneau cover, including a front cover 10, a rear cover 20, side covers, and a top cover 40. The front cover 10, the rear cover 20, the side covers, and the top cover 40 are enclosed to form a cover-like structure with an opening in a bottom. After the tonneau cover is mounted on a pickup truck, the interior is sealed. Specifically, each of the front cover 10 and the rear cover 20 is provided a square slot communicated to the interior of the frame structure formed by the front cover 10, the rear cover 20, the first side cover 30, and the second side cover 50. Air circulation devices 80 are mounted in the square slots. The air circulation devices 80 can achieve circulation of air inside and outside the tonneau cover. After being correspondingly mounted on the front cover 10 and the rear cover 20, the air circulation devices can effectively form air convection.

Of course, the air circulation devices are not limited to be mounted on the front cover 10 and the rear cover 20 only. They can also be considered to be mounted on the side covers or the top cover 40.

The upper cover 801 is limited through the square slots, so that the upper cover 801 abuts against the peripheries of the square slots and is locked through fasteners. Thus, compressed sealing is formed around the square slots after the upper cover 801 is locked.

Specifically, the front cover 10 and the rear cover 20 have inclined mounting angles. When the air circulation devices 80 are mounted in the square slots, the upper opening edge of the first flowing port 805 and the lower opening edge of the second flowing port 806 can be located on the same plane. The front cover 10 and the rear cover 20 have the inclined mounting angles after being closed, and the inclined mounting angles exactly make the upper opening edge of the first flowing port 805 and the lower opening edge of the second flowing port 806 located on the same plane. Seen from the outside to the inside through the first flowing port 805, the second flowing port 806 is exactly covered, circulating air flows through the similarly "Z"-shaped path including the first flowing port 805, the convection chamber 804, and the second flowing port 806, and the external rainwater will only stay in the convection chamber 804 and then flows out along the flow guide slope 811 after entering the first flowing port 805. This effectively enhances the protection in the air circulation process and blocks the external rainwater.

After the air circulation devices 80 are mounted on the tonneau cove, the air inside and outside are circulated for heat dissipation, and waterproof and insect-proof effects are achieved.

In the present disclosure, unless otherwise expressly specified and limited, the terms "mount", "connect", "connection", "fix", and the like should be understood in a broad sense, such as, a fixed connection, a detachable connection, an integrated connection, a mechanical connection, an electrical connection, a direct connection, an indirect connection through an intermediate medium, an internal communication of two elements, or interaction between two elements. For those of ordinary skill in the art, the specific meanings of the aforementioned terms in this disclosure can be understood based on specific conditions.

In the description of the present disclosure, it should be noted that orientations or positional relationships indicated by the terms "center", "upper", "lower", "left", "right", "inner", "outer", and the like are orientations or positional relationships as shown in the drawings or orientations or positional relationships where this invention product is often located during use, and are only for the purpose of facilitating and simplifying the description of the present disclosure instead of indicating or implying that devices or elements indicated must have particular orientations, and be constructed and operated in the particular orientations, so that these terms are not construed as limiting the present disclosure. In addition, the terms "first", "second", and the like are only for the purpose of distinguishing, and may not be understood as indicating or implying the relative importance.

For those skilled in the art, it is apparent that the present disclosure is not limited to the details of the exemplary embodiments mentioned above, and can be implemented in other specific forms without departing from the spirit or basic features of the present disclosure. Therefore, in any perspective, the embodiments should be regarded as exemplary and non-restrictive. The scope of the present disclosure is limited by the accompanying claims rather than the above description. Therefore, all changes within the meaning and scope of the equivalent conditions of the claims within the present disclosure. Any reference numerals in the claims should not be regarded as limiting the claims involved.

What is claimed is:

1. A high-strength lightweight automobile compartment tonneau cover, comprising a top cover, a front cover, a first side cover, a rear cover, and a second side cover, wherein
   a top of the front cover, a top of the first side cover, a top of the rear cover, and a top of the second side cover are respectively connected to four edges of the top cover; the front cover, the first side cover, the rear cover, and the second side cover are connected to in sequence; the top cover, the front cover, the first side cover, the rear cover, and the second side cover are enclosed to form a cavity;
   the front cover comprises a front panel and a front panel frame body surrounding the front panel; the front panel frame body comprises four front panel profiles, two front panel upper end sockets, and two front panel lower end sockets; the four front panel profiles are respectively arranged on four sides of the front panel, and the two front panel upper end sockets and the two front panel lower end sockets are arranged at four corners of the front panel respectively; and the front panel profiles are hollow;
   the top cover is provided with a rotatable speed wrench; the first side cover is provided with a bracket; and when the rotatable speed wrench is rotated to be in contact with the bracket, the bracket is connected to the speed wrench, thereby connecting the top cover with the first side cover together.

2. The high-strength lightweight automobile compartment tonneau cover according to claim 1, wherein the first side cover comprises a first panel and a first frame body surrounding the first panel; the first frame body comprises four first profiles, two first upper end sockets, and two first lower end sockets; the four first profiles are respectively arranged on four sides of the first panel; the two first upper end sockets and the two first lower end sockets are respectively arranged at four corners of the first panel; the first profile on a first side of the first side cover collides with the front panel profile on a first side of the front cover; a waterproof rubber strip is arranged in a gap between the first profile and the front panel profile which collide with each other; and the first upper end socket and the first lower end socket on the first side of the first side cover are respectively connected to the front panel upper end socket and the front panel lower end socket on the first side of the front cover.

3. The high-strength lightweight automobile compartment tonneau cover according to claim 2, wherein the first profile and the front panel profile which collide with each other are connected by a buckle.

4. The high-strength lightweight automobile compartment tonneau cover according to claim 2, wherein the rear cover comprises a rear panel and a rear panel frame body surrounding the rear panel; the rear panel frame body comprises three rear panel profiles, two rear panel upper end sockets, and two rear panel lower end sockets; the three rear panel profiles are respectively arranged at a top and two sides of the rear panel; the two rear panel upper end sockets and the two rear panel lower end sockets are respectively arranged at four corners of the rear panel; the first profile on a second side of the first side cover collides with the rear panel profile on a first side of the rear cover; a waterproof rubber strip is arranged in a gap between the rear panel profile and the first profile which collide with each other; the first upper end socket and the first lower end socket on the second side of the first side cover are respectively connected to the rear panel upper end sockets and the rear panel lower end sockets on the first side of the rear cover; the rear panel is rotatably connected to the rear panel profile at the top of the rear cover; and a bottom of the rear panel is detachably connected to a rear bottom waterproof rubber strip.

5. The high-strength lightweight automobile compartment tonneau cover according to claim 4, wherein the high-strength lightweight automobile compartment tonneau cover comprises a top annular rubber strip; one side of the top annular rubber strip is in contact with the top of the front cover, the top of the first side cover, the top of the rear cover, and the top of the second side cover respectively, and the other side of the top annular rubber strip is in contact with the top cover.

6. The high-strength lightweight automobile compartment tonneau cover according to claim 5, wherein a bottom of the front cover is provided with a front bottom waterproof rubber strip; a bottom of the first side cover is provided with a side bottom waterproof rubber strip; bottoms of the front cover, the rear cover, the first side cover, and the second side cover are provided with grooves; and the rear bottom waterproof rubber strip, the front bottom waterproof rubber strip, and the side bottom waterproof rubber strip are clamped in the grooves.

7. The high-strength lightweight automobile compartment tonneau cover according to claim 6, wherein mounting clips are arranged at the bottom of the front cover, the bottom of the first side cover, the bottom of the rear cover, and the bottom of the second side cover; and the mounting clips are used for connecting the front cover, the first side cover, the rear cover, and the second side cover to an automobile body.

8. The high-strength lightweight automobile compartment tonneau cover according to claim 7, wherein the top cover comprises a plurality of crossbeams and at least two sub covers; the at least two sub covers are connected to the plurality of crossbeams; and a top internal rubber strip is arranged between two adjacent sub covers.

9. The high-strength lightweight automobile compartment tonneau cover according to claim 8, wherein each front panel upper end socket comprises a first body and a first shell connected to the first body; two ends of the first body are respectively provided with first positioning bosses; the first positioning bosses are used for positioning and fixing; the two ends of the first body are provided with first rubber pads; and the first body is provided with a first positioning recess.

10. A high-strength lightweight automobile compartment tonneau cover, comprising a front cover, a rear cover, a first side cover, and a second side cover, wherein the front cover, the rear cover, the first side cover, and the second side cover are enclosed and connected to form a frame structure; the frame structure is provided with an upper opening and a lower opening; and at least one top cover is mounted at the upper opening;
    wherein each of the front cover and the rear cover is provided with a square slot communicated to an interior of the frame structure formed by the front cover, the rear cover, the first side cover, and the second side cover;
    the tonneau cover further comprises air circulation devices mounted in the square slots.

11. The high-strength lightweight automobile compartment tonneau cover according to claim 10, wherein the front cover comprises:
    a first front panel profile;
    two second front panel profiles;
    two first front panel end sockets respectively arranged at two ends of the first front panel profile; wherein the two first front panel end sockets are respectively connected with the two second front panel profiles;
    two second front panel end sockets arranged on the second front panel profiles; and
    a third front panel profile connected between the two second front panel end sockets;
    wherein the first front panel profile, the first front panel end sockets, the second front panel profiles, the second front panel end sockets, and the third front panel profile are enclosed to form a front panel frame structure;
    the front panel frame structure is provided with a first front panel sealing groove; and a first front panel sealing rubber strip and a front panel structure embedded into the first front panel sealing rubber strip are arranged in the first front panel sealing groove.

12. The high-strength lightweight automobile compartment tonneau cover according to claim 11, wherein the rear cover comprises:
    a U-shaped combined rear panel frame structure; wherein the rear panel frame structure comprises a first rear panel profile and a second rear panel profile;
    a rear panel door plate rotatably mounted on the rear panel frame structure;
    a rear panel gas spring arranged between the rear panel door plate and the rear panel frame structure;
    a rear panel sealing flange and a rear panel waterproof rubber hose provided on the rear panel frame structure, wherein the rear panel waterproof rubber hose sleeves the rear panel sealing flange; when the rear panel door plate is in a closed state, the rear panel door plate compresses the rear panel waterproof rubber hose; and
    a rear panel push lock arranged between the rear panel door plate and the rear panel frame structure.

13. The high-strength lightweight automobile compartment tonneau cover according to claim 12, wherein each of the first side cover and the second side cover comprises:
    a combined side panel frame structure;
    a side panel door plate rotatably mounted on the side panel frame structure;
    a side panel sealing flange and a side panel sealing rubber strip provided on the side panel frame structure, wherein the side panel sealing rubber strip sleeves the side panel sealing flange; when the side panel door plate is in a closed state, the side panel door plate compresses the side panel sealing rubber strip;
    two side panel connection bosses extending from two sides of the side panel frame structure and used for connection; and
    a side panel gas spring and a side panel push lock arranged between the side panel door plate and the side panel frame structure;
    wherein the side panel frame structure comprises a first side panel profile, a second side panel profile, and a third side panel profile.

14. The high-strength lightweight automobile compartment tonneau cover according to claim 13, wherein the top cover comprises:
    a combined top panel frame structure;
    a first top panel sealing groove arranged on the top panel frame structure; wherein the first top panel sealing groove is provided with a top panel sealing rubber strip;
    a top plate of top panel clamped into the top panel sealing rubber strip; and
    top panel crossbeams with relatively adjustable spacings mounted at intervals on the top panel frame structure, wherein the top plate of top panel is locked with the top panel crossbeams through fasteners;
    wherein the top panel frame structure comprises a first top panel profile and a second top panel profile.

15. The high-strength lightweight automobile compartment tonneau cover according to claim 14, wherein at least one sliding chute that extends in a lengthwise direction is arranged on an inner side and/or an outer side of each of the first front panel profile, the second front panel profile, the third front panel profile, the first rear panel profile, the second rear panel profile, the first side panel profiles, the second side panel profiles, the third side panel profiles, the first top panel profile, and the second top panel profile;
    at least one quick clamping structure is arranged at each of adjacent connection positions between two adjacent members among the first front panel profile, the second front panel profile, the third front panel profile, the first rear panel profile, the second rear panel profile, the first side panel profiles, the second side panel profiles, the third side panel profiles, the first top panel profile, and the second top panel profile.

16. The high-strength lightweight automobile compartment tonneau cover according to claim 15, wherein each quick clamping structure comprises a fixed bracket; the fixed bracket comprises a first connection plate and a second connection plate; the first connection plate is provided with a first connection hole; the second connection plate is provided with a U-shaped opening;
    a first locking structure is arranged in one of the sliding chutes located at the adjacent connection positions, and a second locking structure is arranged in the other sliding chute; the first locking structure passes through the first connection hole for locking; and the second locking structure is inserted into the U-shaped opening for locking.

17. The high-strength lightweight automobile compartment tonneau cover according to claim 16, wherein the first locking structure comprises a first T-shaped nut slidably arranged in the sliding chute; and the first T-shaped nut is in threaded connection with a fastening screw.

18. The high-strength lightweight automobile compartment tonneau cover according to claim 17, wherein the second locking structure comprises a second T-shaped nut slidably arranged in the sliding chute; the second T-shaped nut is in threaded connection with a hand-threaded bolt; and a compression flat washer sleeves the hand-threaded bolt.

19. The high-strength lightweight automobile compartment tonneau cover according to claim 10, wherein each air circulation device comprises an upper cover, a mosquito net, and a bottom cover; wherein the mosquito net is embedded in the upper cover; the bottom cover is arranged on the upper cover and used for compressing the mosquito net;

the upper cover is provided with a convection chamber and a first flowing port communicated to the convection chamber; the bottom cover is provided with a second flowing port communicated to the convection chamber; and the first flowing port and the second flowing port are arranged in a staggered manner.

20. The high-strength lightweight automobile compartment tonneau cover according to claim 19, wherein when the air circulation devices are mounted obliquely, an edge of an upper opening of the first flowing port and an edge of a lower opening of the second flowing port are located on the same plane.

\* \* \* \* \*